(12) United States Patent
Bertness et al.

(10) Patent No.: US 12,555,965 B2
(45) Date of Patent: Feb. 17, 2026

(54) POWER ADAPTER FOR AUTOMOTIVE VEHICLE MAINTENANCE DEVICE

(71) Applicant: Midtronics, Inc., Willowbrook, IL (US)

(72) Inventors: Kevin I. Bertness, Willowbrook, IL (US); William G. Sampson, Willowbrook, IL (US); Justin Brown, Willowbrook, IL (US); Ryan Sweeney, Willowbrook, IL (US); Matt Szymczak, Willowbrook, IL (US); Rob Hayward, Willowbrook, IL (US); Rick Johnson, Willowbrook, IL (US); Jason Dolinski, Willowbrook, IL (US); Andrew Schulz, Willowbrook, IL (US); Bob Bach, Willowbrook, IL (US); Dan Kovarik, Willowbrook, IL (US)

(73) Assignee: Midtronics, Inc., Willowbrook, IL (US)

( * ) Notice: Subject to any disclaimer, the term of this patent is extended or adjusted under 35 U.S.C. 154(b) by 763 days.

(21) Appl. No.: 17/893,412

(22) Filed: Aug. 23, 2022

(65) Prior Publication Data
US 2023/0063349 A1 Mar. 2, 2023

Related U.S. Application Data

(60) Provisional application No. 63/236,416, filed on Aug. 24, 2021.

(51) Int. Cl.
*H02J 7/00* (2006.01)
*B60L 53/14* (2019.01)
*H01R 31/06* (2006.01)

(52) U.S. Cl.
CPC ............ *H01R 31/065* (2013.01); *B60L 53/14* (2019.02); *H02J 7/0042* (2013.01); *H02J 7/0047* (2013.01)

(58) Field of Classification Search
CPC ....................................... H02J 7/0042
See application file for complete search history.

(56) References Cited

U.S. PATENT DOCUMENTS

| | | | |
|---|---|---|---|
| 85,553 A | 1/1869 | Adams | 33/472 |
| 2,000,665 A | 5/1935 | Neal | 439/440 |
| 2,254,846 A | 9/1941 | Heyer | 324/437 |
| 2,417,940 A | 3/1947 | Lehman | 200/61.25 |

(Continued)

FOREIGN PATENT DOCUMENTS

| | | |
|---|---|---|
| CN | 2470964 Y | 1/2002 |
| CN | 201063352 Y | 5/2008 |

(Continued)

OTHER PUBLICATIONS

International Search Report for the Corresponding International Patent Application No. PCT/US2024/033558, dated Sep. 3, 2024, dated Jun. 12, 2024, 5 pages.

(Continued)

*Primary Examiner* — Robert Grant
(74) *Attorney, Agent, or Firm* — Westman, Champlin & Koehler, P.A.

(57) ABSTRACT

A power adapter for an automotive vehicle maintenance device includes a power input connection and a power output connection the is configured to connect to the automotive vehicle maintenance device. The pawer adapter also included connection circuitry the is configured to connect the power input connection to the power output connection.

19 Claims, 10 Drawing Sheets

(56) References Cited

U.S. PATENT DOCUMENTS

| | | | | |
|---|---|---|---|---|
| 2,437,772 A | 3/1948 | Wall | | 324/523 |
| 2,514,745 A | 7/1950 | Dalzell | | 324/115 |
| 2,689,939 A | 9/1954 | Godshalk | | |
| 2,727,221 A | 12/1955 | Springg | | 340/447 |
| 3,025,455 A | 3/1962 | Jonsson | | 323/369 |
| 3,178,686 A | 4/1965 | Mills | | 340/447 |
| 3,215,194 A | 11/1965 | Sununu et al. | | 165/80.3 |
| 3,223,969 A | 12/1965 | Alexander | | 340/447 |
| 3,267,452 A | 8/1966 | Wolf | | 340/249 |
| 3,356,936 A | 12/1967 | Smith | | 324/429 |
| 3,562,634 A | 2/1971 | Latner | | 324/427 |
| 3,593,099 A | 7/1971 | Scholl | | 320/127 |
| 3,607,673 A | 9/1971 | Seyl | | 324/425 |
| 3,652,341 A | 3/1972 | Halsall et al. | | 29/623.2 |
| 3,676,770 A | 7/1972 | Sharaf et al. | | 324/430 |
| 3,699,433 A | 10/1972 | Smith, Jr. | | 324/523 |
| 3,704,439 A | 11/1972 | Nelson | | |
| 3,729,989 A | 5/1973 | Little | | 73/862.192 |
| 3,745,441 A | 7/1973 | Soffer | | 290/14 |
| 3,750,011 A | 7/1973 | Kreps | | 324/430 |
| 3,753,094 A | 8/1973 | Furuishi et al. | | 324/430 |
| 3,776,177 A | 12/1973 | Bryant et al. | | 116/311 |
| 3,796,124 A | 3/1974 | Crosa | | 411/521 |
| 3,808,401 A | 4/1974 | Wright et al. | | |
| 3,808,522 A | 4/1974 | Sharaf | | 324/430 |
| 3,808,573 A | 4/1974 | Cappell | | |
| 3,811,089 A | 5/1974 | Strezelewicz | | 324/170 |
| 3,816,805 A | 6/1974 | Terry | | 320/123 |
| 3,850,490 A | 11/1974 | Zehr | | 439/822 |
| 3,857,082 A | 12/1974 | Van Opijnen | | 320/143 |
| 3,873,911 A | 3/1975 | Champlin | | 324/430 |
| 3,876,931 A | 4/1975 | Godshalk | | 324/429 |
| 3,879,654 A | 4/1975 | Kessinger | | 324/434 |
| 3,886,426 A | 5/1975 | Daggett | | 320/117 |
| 3,886,443 A | 5/1975 | Miyakawa et al. | | 324/426 |
| 3,889,248 A | 6/1975 | Ritter | | 340/636.11 |
| 3,906,329 A | 9/1975 | Bader | | 320/134 |
| 3,909,708 A | 9/1975 | Champlin | | 324/431 |
| 3,920,284 A | 11/1975 | Lane et al. | | 303/122.06 |
| 3,936,744 A | 2/1976 | Perlmutter | | 324/772 |
| 3,939,400 A | 2/1976 | Steele | | 324/434 |
| 3,946,299 A | 3/1976 | Christianson et al. | | 320/430 |
| 3,947,757 A | 3/1976 | Grube et al. | | 324/416 |
| 3,969,667 A | 7/1976 | McWilliams | | 324/427 |
| 3,979,664 A | 9/1976 | Harris | | 324/397 |
| 3,984,762 A | 10/1976 | Dowgiallo, Jr. | | 324/430 |
| 3,984,768 A | 10/1976 | Staples | | 324/712 |
| 3,989,544 A | 11/1976 | Santo | | 429/65 |
| 3,997,830 A | 12/1976 | Newell et al. | | 320/102 |
| 4,008,619 A | 2/1977 | Alcaide et al. | | 73/724 |
| 4,023,882 A | 5/1977 | Pettersson | | 439/426 |
| 4,024,953 A | 5/1977 | Nailor, III | | 206/344 |
| 4,045,718 A | 8/1977 | Gray | | |
| 4,047,091 A | 9/1977 | Hutchines et al. | | 363/59 |
| 4,053,824 A | 10/1977 | Dupuis et al. | | 324/434 |
| 4,056,764 A | 11/1977 | Endo et al. | | 320/101 |
| 4,057,313 A | 11/1977 | Polizzano | | 439/219 |
| 4,070,624 A | 1/1978 | Taylor | | 324/772 |
| 4,086,531 A | 4/1978 | Bernier | | 324/772 |
| 4,106,025 A | 8/1978 | Katz | | 343/715 |
| 4,112,351 A | 9/1978 | Back et al. | | 324/380 |
| 4,114,083 A | 9/1978 | Benham et al. | | 340/636.13 |
| 4,126,874 A | 11/1978 | Suzuki et al. | | 396/301 |
| 4,160,916 A | 7/1979 | Papasideris | | 307/10.6 |
| 4,176,315 A | 11/1979 | Sunnarborg | | 324/133 |
| 4,178,546 A | 12/1979 | Hulls et al. | | 324/772 |
| 4,193,025 A | 3/1980 | Frailing et al. | | 324/427 |
| 4,207,610 A | 6/1980 | Gordon | | 701/33.9 |
| 4,207,611 A | 6/1980 | Gordon | | 701/33 |
| 4,217,645 A | 8/1980 | Barry et al. | | 702/63 |
| 4,218,745 A | 8/1980 | Perkins | | 324/66 |
| 4,280,457 A | 7/1981 | Bloxham | | 123/198 R |
| 4,295,468 A | 10/1981 | Bartelt | | |
| 4,297,639 A | 10/1981 | Branham | | 324/429 |
| 4,307,342 A | 12/1981 | Peterson | | 324/767 |
| 4,315,204 A | 2/1982 | Sievers et al. | | 322/28 |
| 4,316,185 A | 2/1982 | Watrous et al. | | 340/636.11 |
| 4,322,685 A | 3/1982 | Frailing et al. | | 324/429 |
| 4,351,405 A | 9/1982 | Fields et al. | | 180/65.2 |
| 4,352,067 A | 9/1982 | Ottone | | 324/434 |
| 4,360,780 A | 11/1982 | Skutch, Jr. | | 324/437 |
| 4,361,809 A | 11/1982 | Bil et al. | | 324/426 |
| 4,363,407 A | 12/1982 | Buckler et al. | | 209/3.3 |
| 4,369,407 A | 1/1983 | Korbell | | 324/416 |
| 4,379,989 A | 4/1983 | Kurz et al. | | 320/165 |
| 4,379,990 A | 4/1983 | Sievers et al. | | 322/99 |
| 4,385,269 A | 5/1983 | Aspinwall et al. | | 320/129 |
| 4,390,828 A | 6/1983 | Converse et al. | | 320/153 |
| 4,392,101 A | 7/1983 | Saar et al. | | 320/156 |
| 4,396,880 A | 8/1983 | Windebank | | 320/156 |
| 4,408,157 A | 10/1983 | Beaubien | | 324/712 |
| 4,412,169 A | 10/1983 | Dell'Orto | | 320/123 |
| 4,423,378 A | 12/1983 | Marino et al. | | 324/427 |
| 4,423,379 A | 12/1983 | Jacobs et al. | | 324/429 |
| 4,424,491 A | 1/1984 | Bobbett et al. | | 324/433 |
| 4,425,791 A | 1/1984 | Kling | | 73/116.02 |
| 4,441,359 A | 4/1984 | Ezoe | | 73/116.06 |
| 4,459,548 A | 7/1984 | Lentz et al. | | 324/472 |
| 4,484,140 A | 11/1984 | Dieu | | |
| 4,502,000 A | 2/1985 | Mashikian | | |
| 4,514,694 A | 4/1985 | Finger | | 324/429 |
| 4,520,353 A | 5/1985 | McAuliffe | | 340/636.16 |
| 4,521,498 A | 6/1985 | Juergens | | 429/59 |
| 4,544,312 A | 10/1985 | Stencel | | |
| 4,560,230 A | 12/1985 | Inglis | | 439/890 |
| 4,564,798 A | 1/1986 | Young | | 320/103 |
| 4,620,767 A | 11/1986 | Woolf | | 439/217 |
| 4,626,765 A | 12/1986 | Tanaka | | 320/127 |
| 4,633,418 A | 12/1986 | Bishop | | 702/63 |
| 4,637,359 A | 1/1987 | Cook | | 123/179 |
| 4,643,511 A | 2/1987 | Gawlik | | 439/755 |
| 4,659,977 A | 4/1987 | Kissel et al. | | 320/150 |
| 4,663,580 A | 5/1987 | Wortman | | 320/153 |
| 4,665,370 A | 5/1987 | Holland | | 324/429 |
| 4,667,143 A | 5/1987 | Cooper et al. | | 320/153 |
| 4,667,279 A | 5/1987 | Maier | | 363/46 |
| 4,678,998 A | 7/1987 | Muramatsu | | 324/427 |
| 4,679,000 A | 7/1987 | Clark | | 324/428 |
| 4,680,528 A | 7/1987 | Mikami et al. | | 320/165 |
| 4,686,442 A | 8/1987 | Radomski | | 320/123 |
| 4,697,134 A | 9/1987 | Burkum et al. | | 320/134 |
| 4,707,795 A | 11/1987 | Alber et al. | | 702/63 |
| 4,709,202 A | 11/1987 | Koenck et al. | | 320/112 |
| 4,710,861 A | 12/1987 | Kanner | | 363/46 |
| 4,719,428 A | 1/1988 | Liebermann | | 324/436 |
| 4,723,656 A | 2/1988 | Kiernan et al. | | 206/705 |
| 4,743,855 A | 5/1988 | Randin et al. | | 324/430 |
| 4,745,349 A | 5/1988 | Palanisamy et al. | | 320/125 |
| 4,773,011 A | 9/1988 | VanHoose | | 701/30 |
| 4,781,629 A | 11/1988 | Mize | | 439/822 |
| D299,909 S | 2/1989 | Casey | | D10/77 |
| 4,816,768 A | 3/1989 | Champlin | | 324/428 |
| 4,820,966 A | 4/1989 | Fridman | | 320/116 |
| 4,825,170 A | 4/1989 | Champlin | | 324/436 |
| 4,826,457 A | 5/1989 | Varatta | | 439/504 |
| 4,847,547 A | 7/1989 | Eng, Jr. et al. | | 320/153 |
| 4,849,700 A | 7/1989 | Morioka et al. | | 324/427 |
| 4,874,679 A | 10/1989 | Miyagawa | | 429/91 |
| 4,876,495 A | 10/1989 | Palanisamy et al. | | 320/106 |
| 4,881,038 A | 11/1989 | Champlin | | 324/426 |
| 4,885,523 A | 12/1989 | Koench | | 230/131 |
| 4,888,716 A | 12/1989 | Ueno | | 702/63 |
| 4,901,007 A | 2/1990 | Sworm | | 324/110 |
| 4,907,176 A | 3/1990 | Bahnick et al. | | 364/551.01 |
| 4,912,416 A | 3/1990 | Champlin | | 324/430 |
| 4,913,116 A | 4/1990 | Katogi et al. | | 123/406.32 |
| 4,926,330 A | 5/1990 | Abe et al. | | 701/33 |
| 4,929,931 A | 5/1990 | McCuen | | 340/636.15 |
| 4,931,738 A | 6/1990 | MacIntyre et al. | | 324/435 |
| 4,932,905 A | 6/1990 | Richards | | 439/822 |
| 4,933,845 A | 6/1990 | Hayes | | 710/104 |
| 4,934,957 A | 6/1990 | Bellusci | | 439/504 |
| 4,937,528 A | 6/1990 | Palanisamy | | 324/430 |
| 4,947,124 A | 8/1990 | Hauser | | 324/430 |

(56) References Cited

U.S. PATENT DOCUMENTS

| | | | |
|---|---|---|---|
| 4,949,046 A | 8/1990 | Seyfang | 324/427 |
| 4,956,597 A | 9/1990 | Heavey et al. | 320/129 |
| 4,965,738 A | 10/1990 | Bauer et al. | 320/136 |
| 4,968,941 A | 11/1990 | Rogers | 324/428 |
| 4,968,942 A | 11/1990 | Palanisamy | 324/430 |
| 4,969,834 A | 11/1990 | Johnson | 439/141 |
| 4,983,086 A | 1/1991 | Hatrock | 411/259 |
| 5,004,979 A | 4/1991 | Marino et al. | 324/160 |
| 5,030,916 A | 7/1991 | Bokitch | 324/503 |
| 5,032,825 A | 7/1991 | Kuznicki | 340/636.15 |
| 5,034,893 A | 7/1991 | Fisher | 701/99 |
| 5,037,335 A | 8/1991 | Campbell | 439/217 |
| 5,037,778 A | 8/1991 | Stark et al. | 228/121 |
| 5,047,722 A | 9/1991 | Wurst et al. | 324/430 |
| 5,081,565 A | 1/1992 | Nabha et al. | 362/465 |
| 5,083,076 A | 1/1992 | Scott | 320/105 |
| 5,087,881 A | 2/1992 | Peacock | 324/378 |
| 5,095,223 A | 3/1992 | Thomas | 307/110 |
| 5,108,320 A | 4/1992 | Kimber | 439/883 |
| 5,109,213 A | 4/1992 | Williams | 340/447 |
| 5,126,675 A | 6/1992 | Yang | 324/435 |
| 5,130,658 A | 7/1992 | Bohmer | 324/435 |
| 5,140,269 A | 8/1992 | Champlin | 324/433 |
| 5,144,218 A | 9/1992 | Bosscha | 320/139 |
| 5,144,248 A | 9/1992 | Alexandres et al. | 324/428 |
| D330,338 S | 10/1992 | Wang | D10/77 |
| 5,159,272 A | 10/1992 | Rao et al. | 324/429 |
| 5,160,881 A | 11/1992 | Schramm et al. | 322/7 |
| 5,164,653 A | 11/1992 | Reem | |
| 5,167,529 A | 12/1992 | Verge | 427/1 |
| 5,168,208 A | 12/1992 | Schultz et al. | 322/25 |
| 5,170,124 A | 12/1992 | Blair et al. | 324/434 |
| 5,179,335 A | 1/1993 | Nor | 320/159 |
| 5,187,382 A | 2/1993 | Kondo | 307/10.1 |
| 5,194,799 A | 3/1993 | Tomantschger | 320/103 |
| 5,202,617 A | 4/1993 | Nor | |
| 5,204,611 A | 4/1993 | Nor et al. | 320/145 |
| 5,214,370 A | 5/1993 | Harm et al. | 320/152 |
| 5,214,385 A | 5/1993 | Gabriel et al. | 324/434 |
| 5,223,747 A | 6/1993 | Tschulena | 257/713 |
| 5,241,275 A | 8/1993 | Fang | 324/430 |
| 5,254,952 A | 10/1993 | Salley et al. | 324/429 |
| 5,266,880 A | 11/1993 | Newland | 320/125 |
| 5,278,759 A | 1/1994 | Berra et al. | 701/1 |
| 5,281,919 A | 1/1994 | Palanisamy | 324/427 |
| 5,281,920 A | 1/1994 | Wurst | 324/430 |
| 5,295,078 A | 3/1994 | Stich et al. | 700/297 |
| 5,296,823 A | 3/1994 | Dietrich | 333/161 |
| 5,298,797 A | 3/1994 | Redl | 327/387 |
| 5,300,874 A | 4/1994 | Shimamoto et al. | 320/106 |
| 5,302,902 A | 4/1994 | Groehl | 324/434 |
| 5,309,052 A | 5/1994 | Kim | 174/350 |
| 5,313,152 A | 5/1994 | Wozniak et al. | 320/118 |
| 5,315,287 A | 5/1994 | Sol | 340/455 |
| 5,321,231 A | 6/1994 | Schmalzriedt et al. | |
| 5,321,626 A | 6/1994 | Palladino | 702/63 |
| 5,321,627 A | 6/1994 | Reher | 702/63 |
| 5,323,337 A | 6/1994 | Wilson et al. | 702/73 |
| 5,325,041 A | 6/1994 | Briggs | 320/149 |
| 5,331,268 A | 7/1994 | Patino et al. | 320/158 |
| 5,332,927 A | 7/1994 | Paul et al. | 307/66 |
| 5,336,993 A | 8/1994 | Thomas et al. | 324/158.1 |
| 5,338,515 A | 8/1994 | Dalla Betta et al. | 422/95 |
| 5,339,018 A | 8/1994 | Brokaw | 320/147 |
| 5,343,380 A | 8/1994 | Champlin | 363/46 |
| 5,345,384 A | 9/1994 | Przybyla et al. | 701/29.1 |
| 5,347,163 A | 9/1994 | Yoshimura | 307/66 |
| 5,349,535 A | 9/1994 | Gupta | 320/106 |
| 5,352,968 A | 10/1994 | Reni et al. | 320/136 |
| 5,357,519 A | 10/1994 | Martin et al. | 371/15.1 |
| 5,365,160 A | 11/1994 | Leppo et al. | 320/160 |
| 5,365,453 A | 11/1994 | Startup et al. | 702/36 |
| 5,369,364 A | 11/1994 | Renirie et al. | 324/430 |
| 5,381,096 A | 1/1995 | Hirzel | 324/427 |
| 5,384,540 A | 1/1995 | Dessel | 324/539 |
| 5,387,871 A | 2/1995 | Tsai | 324/429 |
| 5,394,093 A | 2/1995 | Cervas | 324/556 |
| 5,402,007 A | 3/1995 | Center et al. | 290/40 B |
| 5,410,754 A | 4/1995 | Klotzbach et al. | 370/466 |
| 5,412,308 A | 5/1995 | Brown | 323/267 |
| 5,412,323 A | 5/1995 | Kato et al. | 324/429 |
| 5,425,041 A | 6/1995 | Seko et al. | 372/45.01 |
| 5,426,371 A | 6/1995 | Salley et al. | 324/429 |
| 5,426,416 A | 6/1995 | Jefferies et al. | 340/664 |
| 5,430,645 A | 7/1995 | Keller | 364/424.01 |
| 5,432,025 A | 7/1995 | Cox | 429/65 |
| 5,432,426 A | 7/1995 | Yoshida | 320/160 |
| 5,432,429 A | 7/1995 | Armstrong, II et al. | |
| 5,434,495 A | 7/1995 | Toko | 320/135 |
| 5,435,185 A | 7/1995 | Eagan | 73/587 |
| 5,442,274 A | 8/1995 | Tamai | 320/146 |
| 5,445,026 A | 8/1995 | Eagan | 73/591 |
| 5,449,996 A | 9/1995 | Matsumoto et al. | 320/148 |
| 5,449,997 A | 9/1995 | Gilmore et al. | 320/148 |
| 5,451,881 A | 9/1995 | Finger | 324/433 |
| 5,453,027 A | 9/1995 | Buell et al. | 439/433 |
| 5,457,377 A | 10/1995 | Jonsson | 324/430 |
| 5,459,660 A | 10/1995 | Berra | 701/33 |
| 5,462,439 A | 10/1995 | Keith | 180/279 |
| 5,469,043 A | 11/1995 | Cherng et al. | 320/161 |
| 5,485,090 A | 1/1996 | Stephens | 324/433 |
| 5,486,123 A | 1/1996 | Miyazaki | 439/825 |
| 5,488,300 A | 1/1996 | Jamieson | 324/432 |
| 5,504,674 A | 4/1996 | Chen et al. | 705/4 |
| 5,508,599 A | 4/1996 | Koenck | 320/138 |
| 5,519,383 A | 5/1996 | De La Rosa | 340/636.15 |
| 5,528,148 A | 6/1996 | Rogers | 320/137 |
| 5,537,967 A | 7/1996 | Tashiro et al. | 123/192.1 |
| 5,541,489 A | 7/1996 | Dunstan | 320/134 |
| 5,546,317 A | 8/1996 | Andrieu | 702/63 |
| 5,548,273 A | 8/1996 | Nicol et al. | 340/439 |
| 5,550,485 A | 8/1996 | Falk | 324/772 |
| 5,555,498 A | 9/1996 | Berra | |
| 5,561,380 A | 10/1996 | Sway-Tin et al. | 324/509 |
| 5,562,501 A | 10/1996 | Kinoshita et al. | 439/852 |
| 5,563,496 A | 10/1996 | McClure | 320/128 |
| 5,572,136 A | 11/1996 | Champlin | 324/426 |
| 5,573,611 A | 11/1996 | Koch et al. | 152/152.1 |
| 5,574,355 A | 11/1996 | McShane et al. | 320/161 |
| 5,578,915 A | 11/1996 | Crouch, Jr. et al. | 324/428 |
| 5,583,416 A | 12/1996 | Klang | 320/160 |
| 5,585,416 A | 12/1996 | Audett et al. | 522/35 |
| 5,585,728 A | 12/1996 | Champlin | 324/427 |
| 5,589,292 A | 12/1996 | Rozon | |
| 5,589,757 A | 12/1996 | Klang | 320/160 |
| 5,592,093 A | 1/1997 | Klingbiel | 324/426 |
| 5,592,094 A | 1/1997 | Ichikawa | 324/427 |
| 5,596,260 A | 1/1997 | Moravec et al. | 320/135 |
| 5,596,261 A | 1/1997 | Suyama | 320/152 |
| 5,598,098 A | 1/1997 | Champlin | 324/430 |
| 5,602,462 A | 2/1997 | Stich et al. | 323/258 |
| 5,606,242 A | 2/1997 | Hull et al. | 320/106 |
| 5,614,788 A | 3/1997 | Mullins et al. | 315/82 |
| 5,621,298 A | 4/1997 | Harvey | 320/134 |
| 5,631,536 A | 5/1997 | Tseng | 320/15 |
| 5,631,831 A | 5/1997 | Bird et al. | 701/34.4 |
| 5,633,985 A | 5/1997 | Severson et al. | 704/267 |
| 5,637,978 A | 6/1997 | Kellett et al. | 320/104 |
| 5,642,031 A | 6/1997 | Brotto | 320/156 |
| 5,644,212 A | 7/1997 | Takahashi | 320/134 |
| 5,650,937 A | 7/1997 | Bounaga | 702/65 |
| 5,652,501 A | 7/1997 | McClure et al. | 340/636.15 |
| 5,653,659 A | 8/1997 | Kunibe et al. | 477/111 |
| 5,654,623 A | 8/1997 | Shiga et al. | 320/106 |
| 5,656,920 A | 8/1997 | Cherng et al. | 324/431 |
| 5,661,368 A | 8/1997 | Deol et al. | 315/82 |
| 5,666,040 A | 9/1997 | Bourbeau | 320/118 |
| 5,675,234 A | 10/1997 | Greene | 340/636.11 |
| 5,677,077 A | 10/1997 | Faulk | 429/90 |
| 5,684,678 A | 11/1997 | Barrett | 363/17 |
| 5,685,734 A | 11/1997 | Kutz | 439/371 |
| 5,691,621 A | 11/1997 | Phuoc et al. | 320/134 |
| 5,699,050 A | 12/1997 | Kanazawa | 340/636.13 |
| 5,701,089 A | 12/1997 | Perkins | 324/772 |

(56) References Cited

U.S. PATENT DOCUMENTS

| | | |
|---|---|---|
| 5,705,929 A | 1/1998 | Caravello et al. ............ 324/430 |
| 5,707,015 A | 1/1998 | Guthrie ......................... 241/120 |
| 5,710,503 A | 1/1998 | Sideris et al. ................. 320/116 |
| 5,711,648 A | 1/1998 | Hammerslag ................. 414/800 |
| 5,712,795 A | 1/1998 | Layman et al. ............... 700/297 |
| 5,717,336 A | 2/1998 | Basell et al. .................. 324/430 |
| 5,717,937 A | 2/1998 | Fritz ............................. 713/300 |
| 5,721,688 A | 2/1998 | Bramwell ...................... 324/426 |
| 5,732,074 A | 3/1998 | Spaur et al. .................. 370/313 |
| 5,739,667 A | 4/1998 | Matsuda et al. .............. 320/128 |
| 5,744,962 A | 4/1998 | Alber et al. ................... 324/426 |
| 5,745,044 A | 4/1998 | Hyatt, Jr. et al. ........... 340/5.23 |
| 5,747,189 A | 5/1998 | Perkins ........................... 429/91 |
| 5,747,909 A | 5/1998 | Syverson et al. ........ 310/156.56 |
| 5,747,967 A | 5/1998 | Muljadi et al. ................ 320/148 |
| 5,754,417 A | 5/1998 | Nicollini ......................... 363/60 |
| 5,757,192 A | 5/1998 | McShane et al. ............ 324/427 |
| 5,760,587 A | 6/1998 | Harvey .......................... 324/434 |
| 5,772,468 A | 6/1998 | Kowalski et al. ............ 439/506 |
| 5,773,962 A | 6/1998 | Nor ................................ 320/134 |
| 5,773,978 A | 6/1998 | Becker .......................... 324/430 |
| 5,778,326 A | 7/1998 | Moroto et al. ................. 701/22 |
| 5,780,974 A | 7/1998 | Pabla et al. ...................... 315/82 |
| 5,780,980 A | 7/1998 | Naito ............................ 318/139 |
| 5,789,899 A | 8/1998 | van Phuoc et al. ........... 320/112 |
| 5,793,359 A | 8/1998 | Ushikubo ..................... 345/169 |
| 5,796,239 A | 8/1998 | van Phuoc et al. ........... 320/107 |
| 5,808,469 A | 9/1998 | Kopera ......................... 324/434 |
| 5,811,979 A | 9/1998 | Rhein ........................... 324/718 |
| 5,818,201 A | 10/1998 | Stockstad et al. ............ 320/119 |
| 5,818,234 A | 10/1998 | McKinnon .................... 324/433 |
| 5,820,407 A | 10/1998 | Morse et al. .................. 439/504 |
| 5,821,756 A | 10/1998 | McShane et al. ............ 324/430 |
| 5,821,757 A | 10/1998 | Alvarez et al. ............... 324/434 |
| 5,825,174 A | 10/1998 | Parker .......................... 324/106 |
| 5,826,467 A | 10/1998 | Huang |
| 5,831,435 A | 11/1998 | Troy ............................. 324/426 |
| 5,832,396 A | 11/1998 | Moroto et al. ................. 701/22 |
| 5,850,113 A | 12/1998 | Weimer et al. ............... 307/125 |
| 5,862,515 A | 1/1999 | Kobayashi et al. ............ 702/63 |
| 5,865,638 A | 2/1999 | Trafton ......................... 439/288 |
| 5,869,951 A | 2/1999 | Takahashi .................... 320/104 |
| 5,870,018 A | 2/1999 | Person ......................... 307/10.2 |
| 5,871,858 A | 2/1999 | Thomsen et al. ................ 429/7 |
| 5,872,443 A | 2/1999 | Williamson .................. 320/160 |
| 5,872,453 A | 2/1999 | Shimoyama et al. ........ 324/431 |
| 5,883,306 A | 3/1999 | Hwang ........................ 73/146.8 |
| 5,884,202 A | 3/1999 | Arjomand .................... 701/31.4 |
| 5,894,222 A | 4/1999 | Hibino |
| 5,895,440 A | 4/1999 | Proctor et al. ................. 702/63 |
| 5,903,154 A | 5/1999 | Zhang et al. ................. 324/437 |
| 5,903,716 A | 5/1999 | Kimber et al. ............... 395/114 |
| 5,912,534 A | 6/1999 | Benedict ......................... 315/82 |
| 5,914,605 A | 6/1999 | Bertness ...................... 324/430 |
| 5,916,287 A | 6/1999 | Arjomand et al. ........... 701/33.2 |
| 5,927,938 A | 7/1999 | Hammerslag ................ 414/809 |
| 5,929,609 A | 7/1999 | Joy et al. ........................ 322/25 |
| 5,935,180 A | 8/1999 | Fieramosca et al. ........ 701/29.6 |
| 5,939,855 A | 8/1999 | Proctor et al. ............... 320/104 |
| 5,939,861 A | 8/1999 | Joko et al. .................... 320/122 |
| 5,945,829 A | 8/1999 | Bertness ...................... 324/430 |
| 5,946,605 A | 8/1999 | Takahisa et al. ............... 455/68 |
| 5,950,144 A | 9/1999 | Hall et al. ..................... 702/108 |
| 5,951,229 A | 9/1999 | Hammerslag ................ 414/398 |
| 5,953,322 A | 9/1999 | Kimball ....................... 370/328 |
| 5,955,951 A | 9/1999 | Wischerop et al. ........ 340/572.8 |
| 5,961,561 A | 10/1999 | Wakefield, II ................. 701/29 |
| 5,961,604 A | 10/1999 | Anderson et al. ............ 709/224 |
| 5,963,012 A | 10/1999 | Garcia et al. ................. 320/106 |
| 5,969,625 A | 10/1999 | Russo ....................... 340/636.19 |
| 5,973,598 A | 10/1999 | Beigel ....................... 340/572.1 |
| 5,978,805 A | 11/1999 | Carson .......................... 707/10 |
| 5,982,138 A | 11/1999 | Krieger ........................ 320/105 |
| 5,990,664 A | 11/1999 | Rahman ....................... 320/136 |
| 6,002,238 A | 12/1999 | Champlin ..................... 320/134 |
| 6,005,489 A | 12/1999 | Siegle et al. ............. 340/825.69 |
| 6,005,759 A | 12/1999 | Hart et al. ...................... 361/66 |
| 6,008,652 A | 12/1999 | Theofanopoulos et al. .. 324/434 |
| 6,009,369 A | 12/1999 | Boisvert et al. ................ 701/99 |
| 6,009,742 A | 1/2000 | Balko |
| 6,016,047 A | 1/2000 | Notten et al. ................. 320/137 |
| 6,031,354 A | 2/2000 | Wiley et al. .................. 320/116 |
| 6,031,368 A | 2/2000 | Klippel et al. ................ 324/133 |
| 6,037,745 A | 3/2000 | Koike et al. .................. 320/104 |
| 6,037,749 A | 3/2000 | Parsonage .................... 320/132 |
| 6,037,751 A | 3/2000 | Klang ........................... 320/160 |
| 6,037,777 A | 3/2000 | Champlin .................... 324/430 |
| 6,037,778 A | 3/2000 | Makhija ....................... 324/433 |
| 6,046,514 A | 4/2000 | Rouillard et al. ............. 307/77 |
| 6,051,976 A | 4/2000 | Bertness ...................... 324/426 |
| 6,055,468 A | 4/2000 | Kaman et al. ................. 701/29 |
| 6,061,638 A | 5/2000 | Joyce ............................. 702/63 |
| 6,064,372 A | 5/2000 | Kahkoska .................... 345/173 |
| 6,072,299 A | 6/2000 | Kurle et al. ................... 320/112 |
| 6,072,300 A | 6/2000 | Tsuji ............................. 320/116 |
| 6,075,339 A | 6/2000 | Reipur et al. ................. 320/110 |
| 6,076,018 A | 6/2000 | Sturnman et al. |
| 6,081,098 A | 6/2000 | Bertness et al. ............. 320/134 |
| 6,081,109 A | 6/2000 | Seymour et al. ............. 324/127 |
| 6,081,154 A | 6/2000 | Ezell et al. ................... 327/540 |
| 6,087,815 A | 7/2000 | Pfeifer et al. ................. 323/282 |
| 6,091,238 A | 7/2000 | McDermott ............... 324/207.2 |
| 6,091,245 A | 7/2000 | Bertness ...................... 324/426 |
| 6,094,030 A | 7/2000 | Gimthorpe et al. |
| 6,094,033 A | 7/2000 | Ding et al. .................... 320/132 |
| 6,097,193 A | 8/2000 | Bramwell ..................... 324/429 |
| 6,100,670 A | 8/2000 | Levesque ..................... 320/150 |
| 6,100,815 A | 8/2000 | Pailthorp ................. 324/754.07 |
| 6,104,167 A | 8/2000 | Bertness et al. ............. 320/132 |
| 6,113,262 A | 9/2000 | Purola et al. ................... 374/45 |
| 6,114,834 A | 9/2000 | Parise .......................... 320/109 |
| 6,118,252 A | 9/2000 | Richter |
| 6,121,880 A | 9/2000 | Scott et al. ................ 340/572.5 |
| 6,130,519 A | 10/2000 | Whiting et al. |
| 6,136,914 A | 10/2000 | Hergenrother et al. ...... 524/495 |
| 6,137,261 A | 10/2000 | Kurle et al. |
| 6,137,269 A | 10/2000 | Champlin ..................... 320/150 |
| 6,140,797 A | 10/2000 | Dunn ........................... 320/105 |
| 6,141,608 A | 10/2000 | Rother ........................ 701/29.6 |
| 6,144,185 A | 11/2000 | Dougherty et al. .......... 320/132 |
| 6,147,598 A | 11/2000 | Murphy et al. .......... 340/426.19 |
| 6,149,653 A | 11/2000 | Deslauriers .................. 606/232 |
| 6,150,793 A | 11/2000 | Lesesky et al. .............. 320/104 |
| 6,158,000 A | 12/2000 | Collins ............................ 713/1 |
| 6,161,640 A | 12/2000 | Yamaguchi .................. 180/65.8 |
| 6,163,156 A | 12/2000 | Bertness ...................... 324/426 |
| 6,164,063 A | 12/2000 | Mendler ......................... 60/274 |
| 6,167,349 A | 12/2000 | Alvarez .......................... 702/63 |
| 6,172,483 B1 | 1/2001 | Champlin ..................... 320/134 |
| 6,172,505 B1 | 1/2001 | Bertness ...................... 324/430 |
| 6,177,737 B1 | 1/2001 | Palfey et al. ................... 307/64 |
| 6,177,878 B1 | 1/2001 | Tamura |
| 6,181,545 B1 | 1/2001 | Amatucci et al. ............ 361/502 |
| 6,184,655 B1 | 2/2001 | Malackowski ............... 320/116 |
| 6,184,656 B1 | 2/2001 | Karunasiri et al. ........... 320/119 |
| 6,191,557 B1 | 2/2001 | Gray et al. .................... 320/132 |
| 6,202,739 B1 | 3/2001 | Pal et al. .................. 165/104.33 |
| 6,211,651 B1 | 4/2001 | Nemoto ........................ 320/133 |
| 6,211,653 B1 | 4/2001 | Stasko ......................... 320/132 |
| 6,215,275 B1 | 4/2001 | Bean ............................ 320/106 |
| 6,218,805 B1 | 4/2001 | Melcher ....................... 320/105 |
| 6,218,936 B1 | 4/2001 | Imao ............................ 340/447 |
| 6,222,342 B1 | 4/2001 | Eggert et al. ................. 320/105 |
| 6,222,369 B1 | 4/2001 | Champlin ..................... 324/430 |
| D442,503 S | 5/2001 | Lundbeck et al. ............. D10/77 |
| 6,225,808 B1 | 5/2001 | Varghese et al. ............. 324/426 |
| 6,225,898 B1 | 5/2001 | Kamiya et al. ............... 340/505 |
| 6,236,186 B1 | 5/2001 | Helton et al. ................. 320/106 |
| 6,236,332 B1 | 5/2001 | Conkright et al. ............. 340/3.1 |
| 6,236,949 B1 | 5/2001 | Hart ............................... 702/64 |
| 6,238,253 B1 | 5/2001 | Qualls ........................... 439/759 |
| 6,242,887 B1 | 6/2001 | Burke ........................... 320/104 |
| 6,242,921 B1 | 6/2001 | Thibedeau et al. ........... 324/429 |
| 6,249,124 B1 | 6/2001 | Bertness ...................... 324/426 |

(56) References Cited

U.S. PATENT DOCUMENTS

| | | | |
|---|---|---|---|
| 6,250,973 B1 | 6/2001 | Lowery et al. | 439/763 |
| 6,252,942 B1 | 6/2001 | Zoiss | 379/19 |
| 6,254,438 B1 | 7/2001 | Gaunt | 439/755 |
| 6,255,826 B1 | 7/2001 | Ohsawa | 320/116 |
| 6,259,170 B1 | 7/2001 | Limoge et al. | 307/10.8 |
| 6,259,254 B1 | 7/2001 | Klang | 324/427 |
| 6,262,563 B1 | 7/2001 | Champlin | 320/134 |
| 6,262,692 B1 | 7/2001 | Babb | 343/895 |
| 6,263,268 B1 | 7/2001 | Nathanson | 701/29 |
| 6,263,322 B1 | 7/2001 | Kirkevold et al. | 705/400 |
| 6,271,643 B1 | 8/2001 | Becker et al. | 320/112 |
| 6,271,748 B1 | 8/2001 | Derbyshire et al. | 340/442 |
| 6,272,387 B1 | 8/2001 | Yoon | 700/83 |
| 6,275,008 B1 | 8/2001 | Arai et al. | 320/132 |
| 6,285,191 B1 | 9/2001 | Gollomp et al. | 324/427 |
| 6,294,896 B1 | 9/2001 | Champlin | 320/134 |
| 6,294,897 B1 | 9/2001 | Champlin | 320/153 |
| 6,304,087 B1 | 10/2001 | Bertness | 324/426 |
| 6,307,349 B1 | 10/2001 | Koenck et al. | 320/112 |
| 6,310,481 B2 | 10/2001 | Bertness | 324/430 |
| 6,313,607 B1 | 11/2001 | Champlin | 320/132 |
| 6,313,608 B1 | 11/2001 | Varghese et al. | 320/132 |
| 6,316,914 B1 | 11/2001 | Bertness | 320/134 |
| 6,320,385 B1 | 11/2001 | Ng et al. | 320/104 |
| 6,323,650 B1 | 11/2001 | Bertness et al. | 324/426 |
| 6,324,042 B1 | 11/2001 | Andrews | 361/93.2 |
| 6,329,793 B1 | 12/2001 | Bertness et al. | 320/132 |
| 6,331,762 B1 | 12/2001 | Bertness | 320/134 |
| 6,332,113 B1 | 12/2001 | Bertness | 702/63 |
| 6,346,795 B2 | 2/2002 | Haraguchi et al. | 320/136 |
| 6,347,958 B1 | 2/2002 | Tsai | 439/488 |
| 6,351,102 B1 | 2/2002 | Troy | 320/139 |
| 6,356,042 B1 | 3/2002 | Kahlon et al. | 318/138 |
| 6,356,083 B1 | 3/2002 | Ying | 324/426 |
| 6,359,441 B1 | 3/2002 | Bertness | 324/426 |
| 6,359,442 B1 | 3/2002 | Henningson et al. | 324/426 |
| 6,363,303 B1 | 3/2002 | Bertness | 701/29 |
| RE37,677 E | 4/2002 | Irie | 315/83 |
| 6,377,031 B1 | 4/2002 | Karuppana et al. | 323/220 |
| 6,384,608 B1 | 5/2002 | Namaky | 324/430 |
| 6,388,448 B1 | 5/2002 | Cervas | 324/426 |
| 6,389,337 B1 | 5/2002 | Kolls | 701/31.6 |
| 6,392,414 B2 | 5/2002 | Bertness | 324/429 |
| 6,396,278 B1 | 5/2002 | Makhija | 324/402 |
| 6,407,554 B1 | 6/2002 | Godau et al. | 324/503 |
| 6,411,098 B1 | 6/2002 | Laletin | 324/436 |
| 6,417,669 B1 | 7/2002 | Champlin | 324/426 |
| 6,420,852 B1 | 7/2002 | Sato | 320/134 |
| 6,424,157 B1 | 7/2002 | Gollomp et al. | 324/430 |
| 6,424,158 B2 | 7/2002 | Klang | 324/433 |
| 6,426,606 B1 | 7/2002 | Purkey | |
| 6,433,512 B1 | 8/2002 | Birkler et al. | 320/132 |
| 6,437,957 B1 | 8/2002 | Karuppana et al. | 361/78 |
| 6,441,585 B1 | 8/2002 | Bertness | 320/132 |
| 6,445,158 B1 | 9/2002 | Bertness et al. | 320/104 |
| 6,448,778 B1 | 9/2002 | Rankin | 324/503 |
| 6,449,726 B1 | 9/2002 | Smith | 713/340 |
| 6,456,036 B1 | 9/2002 | Thandiwe | 320/106 |
| 6,456,045 B1 | 9/2002 | Troy et al. | 320/139 |
| 6,465,908 B1 | 10/2002 | Karuppana et al. | 307/31 |
| 6,466,025 B1 | 10/2002 | Klang | 324/429 |
| 6,466,026 B1 | 10/2002 | Champlin | 324/430 |
| 6,469,511 B1 | 10/2002 | Vonderhaar et al. | 324/425 |
| 6,473,659 B1 | 10/2002 | Shah et al. | 700/79 |
| 6,477,478 B1 | 11/2002 | Jones et al. | 702/102 |
| 6,495,990 B2 | 12/2002 | Champlin | 320/132 |
| 6,497,209 B1 | 12/2002 | Karuppana et al. | 123/179.3 |
| 6,500,025 B1 | 12/2002 | Moenkhaus et al. | 439/502 |
| 6,501,243 B1 | 12/2002 | Kaneko | 318/139 |
| 6,505,507 B1 | 1/2003 | Imao | 73/146.5 |
| 6,507,196 B2 | 1/2003 | Thomsen et al. | 324/436 |
| 6,526,361 B1 | 2/2003 | Jones et al. | 702/63 |
| 6,529,723 B1 | 3/2003 | Bentley | 455/405 |
| 6,531,847 B1 | 3/2003 | Tsukamoto et al. | |
| 6,531,848 B1 | 3/2003 | Chitsazan et al. | 320/153 |
| 6,532,425 B1 | 3/2003 | Boost et al. | 702/63 |
| 6,533,316 B2 | 3/2003 | Breed et al. | 280/735 |
| 6,534,992 B2 | 3/2003 | Meissner et al. | 324/426 |
| 6,534,993 B2 | 3/2003 | Bertness | 324/433 |
| 6,536,536 B1 | 3/2003 | Gass et al. | 173/2 |
| 6,544,078 B2 | 4/2003 | Palmisano et al. | 439/762 |
| 6,545,599 B2 | 4/2003 | Derbyshire et al. | 340/442 |
| 6,556,019 B2 | 4/2003 | Bertness | 324/426 |
| 6,566,883 B1 | 5/2003 | Vonderhaar et al. | 324/426 |
| 6,570,385 B1 | 5/2003 | Roberts et al. | 324/378 |
| 6,573,685 B2 | 6/2003 | Nakanishi et al. | |
| 6,577,107 B2 | 6/2003 | Kechmire | 320/139 |
| 6,586,941 B2 | 7/2003 | Bertness et al. | 324/426 |
| 6,597,150 B1 | 7/2003 | Bertness et al. | 320/104 |
| 6,599,243 B2 | 7/2003 | Woltermann et al. | 600/300 |
| 6,600,815 B1 | 7/2003 | Walding | 379/93.07 |
| 6,611,740 B2 | 8/2003 | Lowrey et al. | 701/29 |
| 6,614,349 B1 | 9/2003 | Proctor et al. | 340/572.1 |
| 6,618,644 B2 | 9/2003 | Bean | 700/231 |
| 6,621,272 B2 | 9/2003 | Champlin | 324/426 |
| 6,623,314 B1 | 9/2003 | Cox et al. | 439/759 |
| 6,624,635 B1 | 9/2003 | Lui | 324/426 |
| 6,628,011 B2 | 9/2003 | Droppo et al. | 307/43 |
| 6,629,054 B2 | 9/2003 | Makhija et al. | 702/113 |
| 6,633,165 B2 | 10/2003 | Bertness | 324/426 |
| 6,635,974 B1 | 10/2003 | Karuppana et al. | 307/140 |
| 6,636,790 B1 | 10/2003 | Lightner et al. | 701/31.5 |
| 6,667,624 B1 | 12/2003 | Raichle et al. | 324/522 |
| 6,679,212 B2 | 1/2004 | Kelling | 123/179.28 |
| 6,686,542 B2 | 2/2004 | Zhang | 174/74 |
| 6,696,819 B2 | 2/2004 | Bertness | 320/134 |
| 6,707,303 B2 | 3/2004 | Bertness et al. | 324/426 |
| 6,732,031 B1 | 5/2004 | Lightner et al. | 701/31.4 |
| 6,736,941 B2 | 5/2004 | Oku et al. | 203/68 |
| 6,737,831 B2 | 5/2004 | Champlin | 320/132 |
| 6,738,697 B2 | 5/2004 | Breed | 701/29 |
| 6,740,990 B2 | 5/2004 | Tozuka et al. | 307/9.1 |
| 6,744,149 B1 | 6/2004 | Karuppana et al. | 307/31 |
| 6,745,153 B2 | 6/2004 | White et al. | 702/184 |
| 6,759,849 B2 | 7/2004 | Bertness | 324/426 |
| 6,771,073 B2 | 8/2004 | Henningson et al. | 324/426 |
| 6,777,945 B2 | 8/2004 | Roberts et al. | 324/426 |
| 6,781,344 B1 | 8/2004 | Hedegor et al. | 320/106 |
| 6,781,382 B2 | 8/2004 | Johnson | 324/426 |
| 6,784,635 B2 | 8/2004 | Larson | 320/104 |
| 6,784,637 B2 | 8/2004 | Raichle et al. | 320/107 |
| 6,788,025 B2 | 9/2004 | Bertness et al. | 320/104 |
| 6,795,782 B2 | 9/2004 | Bertness et al. | 702/63 |
| 6,796,841 B1 | 9/2004 | Cheng et al. | 439/620.3 |
| 6,805,090 B2 | 10/2004 | Bertness et al. | 123/198 |
| 6,806,716 B2 | 10/2004 | Bertness et al. | 324/426 |
| 6,825,669 B2 | 11/2004 | Raichle et al. | 324/426 |
| 6,832,141 B2 | 12/2004 | Skeen et al. | 701/31.4 |
| 6,842,707 B2 | 1/2005 | Raichle et al. | 702/62 |
| 6,845,279 B1 | 1/2005 | Gilmore et al. | 700/115 |
| 6,850,037 B2 | 2/2005 | Bertness | 320/132 |
| 6,856,162 B1 | 2/2005 | Greatorex et al. | 324/764.01 |
| 6,856,972 B1 | 2/2005 | Yun et al. | 705/36 R |
| 6,871,151 B2 | 3/2005 | Bertness | 702/63 |
| 6,885,195 B2 | 4/2005 | Bertness | 324/426 |
| 6,888,468 B2 | 5/2005 | Bertness | 340/636.15 |
| 6,891,378 B2 | 5/2005 | Bertness et al. | 324/426 |
| 6,895,809 B2 | 5/2005 | Raichle | 73/119 |
| 6,904,796 B2 | 6/2005 | Pacsai et al. | 73/146.8 |
| 6,906,522 B2 | 6/2005 | Bertness et al. | 324/426 |
| 6,906,523 B2 | 6/2005 | Bertness et al. | 324/426 |
| 6,906,624 B2 | 6/2005 | McClelland et al. | 340/442 |
| 6,909,287 B2 | 6/2005 | Bertness | 324/427 |
| 6,909,356 B2 | 6/2005 | Brown et al. | 340/3.2 |
| 6,911,825 B2 | 6/2005 | Namaky | 324/426 |
| 6,913,483 B2 | 7/2005 | Restaino et al. | 439/504 |
| 6,914,413 B2 | 7/2005 | Bertness et al. | 320/104 |
| 6,919,725 B2 | 7/2005 | Bertness et al. | 324/433 |
| 6,930,485 B2 | 8/2005 | Bertness et al. | 324/426 |
| 6,933,727 B2 | 8/2005 | Bertness et al. | 324/426 |
| 6,941,234 B2 | 9/2005 | Bertness et al. | 702/63 |
| 6,957,133 B1 | 10/2005 | Hunt et al. | 701/32.4 |
| 6,961,445 B1 | 11/2005 | Jensen et al. | |
| 6,966,676 B2 | 11/2005 | Chabert et al. | |

(56) References Cited

U.S. PATENT DOCUMENTS

| | | | |
|---|---|---|---|
| 6,967,484 B2 | 11/2005 | Bertness | 324/426 |
| 6,972,662 B1 | 12/2005 | Ohkawa et al. | 340/10.1 |
| 6,983,212 B2 | 1/2006 | Burns | 702/63 |
| 6,988,053 B2 | 1/2006 | Namaky | 320/104 |
| 6,993,421 B2 | 1/2006 | Pillar et al. | 701/29.4 |
| 6,998,847 B2 | 2/2006 | Bertness et al. | 324/426 |
| 7,003,410 B2 | 2/2006 | Bertness et al. | 702/63 |
| 7,003,411 B2 | 2/2006 | Bertness | 702/63 |
| 7,012,433 B2 | 3/2006 | Smith et al. | 324/426 |
| 7,015,674 B2 | 3/2006 | VonderHaar | 320/103 |
| 7,029,338 B1 | 4/2006 | Orange et al. | 439/755 |
| 7,034,541 B2 | 4/2006 | Bertness et al. | 324/426 |
| 7,039,533 B2 | 5/2006 | Bertness et al. | 702/63 |
| 7,042,346 B2 | 5/2006 | Paulsen | 340/438 |
| 7,049,822 B2 | 5/2006 | Kung | 324/426 |
| 7,058,525 B2 | 6/2006 | Bertness et al. | 702/63 |
| 7,069,979 B2 | 7/2006 | Tobias | 165/104.33 |
| 7,081,755 B2 | 7/2006 | Klang et al. | 324/426 |
| 7,089,127 B2 | 8/2006 | Thibedeau et al. | 702/63 |
| 7,098,666 B2 | 8/2006 | Patino | 324/433 |
| 7,102,556 B2 | 9/2006 | White | 341/141 |
| 7,106,070 B2 | 9/2006 | Bertness et al. | 324/538 |
| 7,116,109 B2 | 10/2006 | Klang | 324/426 |
| 7,119,686 B2 | 10/2006 | Bertness et al. | 340/572.1 |
| 7,120,488 B2 | 10/2006 | Nova et al. | 600/2 |
| 7,126,341 B2 | 10/2006 | Bertness et al. | 324/426 |
| 7,129,706 B2 | 10/2006 | Kalley | 324/426 |
| 7,154,276 B2 | 12/2006 | Bertness | 324/503 |
| 7,170,393 B2 | 1/2007 | Martin | 340/10.1 |
| 7,173,182 B2 | 2/2007 | Katsuyama | 174/36 |
| 7,177,925 B2 | 2/2007 | Carcido et al. | 709/223 |
| 7,182,147 B2 | 2/2007 | Cutler et al. | 173/1 |
| 7,184,866 B2 | 2/2007 | Squires | 340/426.15 |
| 7,184,905 B2 | 2/2007 | Stefan | 702/63 |
| 7,198,510 B2 | 4/2007 | Bertness | 439/500 |
| 7,200,424 B2 | 4/2007 | Tischer et al. | 455/567 |
| 7,202,636 B2 | 4/2007 | Reynolds et al. | 320/166 |
| 7,208,914 B2 | 4/2007 | Klang | 320/132 |
| 7,209,850 B2 | 4/2007 | Brott et al. | 324/426 |
| 7,209,860 B2 | 4/2007 | Trsar et al. | 702/183 |
| 7,212,887 B2 | 5/2007 | Shah et al. | 700/276 |
| 7,212,911 B2 | 5/2007 | Raichle et al. | 701/114 |
| 7,219,023 B2 | 5/2007 | Banke et al. | 702/58 |
| 7,233,128 B2 | 6/2007 | Brost et al. | 320/132 |
| 7,235,977 B2 | 6/2007 | Koran et al. | 324/426 |
| 7,246,015 B2 | 7/2007 | Bertness et al. | 702/63 |
| 7,251,551 B2 | 7/2007 | Mitsueda | 700/2 |
| 7,272,519 B2 | 9/2007 | Lesesky et al. | 702/63 |
| 7,287,001 B1 | 10/2007 | Falls et al. | 705/22 |
| 7,295,936 B2 | 11/2007 | Bertness et al. | 702/63 |
| 7,301,303 B1 | 11/2007 | Hulden | 320/103 |
| 7,319,304 B2 | 1/2008 | Veloo et al. | 320/134 |
| 7,339,477 B2 | 3/2008 | Puzio et al. | 340/572.1 |
| 7,363,175 B2 | 4/2008 | Bertness et al. | 702/63 |
| 7,376,497 B2 | 5/2008 | Chen | 701/31.6 |
| 7,398,176 B2 | 7/2008 | Bertness | 702/140 |
| 7,408,358 B2 | 8/2008 | Knopf | 324/426 |
| 7,425,833 B2 | 9/2008 | Bertness et al. | 324/426 |
| 7,446,536 B2 | 11/2008 | Bertness | 324/426 |
| 7,453,238 B2 | 11/2008 | Melichar | 320/132 |
| 7,479,763 B2 | 1/2009 | Bertness | 320/134 |
| 7,498,767 B2 | 3/2009 | Brown et al. | 320/107 |
| 7,501,795 B2 | 3/2009 | Bertness et al. | 320/134 |
| 7,504,830 B2 | 3/2009 | Keuss | |
| 7,505,856 B2 | 3/2009 | Restaino et al. | 702/63 |
| 7,538,571 B2 | 5/2009 | Raichle et al. | 324/772 |
| 7,545,146 B2 | 6/2009 | Klang et al. | 324/426 |
| 7,557,586 B1 | 7/2009 | Vonderhaar et al. | 324/437 |
| 7,571,035 B2 | 8/2009 | Raichle | |
| 7,590,476 B2 | 9/2009 | Shumate | 701/31.6 |
| 7,592,776 B2 | 9/2009 | Tsukamoto et al. | 320/136 |
| 7,595,643 B2 | 9/2009 | Klang | 324/426 |
| 7,596,437 B1 | 9/2009 | Hunt et al. | |
| 7,598,699 B2 | 10/2009 | Restaino et al. | 320/105 |
| 7,598,743 B2 | 10/2009 | Bertness | 324/426 |
| 7,598,744 B2 | 10/2009 | Bertness et al. | 324/426 |
| 7,619,417 B2 | 11/2009 | Klang | 324/427 |
| 7,642,786 B2 | 1/2010 | Philbrook | 324/426 |
| 7,642,787 B2 | 1/2010 | Bertness et al. | 324/426 |
| 7,656,162 B2 | 2/2010 | Vonderhaar et al. | 324/426 |
| 7,657,386 B2 | 2/2010 | Thibedeau et al. | 702/63 |
| 7,667,437 B2 | 2/2010 | Johnson et al. | 320/150 |
| 7,679,325 B2 | 3/2010 | Seo | 320/116 |
| 7,684,908 B1 | 3/2010 | Ogilvie et al. | 701/29.6 |
| 7,688,074 B2 | 3/2010 | Cox et al. | 324/426 |
| 7,690,573 B2 | 4/2010 | Raichle et al. | 235/462 |
| 7,696,759 B2 | 4/2010 | Raichle et al. | 324/538 |
| 7,698,179 B2 | 4/2010 | Leung et al. | 705/28 |
| 7,705,602 B2 | 4/2010 | Bertness | 324/426 |
| 7,706,991 B2 | 4/2010 | Bertness et al. | 702/63 |
| 7,706,992 B2 | 4/2010 | Ricci et al. | |
| 7,710,119 B2 | 5/2010 | Bertness | 324/426 |
| 7,723,993 B2 | 5/2010 | Klang | 324/431 |
| 7,728,556 B2 | 6/2010 | Yano et al. | 320/134 |
| 7,728,597 B2 | 6/2010 | Bertness | 324/426 |
| 7,729,880 B1 | 6/2010 | Mashburn | 702/151 |
| 7,743,788 B2 | 6/2010 | Schmitt | 137/554 |
| 7,751,953 B2 | 7/2010 | Namaky | 701/33.2 |
| 7,772,850 B2 | 8/2010 | Bertness | 324/426 |
| 7,774,130 B2 | 8/2010 | Pepper | 340/439 |
| 7,774,151 B2 | 8/2010 | Bertness | 702/63 |
| 7,777,612 B2 | 8/2010 | Sampson et al. | 340/426.1 |
| 7,791,348 B2 | 9/2010 | Brown et al. | 324/426 |
| 7,797,995 B2 | 9/2010 | Schaefer | |
| 7,808,375 B2 | 10/2010 | Bertness et al. | 340/455 |
| 7,848,857 B2 | 12/2010 | Nasr et al. | 701/22 |
| 7,883,002 B2 | 2/2011 | Jin et al. | 235/376 |
| 7,902,990 B2 | 3/2011 | Delmonico et al. | 340/636.1 |
| 7,914,350 B1 | 3/2011 | Bozich | 439/506 |
| 7,924,015 B2 | 4/2011 | Bertness | 324/427 |
| 7,940,052 B2 | 5/2011 | Vonderhaar | |
| 7,940,053 B2 | 5/2011 | Brown et al. | 324/426 |
| 7,959,476 B2 | 6/2011 | Smith et al. | |
| 7,977,914 B2 | 7/2011 | Bertness | |
| D643,759 S | 8/2011 | Bertness | |
| 7,990,155 B2 | 8/2011 | Henningson | 324/429 |
| 7,999,505 B2 | 8/2011 | Bertness | 320/104 |
| 8,024,083 B2 | 9/2011 | Chenn | 701/2 |
| 8,047,868 B1 | 11/2011 | Korcynski | 439/522 |
| 8,164,343 B2 | 4/2012 | Bertness | 324/503 |
| 8,198,900 B2 | 6/2012 | Bertness et al. | |
| 8,203,345 B2 | 6/2012 | Bertness | |
| 8,222,868 B2 | 7/2012 | Buckner | 320/136 |
| 8,226,008 B2 | 7/2012 | Raichle et al. | 235/462.13 |
| 8,237,448 B2 | 8/2012 | Bertness | |
| 8,306,690 B2 | 11/2012 | Bertness | 701/34.4 |
| 8,310,271 B2 | 11/2012 | Raichle et al. | 324/765.01 |
| 8,344,685 B2 | 1/2013 | Bertness et al. | |
| 8,436,619 B2 | 5/2013 | Bertness et al. | |
| 8,442,877 B2 | 5/2013 | Bertness et al. | |
| 8,449,560 B2 | 5/2013 | Roth | 227/175.1 |
| 8,493,022 B2 | 7/2013 | Bertness | |
| D687,727 S | 8/2013 | Kehoe et al. | |
| 8,509,212 B2 | 8/2013 | Sanjeev | |
| 8,513,949 B2 | 8/2013 | Bertness | |
| 8,594,957 B2 | 11/2013 | Gauthier | 324/548 |
| 8,674,654 B2 | 3/2014 | Bertness | |
| 8,674,711 B2 | 3/2014 | Bertness | |
| 8,704,483 B2 | 4/2014 | Bertness et al. | |
| 8,738,309 B2 | 5/2014 | Bertness | |
| 8,754,653 B2 | 6/2014 | Volderhaar et al. | |
| 8,810,200 B2 | 8/2014 | Kondo | |
| 8,825,272 B1 | 9/2014 | Chinnadurai | |
| 8,827,729 B2 | 9/2014 | Gunreben | 439/188 |
| 8,872,516 B2 | 10/2014 | Bertness | |
| 8,872,517 B2 | 10/2014 | Philbrook et al. | |
| 8,901,888 B1 | 12/2014 | Beckman | |
| 8,958,998 B2 | 2/2015 | Bertness | |
| 8,963,550 B2 | 2/2015 | Bertness et al. | |
| 9,018,958 B2 | 4/2015 | Bertness | |
| 9,037,394 B2 | 5/2015 | Fernandes | 701/400 |
| 9,052,366 B2 | 6/2015 | Bertness | |
| 9,056,556 B1 | 6/2015 | Hyde et al. | |
| 9,166,261 B2 | 10/2015 | Ibi | |

(56) References Cited

U.S. PATENT DOCUMENTS

| | | |
|---|---|---|
| 9,201,120 B2 | 12/2015 | Stukenburg |
| 9,229,062 B2 | 1/2016 | Stukenberg |
| 9,244,100 B2 | 1/2016 | Coleman et al. |
| 9,255,955 B2 | 2/2016 | Bertness ............... 324/503 |
| 9,274,157 B2 | 3/2016 | Bertness |
| 9,312,575 B2 | 4/2016 | Stukenberg |
| 9,335,362 B2 | 5/2016 | Bertness |
| 9,419,311 B2 | 8/2016 | Bertness |
| 9,425,487 B2 | 8/2016 | Bertness |
| 9,496,720 B2 | 11/2016 | McShane |
| 9,588,185 B2 | 3/2017 | Champlin |
| 9,639,899 B1 | 5/2017 | Gersitz |
| 9,923,289 B2 | 3/2018 | Bertness |
| 9,966,676 B2 | 5/2018 | Salo, III et al. |
| 10,046,649 B2 | 8/2018 | Bertness |
| 10,222,397 B2 | 3/2019 | Salo et al. |
| 10,317,468 B2 | 6/2019 | Bertness |
| 10,429,449 B2 | 10/2019 | Arnoldus |
| 10,473,555 B2 | 11/2019 | Bertness |
| 10,525,841 B2 | 1/2020 | Zhou et al. |
| 10,536,007 B2 | 1/2020 | Beaston |
| 10,608,353 B2 | 3/2020 | Lipkin et al. |
| 10,843,574 B2 | 11/2020 | Palmisano et al. |
| 11,054,480 B2 | 7/2021 | Bertness |
| 11,325,479 B2 | 5/2022 | Bertness |
| 11,474,153 B2 | 10/2022 | Salo, III et al. |
| 11,486,930 B2 | 11/2022 | Salo, III et al. |
| 11,513,160 B2 | 11/2022 | Salo, III et al. |
| 11,545,839 B2 | 1/2023 | Sampson et al. |
| 11,548,404 B2 | 1/2023 | Bertness |
| 11,566,972 B2 | 1/2023 | Sampson et al. |
| 11,650,259 B2 | 5/2023 | Bertness |
| 11,668,779 B2 | 6/2023 | Bertness |
| 11,740,294 B2 | 8/2023 | Bertness |
| 11,745,593 B1 | 9/2023 | Awad Alla |
| 11,926,224 B2 | 3/2024 | Bertness |
| 11,973,202 B2 | 4/2024 | Bertness |
| 12,196,813 B2 | 1/2025 | Bertness |
| 12,237,482 B2 | 2/2025 | Bertness |
| 2001/0012738 A1 | 8/2001 | Duperret ............... 439/835 |
| 2001/0033169 A1 | 10/2001 | Singh ............... 324/426 |
| 2001/0035737 A1 | 11/2001 | Nakanishi et al. ......... 320/122 |
| 2001/0048215 A1 | 12/2001 | Breed et al. ............. 280/728.1 |
| 2001/0048226 A1 | 12/2001 | Nada ............... 290/40 |
| 2002/0003423 A1 | 1/2002 | Bertness et al. ......... 324/426 |
| 2002/0004694 A1 | 1/2002 | McLeod ............... 701/29 |
| 2002/0007237 A1 | 1/2002 | Phung et al. ............. 701/33 |
| 2002/0010558 A1 | 1/2002 | Bertness et al. ......... 702/63 |
| 2002/0018927 A1 | 2/2002 | Thomsen et al. |
| 2002/0021135 A1 | 2/2002 | Li et al. ............... 324/677 |
| 2002/0027346 A1 | 3/2002 | Breed et al. ............. 280/735 |
| 2002/0030495 A1 | 3/2002 | Kechmire ............... 324/427 |
| 2002/0036504 A1 | 3/2002 | Troy et al. ............. 324/430 |
| 2002/0041175 A1 | 4/2002 | Lauper et al. ............ 320/106 |
| 2002/0044050 A1 | 4/2002 | Derbyshire et al. ......... 340/442 |
| 2002/0047711 A1 | 4/2002 | Bertness et al. ......... 324/426 |
| 2002/0050163 A1 | 5/2002 | Makhija et al. ........... 73/116 |
| 2002/0065619 A1 | 5/2002 | Bertness ............... 702/63 |
| 2002/0074398 A1 | 6/2002 | Lancos et al. ............ 235/382 |
| 2002/0116140 A1 | 8/2002 | Rider ............... 702/63 |
| 2002/0118111 A1 | 8/2002 | Brown et al. ............ 340/573.1 |
| 2002/0121877 A1 | 9/2002 | Smith et al. |
| 2002/0121901 A1 | 9/2002 | Hoffman ............... 324/426 |
| 2002/0128985 A1 | 9/2002 | Greenwald ............. 705/400 |
| 2002/0130665 A1 | 9/2002 | Bertness et al. ......... 324/426 |
| 2002/0152791 A1 | 10/2002 | Cardinale |
| 2002/0153864 A1 | 10/2002 | Bertness ............... 320/132 |
| 2002/0171428 A1 | 11/2002 | Bertness ............... 702/63 |
| 2002/0193955 A1 | 12/2002 | Bertness ............... 702/63 |
| 2003/0006779 A1 | 1/2003 | Youval ............... 324/503 |
| 2003/0009270 A1 | 1/2003 | Breed ............... 701/29 |
| 2003/0017753 A1 | 1/2003 | Palmisano et al. ......... 439/762 |
| 2003/0025481 A1 | 2/2003 | Bertness ............... 324/427 |
| 2003/0030442 A1 | 2/2003 | Sugimoto ............... 324/429 |
| 2003/0036909 A1 | 2/2003 | Kato ............... 704/275 |
| 2003/0038637 A1 | 2/2003 | Bertness et al. |
| 2003/0040873 A1 | 2/2003 | Lesesky et al. ............ 702/57 |
| 2003/0060953 A1 | 3/2003 | Chen ............... 701/33 |
| 2003/0078743 A1 | 4/2003 | Bertness et al. ......... 702/63 |
| 2003/0088375 A1 | 5/2003 | Bertness et al. ......... 702/63 |
| 2003/0090272 A1 | 5/2003 | Bertness ............... 324/426 |
| 2003/0114206 A1 | 6/2003 | Timothy ............... 455/575.7 |
| 2003/0124417 A1 | 7/2003 | Bertness et al. ......... 429/90 |
| 2003/0128011 A1 | 7/2003 | Bertness et al. |
| 2003/0128036 A1 | 7/2003 | Henningson et al. ........ 324/426 |
| 2003/0137277 A1 | 7/2003 | Mori et al. ............. 320/132 |
| 2003/0155930 A1 | 8/2003 | Thomsen |
| 2003/0164073 A1 | 9/2003 | Chen |
| 2003/0169018 A1 | 9/2003 | Berels et al. ............ 320/132 |
| 2003/0169019 A1 | 9/2003 | Oosaki ............... 320/132 |
| 2003/0171111 A1 | 9/2003 | Clark ............... 455/414.1 |
| 2003/0173971 A1 | 9/2003 | Bertness ............... 324/441 |
| 2003/0177417 A1 | 9/2003 | Malhotra et al. .......... 714/42 |
| 2003/0184262 A1 | 10/2003 | Makhija ............... 320/156 |
| 2003/0184264 A1 | 10/2003 | Bertness |
| 2003/0184306 A1 | 10/2003 | Bertness et al. ......... 324/426 |
| 2003/0187556 A1 | 10/2003 | Suzuki ............... 701/29 |
| 2003/0194672 A1 | 10/2003 | Roberts et al. ............ 431/196 |
| 2003/0197512 A1 | 10/2003 | Miller et al. ............ 324/426 |
| 2003/0212311 A1 | 11/2003 | Nova et al. ............. 600/300 |
| 2003/0214395 A1 | 11/2003 | Flowerday et al. ......... 340/445 |
| 2003/0224241 A1 | 12/2003 | Takada et al. ............ 429/52 |
| 2003/0236656 A1 | 12/2003 | Dougherty ............. 703/14 |
| 2004/0000590 A1 | 1/2004 | Raichle et al. ........... 235/462.01 |
| 2004/0000891 A1 | 1/2004 | Raichle et al. ........... 320/107 |
| 2004/0000893 A1 | 1/2004 | Raichle et al. ........... 320/135 |
| 2004/0000913 A1 | 1/2004 | Raichle et al. ........... 324/426 |
| 2004/0000915 A1 | 1/2004 | Raichle et al. ........... 324/522 |
| 2004/0002824 A1 | 1/2004 | Raichle et al. ........... 702/63 |
| 2004/0002825 A1 | 1/2004 | Raichle et al. ........... 702/63 |
| 2004/0002836 A1 | 1/2004 | Raichle et al. ........... 702/188 |
| 2004/0032264 A1 | 2/2004 | Schoch ............... 324/426 |
| 2004/0036443 A1 | 2/2004 | Bertness ............... 320/109 |
| 2004/0044452 A1 | 3/2004 | Bauer et al. ............. 703/33 |
| 2004/0044454 A1 | 3/2004 | Ross et al. ............. 701/33 |
| 2004/0046564 A1 | 3/2004 | Klang ............... 324/426 |
| 2004/0049361 A1 | 3/2004 | Hamdan et al. ........... 702/115 |
| 2004/0051532 A1 | 3/2004 | Smith et al. ............ 324/426 |
| 2004/0051533 A1 | 3/2004 | Namaky ............... 324/426 |
| 2004/0051534 A1 | 3/2004 | Kobayashi et al. .......... 324/429 |
| 2004/0054503 A1 | 3/2004 | Namaky ............... 702/182 |
| 2004/0064225 A1 | 4/2004 | Jammu et al. ............ 701/29 |
| 2004/0065489 A1 | 4/2004 | Aberle ............... 180/65.1 |
| 2004/0088087 A1 | 5/2004 | Fukushima et al. ......... 701/32 |
| 2004/0090208 A1 | 5/2004 | Almerich |
| 2004/0104728 A1 | 6/2004 | Bertness et al. ......... 324/429 |
| 2004/0108855 A1 | 6/2004 | Raichle ............... 324/378 |
| 2004/0108856 A1 | 6/2004 | Johnson ............... 324/426 |
| 2004/0113494 A1 | 6/2004 | Karuppana et al. |
| 2004/0113588 A1 | 6/2004 | Mikuriya et al. .......... 320/128 |
| 2004/0145342 A1 | 7/2004 | Lyon ............... 320/108 |
| 2004/0145371 A1 | 7/2004 | Bertness ............... 324/426 |
| 2004/0150494 A1 | 8/2004 | Yoshida ............... 333/243 |
| 2004/0157113 A1 | 8/2004 | Klang ............... 429/50 |
| 2004/0164706 A1 | 8/2004 | Osborne ............... 320/116 |
| 2004/0172177 A1 | 9/2004 | Nagai et al. ............ 701/29 |
| 2004/0178185 A1 | 9/2004 | Yoshikawa et al. ......... 219/270 |
| 2004/0189309 A1 | 9/2004 | Bertness et al. ......... 324/426 |
| 2004/0199343 A1 | 10/2004 | Cardinal et al. .......... 702/63 |
| 2004/0207367 A1 | 10/2004 | Taniguchi et al. .......... 320/149 |
| 2004/0212350 A1 | 10/2004 | Patino et al. |
| 2004/0221641 A1 | 11/2004 | Moritsugu ............. 73/23.31 |
| 2004/0227523 A1 | 11/2004 | Namaky ............... 324/537 |
| 2004/0239332 A1 | 12/2004 | Mackel et al. ............ 324/426 |
| 2004/0251876 A1 | 12/2004 | Bertness et al. ......... 320/136 |
| 2004/0251907 A1 | 12/2004 | Kalley |
| 2004/0257084 A1 | 12/2004 | Restaino ............... 324/400 |
| 2005/0007068 A1 | 1/2005 | Johnson et al. ........... 320/110 |
| 2005/0009122 A1 | 1/2005 | Whelan et al. ............ 435/7.32 |
| 2005/0017726 A1 | 1/2005 | Koran et al. ............. 324/433 |
| 2005/0017952 A1 | 1/2005 | His ............... 345/169 |
| 2005/0021197 A1 | 1/2005 | Zimmerman ............. 701/31.4 |
| 2005/0021294 A1 | 1/2005 | Trsar et al. ............. 702/183 |
| 2005/0021475 A1 | 1/2005 | Bertness ............... 705/63 |

(56) References Cited

U.S. PATENT DOCUMENTS

| Publication No. | Date | Name | Ref |
|---|---|---|---|
| 2005/0025299 A1 | 2/2005 | Tischer et al. | 379/199 |
| 2005/0035752 A1 | 2/2005 | Bertness | |
| 2005/0043868 A1 | 2/2005 | Mitcham | 701/29 |
| 2005/0057256 A1 | 3/2005 | Bertness | 324/426 |
| 2005/0060070 A1 | 3/2005 | Kapolka et al. | 701/29 |
| 2005/0073314 A1 | 4/2005 | Bertness et al. | 324/433 |
| 2005/0076381 A1 | 4/2005 | Gross | 725/107 |
| 2005/0077904 A1 | 4/2005 | Bertness | 324/426 |
| 2005/0096809 A1 | 5/2005 | Skeen et al. | 701/29 |
| 2005/0099185 A1 | 5/2005 | Klang | |
| 2005/0102073 A1 | 5/2005 | Ingram | 701/29 |
| 2005/0119809 A1 | 6/2005 | Chen | 701/33.5 |
| 2005/0128083 A1 | 6/2005 | Puzio et al. | 340/572.1 |
| 2005/0128902 A1 | 6/2005 | Tsai | 369/44.32 |
| 2005/0133245 A1 | 6/2005 | Katsuyama | 174/74 R |
| 2005/0134282 A1 | 6/2005 | Averbuch | 324/426 |
| 2005/0143882 A1 | 6/2005 | Umezawa | 701/29 |
| 2005/0159847 A1 | 7/2005 | Shah et al. | 700/276 |
| 2005/0162172 A1 | 7/2005 | Bertness | 324/426 |
| 2005/0168226 A1 | 8/2005 | Quint et al. | 324/426 |
| 2005/0173142 A1 | 8/2005 | Cutler et al. | 173/181 |
| 2005/0182536 A1 | 8/2005 | Doyle et al. | 701/29 |
| 2005/0184732 A1 | 8/2005 | Restaino | 324/426 |
| 2005/0192045 A1 | 9/2005 | Lowles | |
| 2005/0206346 A1 | 9/2005 | Smith et al. | |
| 2005/0212521 A1 | 9/2005 | Bertness et al. | 324/426 |
| 2005/0213874 A1 | 9/2005 | Kline | 385/15 |
| 2005/0214144 A1 | 9/2005 | Yoshida | |
| 2005/0218902 A1 | 10/2005 | Restaino et al. | 324/433 |
| 2005/0231205 A1 | 10/2005 | Bertness et al. | 324/426 |
| 2005/0254106 A9 | 11/2005 | Silverbrook et al. | 358/539 |
| 2005/0256617 A1 | 11/2005 | Cawthorne et al. | 701/22 |
| 2005/0258241 A1 | 11/2005 | McNutt et al. | 235/385 |
| 2005/0264296 A1 | 12/2005 | Philbrook | 324/433 |
| 2005/0269880 A1 | 12/2005 | Konishi | 307/10.7 |
| 2005/0273218 A1 | 12/2005 | Breed | 701/2 |
| 2006/0012330 A1 | 1/2006 | Okumura et al. | 320/103 |
| 2006/0017447 A1 | 1/2006 | Bertness | 324/538 |
| 2006/0026017 A1 | 2/2006 | Walkder | 701/31.4 |
| 2006/0030980 A1 | 2/2006 | St. Denis | 701/29 |
| 2006/0038572 A1 | 2/2006 | Philbrook | |
| 2006/0043976 A1 | 3/2006 | Gervais | 324/508 |
| 2006/0061469 A1 | 3/2006 | Jaeger | 340/539.13 |
| 2006/0076923 A1 | 4/2006 | Eaves | 320/112 |
| 2006/0079203 A1 | 4/2006 | Nicolini | 455/411 |
| 2006/0089767 A1 | 4/2006 | Sowa | 701/29 |
| 2006/0090554 A1 | 5/2006 | Krampitz | |
| 2006/0090555 A1 | 5/2006 | Krampitz | |
| 2006/0091597 A1 | 5/2006 | Opsahl | |
| 2006/0092584 A1 | 5/2006 | Raichle | |
| 2006/0095230 A1 | 5/2006 | Grier et al. | 702/183 |
| 2006/0102397 A1 | 5/2006 | Buck | 429/432 |
| 2006/0125482 A1 | 6/2006 | Klang | |
| 2006/0136119 A1 | 6/2006 | Raichle | |
| 2006/0139167 A1 | 6/2006 | Davie | |
| 2006/0152224 A1 | 7/2006 | Kim et al. | 324/430 |
| 2006/0155439 A1 | 7/2006 | Slawinski | 701/33.4 |
| 2006/0161313 A1 | 7/2006 | Rogers et al. | 701/1 |
| 2006/0161390 A1 | 7/2006 | Namaky et al. | 702/183 |
| 2006/0217914 A1 | 9/2006 | Bertness | 702/113 |
| 2006/0244456 A1 | 11/2006 | Henningson | |
| 2006/0244457 A1 | 11/2006 | Henningson et al. | 324/426 |
| 2006/0282227 A1 | 12/2006 | Bertness | |
| 2006/0282323 A1 | 12/2006 | Walker et al. | 705/14 |
| 2007/0005201 A1 | 1/2007 | Chenn | 701/31.5 |
| 2007/0024460 A1 | 2/2007 | Clark | 340/663 |
| 2007/0026916 A1 | 2/2007 | Juds et al. | 463/1 |
| 2007/0046261 A1 | 3/2007 | Porebski | 320/132 |
| 2007/0069734 A1 | 3/2007 | Bertness | |
| 2007/0082652 A1 | 4/2007 | Hartigan | |
| 2007/0088472 A1 | 4/2007 | Ganzhorn et al. | 701/33 |
| 2007/0108942 A1 | 5/2007 | Johnson et al. | 320/112 |
| 2007/0159177 A1 | 7/2007 | Bertness et al. | 324/426 |
| 2007/0182576 A1 | 8/2007 | Proska et al. | 340/636.1 |
| 2007/0194791 A1 | 8/2007 | Huang | 324/430 |
| 2007/0194793 A1 | 8/2007 | Bertness | 324/503 |
| 2007/0205752 A1 | 9/2007 | Leigh | 324/500 |
| 2007/0205983 A1 | 9/2007 | Naimo | 345/160 |
| 2007/0210801 A1 | 9/2007 | Krampitz | 324/426 |
| 2007/0244660 A1 | 10/2007 | Bertness | |
| 2007/0259256 A1 | 11/2007 | Le Canut et al. | 429/90 |
| 2007/0279066 A1 | 12/2007 | Chism | 324/437 |
| 2008/0023547 A1 | 1/2008 | Raichle et al. | 235/462.13 |
| 2008/0036421 A1 | 2/2008 | Seo et al. | 320/132 |
| 2008/0053716 A1 | 3/2008 | Scheucher | 180/2.1 |
| 2008/0059014 A1 | 3/2008 | Nasr et al. | 701/22 |
| 2008/0064559 A1 | 3/2008 | Cawthorne | 477/5 |
| 2008/0086246 A1 | 4/2008 | Bolt et al. | 701/29 |
| 2008/0087479 A1 | 4/2008 | Kang | |
| 2008/0094068 A1 | 4/2008 | Scott | 324/426 |
| 2008/0103656 A1 | 5/2008 | Lipscomb | 701/33.4 |
| 2008/0106267 A1 | 5/2008 | Bertness | 320/112 |
| 2008/0169818 A1 | 7/2008 | Lesesky et al. | 324/426 |
| 2008/0179122 A1 | 7/2008 | Sugawara | 180/65.245 |
| 2008/0194984 A1 | 8/2008 | Keefe | 600/559 |
| 2008/0238357 A1 | 10/2008 | Bourilkov et al. | |
| 2008/0256815 A1 | 10/2008 | Schafer | |
| 2008/0303528 A1 | 12/2008 | Kim | 324/430 |
| 2008/0303529 A1 | 12/2008 | Nakamura et al. | 324/433 |
| 2008/0315830 A1 | 12/2008 | Bertness | 320/104 |
| 2009/0006476 A1 | 1/2009 | Andreasen et al. | 707/104.1 |
| 2009/0011327 A1 | 1/2009 | Okumura et al. | 429/99 |
| 2009/0013521 A1 | 1/2009 | Okumura et al. | 29/730 |
| 2009/0024266 A1 | 1/2009 | Bertness | 701/22 |
| 2009/0024419 A1 | 1/2009 | McClellan | 705/4 |
| 2009/0085571 A1 | 4/2009 | Bertness | 324/426 |
| 2009/0146610 A1 | 6/2009 | Trigiani | |
| 2009/0146800 A1 | 6/2009 | Grimlund et al. | 340/505 |
| 2009/0160395 A1 | 6/2009 | Chen | 320/101 |
| 2009/0184165 A1 | 7/2009 | Bertness et al. | |
| 2009/0198372 A1 | 8/2009 | Hammerslag | 700/226 |
| 2009/0203247 A1 | 8/2009 | Fifelski | 439/345 |
| 2009/0237029 A1 | 9/2009 | Andelfinger | 320/108 |
| 2009/0237086 A1 | 9/2009 | Andelfinger | 324/431 |
| 2009/0247020 A1 | 10/2009 | Gathman et al. | 439/759 |
| 2009/0251151 A1 | 10/2009 | Miyashita | |
| 2009/0259432 A1 | 10/2009 | Liberty | 702/150 |
| 2009/0265121 A1 | 10/2009 | Rocci | 702/57 |
| 2009/0273451 A1 | 11/2009 | Soppera et al. | |
| 2009/0276115 A1 | 11/2009 | Chen | 701/32 |
| 2009/0311919 A1 | 12/2009 | Smith | 439/759 |
| 2010/0023198 A1 | 1/2010 | Hamilton | 701/29 |
| 2010/0039065 A1 | 2/2010 | Kinkade | 320/104 |
| 2010/0052193 A1 | 3/2010 | Sylvester | 261/26 |
| 2010/0066283 A1 | 3/2010 | Kitanaka | 318/400.02 |
| 2010/0088050 A1 | 4/2010 | Keuss | 702/63 |
| 2010/0094496 A1 | 4/2010 | Hershkovitz et al. | |
| 2010/0117603 A1 | 5/2010 | Makhija | 320/162 |
| 2010/0145780 A1 | 6/2010 | Nishikawa et al. | 705/14.11 |
| 2010/0161527 A1 | 6/2010 | Cornett | |
| 2010/0214055 A1 | 8/2010 | Fuji | 340/3.1 |
| 2010/0265131 A1 | 10/2010 | Fabius | |
| 2010/0314950 A1 | 12/2010 | Rutkowski et al. | 307/125 |
| 2011/0004427 A1 | 1/2011 | Gorbold et al. | 702/63 |
| 2011/0015815 A1 | 1/2011 | Bertness | 701/22 |
| 2011/0106280 A1 | 5/2011 | Zeier | 700/90 |
| 2011/0127960 A1 | 6/2011 | Plett | |
| 2011/0161025 A1 | 6/2011 | Tomura | 702/63 |
| 2011/0215767 A1 | 9/2011 | Johnson et al. | 320/136 |
| 2011/0218747 A1 | 9/2011 | Bertness | 702/63 |
| 2011/0239445 A1 | 10/2011 | Ibi | |
| 2011/0258112 A1 | 10/2011 | Eder et al. | |
| 2011/0265025 A1 | 10/2011 | Bertness | |
| 2011/0267067 A1 | 11/2011 | Bertness et al. | |
| 2011/0273181 A1 | 11/2011 | Park et al. | 324/429 |
| 2011/0294367 A1 | 12/2011 | Moon | 439/878 |
| 2011/0300416 A1 | 12/2011 | Bertness | |
| 2012/0041697 A1 | 2/2012 | Stukenberg | 702/63 |
| 2012/0046807 A1 | 2/2012 | Ruther | 701/2 |
| 2012/0046824 A1 | 2/2012 | Ruther et al. | 701/31.5 |
| 2012/0062237 A1 | 3/2012 | Robinson | 324/433 |
| 2012/0074904 A1 | 3/2012 | Rutkowski et al. | 320/112 |
| 2012/0086399 A1 | 4/2012 | Choi | |
| 2012/0091962 A1 | 4/2012 | DeFrank et al. | |

(56) References Cited

U.S. PATENT DOCUMENTS

| | | | |
|---|---|---|---|
| 2012/0116391 A1 | 5/2012 | Houser | 606/41 |
| 2012/0182132 A1 | 7/2012 | McShane | |
| 2012/0249069 A1 | 10/2012 | Ohtomo | 320/109 |
| 2012/0256494 A1 | 10/2012 | Kesler | 307/104 |
| 2012/0256568 A1 | 10/2012 | Lee | 318/139 |
| 2012/0274331 A1 | 11/2012 | Liu | 324/426 |
| 2012/0293372 A1 | 11/2012 | Amendolare | 342/451 |
| 2013/0049678 A1 | 2/2013 | Li | |
| 2013/0099747 A1 | 4/2013 | Baba | 310/118 |
| 2013/0106362 A1 | 5/2013 | Mackintosh et al. | |
| 2013/0106596 A1 | 5/2013 | Mouchet | |
| 2013/0115821 A1 | 5/2013 | Golko | 439/638 |
| 2013/0134926 A1 | 5/2013 | Yoshida | |
| 2013/0158782 A1 | 6/2013 | Bertness et al. | 701/34.4 |
| 2013/0172019 A1 | 7/2013 | Youssef | 455/456.6 |
| 2013/0200855 A1 | 8/2013 | Christensen et al. | |
| 2013/0218781 A1 | 8/2013 | Simon | |
| 2013/0288706 A1 | 10/2013 | Yu | 455/456.1 |
| 2013/0297247 A1 | 11/2013 | Jardine | |
| 2013/0311124 A1 | 11/2013 | Van Bremen | 702/104 |
| 2013/0314041 A1 | 11/2013 | Proebstle | 320/109 |
| 2013/0325405 A1 | 12/2013 | Miller | |
| 2014/0002021 A1 | 1/2014 | Bertness | |
| 2014/0002094 A1 | 1/2014 | Champlin | 324/426 |
| 2014/0029308 A1 | 1/2014 | Cojocaru | 363/13 |
| 2014/0081527 A1 | 3/2014 | Miller | |
| 2014/0091762 A1 | 4/2014 | Kondo | |
| 2014/0099830 A1 | 4/2014 | Byrne | 439/638 |
| 2014/0117997 A1 | 5/2014 | Bertness | 324/426 |
| 2014/0132223 A1 | 5/2014 | Kerfoot, Jr. | |
| 2014/0145670 A1 | 5/2014 | van Zwan et al. | |
| 2014/0162497 A1 | 6/2014 | Lim | |
| 2014/0194084 A1 | 7/2014 | Noonan | 455/404.1 |
| 2014/0225622 A1 | 8/2014 | Kudo | 324/433 |
| 2014/0239964 A1 | 8/2014 | Gach | 324/433 |
| 2014/0260577 A1 | 9/2014 | Chinnadurai | |
| 2014/0266061 A1 | 9/2014 | Wachal | |
| 2014/0278159 A1 | 9/2014 | Chinnadurai | |
| 2014/0333313 A1 | 11/2014 | Surampudi | |
| 2014/0354237 A1 | 12/2014 | Cotton | |
| 2014/0368156 A1 | 12/2014 | Aloe | |
| 2014/0374475 A1 | 12/2014 | Kallfelz et al. | |
| 2015/0093922 A1 | 4/2015 | Bosscher | 439/39 |
| 2015/0115720 A1 | 4/2015 | Hysell | 307/65 |
| 2015/0166518 A1 | 6/2015 | Boral et al. | |
| 2015/0168499 A1 | 6/2015 | Palmisano | |
| 2015/0221135 A1 | 8/2015 | Hill | 345/633 |
| 2015/0239365 A1 | 8/2015 | Hyde et al. | |
| 2015/0353192 A1 | 12/2015 | Morrison | |
| 2016/0011271 A1 | 1/2016 | Bertness | |
| 2016/0013523 A1 | 1/2016 | Anzicek | |
| 2016/0091571 A1 | 3/2016 | Salo, III | |
| 2016/0154044 A1 | 6/2016 | Bertness | |
| 2016/0171799 A1 | 6/2016 | Bertness | |
| 2016/0216335 A1 | 7/2016 | Bertness | |
| 2016/0226280 A1 | 8/2016 | Noor et al. | |
| 2016/0232736 A1 | 8/2016 | Holtappels | |
| 2016/0238667 A1 | 8/2016 | Palmisano et al. | |
| 2016/0253852 A1 | 9/2016 | Bertness et al. | |
| 2016/0266212 A1 | 9/2016 | Carlo | |
| 2016/0285284 A1 | 9/2016 | Matlapudi et al. | |
| 2016/0321897 A1 | 11/2016 | Lee | |
| 2016/0336623 A1 | 11/2016 | Nayar | |
| 2016/0381542 A1 | 12/2016 | Colby et al. | |
| 2017/0093056 A1 | 3/2017 | Salo, III et al. | |
| 2017/0146602 A1 | 5/2017 | Samp | |
| 2017/0158058 A1 | 6/2017 | Lee et al. | |
| 2017/0197514 A1* | 7/2017 | Rivas | H01R 13/7175 |
| 2017/0373410 A1 | 12/2017 | Lipkin et al. | |
| 2018/0009328 A1 | 1/2018 | Hinterberger et al. | |
| 2018/0113171 A1 | 4/2018 | Bertness | |
| 2018/0301913 A1 | 10/2018 | Irish et al. | |
| 2018/0306867 A1 | 10/2018 | Bertness | |
| 2019/0033385 A1 | 1/2019 | Kamer | |
| 2019/0105998 A1 | 4/2019 | Bertness | |
| 2019/0152332 A1 | 5/2019 | Bertness | |
| 2019/0154763 A1 | 5/2019 | Bertness | |
| 2019/0204392 A1 | 7/2019 | Bertness | |
| 2020/0076129 A1 | 3/2020 | Kitahara | |
| 2020/0086757 A1 | 3/2020 | Vain et al. | |
| 2020/0161630 A1 | 5/2020 | Zeng | |
| 2020/0174078 A1 | 6/2020 | Salo, III et al. | |
| 2020/0274370 A1 | 8/2020 | Krieg | |
| 2021/0048374 A1 | 2/2021 | Sampson et al. | |
| 2021/0049480 A1 | 2/2021 | Kale et al. | |
| 2021/0135462 A1 | 5/2021 | Sampson et al. | |
| 2021/0141021 A1 | 5/2021 | Salo, III et al. | |
| 2021/0141043 A1 | 5/2021 | Bertness | |
| 2021/0203016 A1 | 7/2021 | Bertness | |
| 2021/0231737 A1 | 7/2021 | Salo, III et al. | |
| 2021/0237607 A1* | 8/2021 | Chen | B60L 3/00 |
| 2021/0325471 A1 | 10/2021 | Bertness | |
| 2022/0050142 A1 | 2/2022 | Bertness | |
| 2022/0258619 A1 | 8/2022 | Bertness | |
| 2022/0384858 A1 | 12/2022 | Bertness | |
| 2023/0063349 A1 | 3/2023 | Bertness et al. | |
| 2023/0155400 A1 | 5/2023 | Wang | |
| 2023/0256829 A1 | 8/2023 | Bertness | |
| 2023/0318321 A1 | 10/2023 | Liu | |
| 2023/0333171 A1 | 10/2023 | Bertness | |
| 2023/0339359 A1 | 10/2023 | Numata | |
| 2023/0358818 A1 | 11/2023 | Kolamkar et al. | |
| 2023/0387707 A1 | 11/2023 | Bertness | |
| 2023/0391179 A1 | 12/2023 | Sampson et al. | |
| 2024/0429653 A1 | 12/2024 | Dos Santos | |

FOREIGN PATENT DOCUMENTS

| | | |
|---|---|---|
| CN | 103091633 | 5/2013 |
| CN | 206658084 | 11/2017 |
| CN | 109683054 | 1/2019 |
| DE | 29 26 716 B1 | 1/1981 |
| DE | 40 07 883 | 9/1991 |
| DE | 196 38 324 | 9/1996 |
| DE | 601 12 502 T2 | 6/2006 |
| DE | 10 2009 013 857 | 10/2009 |
| DE | 10 2008 036 595 A1 | 2/2010 |
| DE | 10 2018 001885 | 9/2018 |
| DE | 10 2020 216599 | 7/2021 |
| EP | 0 022 450 A1 | 1/1981 |
| EP | 0 391 694 A2 | 4/1990 |
| EP | 0 476 405 A1 | 9/1991 |
| EP | 0 637 754 A1 | 2/1995 |
| EP | 0 772 056 A1 | 5/1997 |
| EP | 0 982 159 A2 | 3/2000 |
| EP | 1 810 869 A1 | 11/2004 |
| EP | 1 786 057 | 5/2007 |
| EP | 1 807 710 B1 | 7/2007 |
| EP | 1 807 710 | 1/2010 |
| EP | 2 302 724 | 3/2011 |
| FR | 2 749 397 | 12/1997 |
| GB | 154 016 | 11/1920 |
| GB | 2 029 586 | 3/1980 |
| GB | 2 088 159 A | 6/1982 |
| GB | 2 246 916 A | 10/1990 |
| GB | 2 266 150 | 10/1993 |
| GB | 2 275 783 A | 7/1994 |
| GB | 2 353 367 | 2/2001 |
| GB | 2 387 235 A | 10/2003 |
| JP | 59-17892 | 1/1984 |
| JP | 59-17893 | 1/1984 |
| JP | 59017894 | 1/1984 |
| JP | 59215674 | 12/1984 |
| JP | 60225078 | 11/1985 |
| JP | 62-180284 | 8/1987 |
| JP | 63027776 | 2/1988 |
| JP | 03274479 | 12/1991 |
| JP | 03282276 | 12/1991 |
| JP | 4-8636 | 1/1992 |
| JP | 04095788 | 3/1992 |
| JP | 04131779 | 5/1992 |
| JP | 04372536 | 12/1992 |
| JP | 05211724 A | 8/1993 |
| JP | 5216550 | 8/1993 |

(56) References Cited

FOREIGN PATENT DOCUMENTS

| | | |
|---|---|---|
| JP | 7-128414 | 5/1995 |
| JP | 09061505 | 3/1997 |
| JP | 10056744 | 2/1998 |
| JP | 10232273 | 9/1998 |
| JP | 11103503 A | 4/1999 |
| JP | 11-150809 | 6/1999 |
| JP | 11-271409 | 10/1999 |
| JP | 2001-023037 | 1/2001 |
| JP | 2001057711 A | 2/2001 |
| JP | 2003-346909 | 12/2003 |
| JP | 2005-238969 | 9/2005 |
| JP | 2006/242674 | 9/2006 |
| JP | 2006331976 A | 12/2006 |
| JP | 2009-244166 | 10/2009 |
| JP | 2009-261174 | 11/2009 |
| JP | 2010-172122 | 5/2010 |
| JP | 2010-172142 | 8/2010 |
| JP | 2011-216328 | 10/2011 |
| JP | 2013-110069 | 6/2013 |
| RU | 2089015 C1 | 8/1997 |
| WO | WO 93/22666 | 11/1993 |
| WO | WO 94/05069 | 3/1994 |
| WO | WO 96/01456 | 1/1996 |
| WO | WO 96/06747 | 3/1996 |
| WO | WO 96/28846 | 9/1996 |
| WO | WO 97/01103 | 1/1997 |
| WO | WO 97/44652 | 11/1997 |
| WO | WO 98/04910 | 2/1998 |
| WO | WO 98/21132 | 5/1998 |
| WO | WO 98/58270 | 12/1998 |
| WO | WO 99/23738 | 5/1999 |
| WO | WO 99/56121 | 11/1999 |
| WO | WO 00/16083 | 3/2000 |
| WO | WO 00/62049 | 10/2000 |
| WO | WO 00/67359 | 11/2000 |
| WO | WO 01/59443 | 2/2001 |
| WO | WO 01/16614 | 3/2001 |
| WO | WO 01/16615 | 3/2001 |
| WO | WO 01/51947 | 7/2001 |
| WO | WO 03/047064 A3 | 6/2003 |
| WO | WO 03/076960 A1 | 9/2003 |
| WO | WO 2004/047215 A1 | 6/2004 |
| WO | WO 2007/059935 | 5/2007 |
| WO | WO 2007/075403 | 7/2007 |
| WO | WO 2009/004001 | 1/2009 |
| WO | WO 2010/007681 | 1/2010 |
| WO | WO 2010/035605 | 4/2010 |
| WO | WO 2010/042517 | 4/2010 |
| WO | WO 2011/153419 | 12/2011 |
| WO | WO 2012/078921 | 6/2012 |
| WO | WO 2013/070850 | 5/2013 |
| WO | 2016176405 | 11/2016 |
| WO | 2022/241800 | 11/2022 |

OTHER PUBLICATIONS

Written Opinion for the Corresponding International Patent Application No. PCT/US2024/033558, dated Sep. 3, 2024, dated Jun. 12, 2024, 8 pages.
International Search Report and Written Opinion for corresponding International Application No. PCT/US2024/053504, dated Jan. 21, 2025, 15 pages.
Gehrmann Christian et al: "Bluetooth Security" Artech House Publishers, Jul. 5, 2004.
George Coulouris et al. "Distributed Systems: Concepts and Design (5th edition)", Addison-Wesley, May 7, 2011.
Owen C. Duffy et al. "Fundamentals of Medium/Heavy Duty Commercial Vehicle Systems," Jones & Bartlett Learning, Jul. 27, 2015.
Wikipedia: "List of Bluetooth profiles," Internet Article, Oct. 6, 2023.
Nick Hunn et al. "Essentials of Short-Range Wireless," Cambridge University Press, Aug. 23, 2010.
International Search Report and Written Opinion for corresponding International Application No. PCT/US2024/051765, dated Jan. 16, 2025, 15 pages.
U.S. Appl. No. 18/166,702, filed Feb. 9, 2023.
U.S. Appl. No. 18/314,266, filed May 9, 2023.
U.S. Appl. No. 18/324,382, filed May 26, 2023.
U.S. Appl. No. 18/328,827, filed Jun. 5, 2023.
"Electrochemical Impedance Spectroscopy in Battery Development and Testing", *Batteries International*, Apr. 1997, pp. 59 and 62-63.
"Battery Impedance", by E. Willihnganz et al., *Electrical Engineering*, Sep. 1959, pp. 922-925.
"Determining the End of Battery Life", by S. DeBardelaben, *IEEE*, 1986, pp. 365-368.
"A Look at the Impedance of a Cell", by S. Debardelaben, *IEEE*, 1988, pp. 394-397.
"The Impedance of Electrical Storage Cells", by N.A. Hampson et al., *Journal of Applied Electrochemistry*, 1980, pp. 3-11.
"A Package for Impedance/Admittance Data Analysis", by B. Boukamp, *Solid State Ionics*, 1986, pp. 136-140.
"Precision of Impedance Spectroscopy Estimates of Bulk, Reaction Rate, and Diffusion Parameters", by J. Macdonald et al., *J. Electroanal, Chem.*, 1991, pp. 1-11.
Internal Resistance: Harbinger of Capacity Loss in Starved Electrolyte Sealed Lead Acid Batteries, by Vaccaro, F.J. et al., *AT&T Bell Laboratories*, 1987 IEEE, Ch. 2477, pp. 128,131.
IEEE Recommended Practice for Maintenance, Testings, and Replacement of Large Lead Storage Batteries for Generating Stations and Substations, *The Institute of Electrical and Electronics Engineers, Inc., ANSI/IEEE Std.* 450-1987, Mar. 9, 1987, pp. 7-15.
"Field and Laboratory Studies to Assess the State of Health of Valve-Regulated Lead Acid Batteries: Part I Conductance/Capacity Correlation Studies", by D. Feder et al., *IEEE*, Aug. 1992, pp. 218-233.
"JIS Japanese Industrial Standard—Lead Acid Batteries for Automobiles", *Japanese Standards Association UDC*, 621.355.2:629.113.006, Nov. 1995.
"Performance of Dry Cells", by C. Hambuechen, Preprint of *Am. Electrochem. Soc.*, Apr. 18-20, 1912, paper No. 19, pp. 1-5.
"A Bridge for Measuring Storage Battery Resistance", by E. Wilihncanz, *The Electrochemical Society*, preprint 79-20, Apr. 1941, pp. 253-258.
National Semiconductor Corporation, "High Q Notch Filter", Mar. 1969, Linear Brief 5, Mar. 1969.
Burr-Brown Corporation, "Design a 60 Hz Notch Filter with the UAF42", Jan. 1994, AB-071, 1994.
National Semiconductor Corporation, "LMF90-$4^{th}$-Order Elliptic Notch Filter", Dec. 1994, RRD-B30M115, Dec. 1994.
"Alligator Clips with Wire Penetrators" *J.S. Popper, Inc.* product information, downloaded from http://www.jspopper.com/, prior to Oct. 1, 2002.
"#12: LM78S40 Simple Switcher DC to DC Converter", *ITM e-Catalog*, downloaded from http://www.pcbcafe,com, prior to Oct. 1, 2002.
"Simple DC-DC Converts Allows Use of Single Battery", *Electronix Express*, downloaded from http://www.elexp.com/t_dc-dc.htm, prior to Oct. 1, 2002.
"DC-DC Converter Basics", *Power Designers*, downloaded from http://www.powerdesigners.com/InforWeb.design_center/articles/DC-DC/converter.shtm, prior to Oct. 1, 2002.
"Notification of Transmittal of the International Search Report or the Declaration", PCT/US02/29461, filed Sep. 17, 2002 and mailed Jan. 3, 2003.
"Notification of Transmittal of the International Search Report or the Declaration", PCT/US03/07546, filed Mar. 13, 2003 and mailed Jul. 4, 2001.
"Notification of Transmittal of the International Search Report or the Declaration", PCT/US03/06577, filed Mar. 5, 2003 and mailed Jul. 24, 2003.
"Notification of Transmittal of the International Search Report or the Declaration", PCT/US03/07837, filed Mar. 14, 2003 and mailed Jul. 4, 2003.

(56) References Cited

OTHER PUBLICATIONS

"Improved Impedance Spectroscopy Technique for Status Determination of Production Li/SO$_2$ Batteries" Terrill Atwater et al., pp. 10-113, (1992).
"Notification of Transmittal of the International Search Report or the Declaration", PCT/US03/41561; Search Report completed Apr. 13, 2004, mailed May 6, 2004.
"Notification of Transmittal of the International Search Report or the Declaration", PCT/US03/27696, filed Sep. 4, 2003 and mailed Apr. 15, 2004.
"Programming Training Course, 62-000 Series Smart Engine Analyzer", Testproducts Division, Kalamazoo, Michigan, pp. 1-207, (1984).
"Operators Manual, Modular Computer Analyzer Model MCA 3000", Sun Electric Corporation, Crystal Lake, Illinois, pp. 1-1-14-13, (1991).
Supplementary European Search Report Communication for Appl. No. 99917402.2; Sep. 7, 2004.
"Dynamic modelling of lead/acid batteries using impedance spectroscopy for parameter identification", Journal of Power Sources, pp. 69-84, (1997).
Notification of Transmittal of the International Search Report for PCT/US03/30707, filed Sep. 30, 2003 and mailed Nov. 24, 2004.
"A review of impedance measurements for determination of the state-of-charge or state-of-health of secondary batteries", Journal of Power Sources, pp. 59-69, (1998).
"Search Report Under Section 17" for Great Britain Application No. GB0421447.4, date of search Jan. 27, 2005, date of document Jan. 28, 2005.
"Results of Discrete Frequency Immittance Spectroscopy (DFIS) Measurements of Lead Acid Batteries", by K.S. Champlin et al., *Proceedings of 23$^{rd}$ International Teleco Conference (INTELEC)*, published Oct. 2001, IEE, pp. 433-440.
"Examination Report" from the UK Patent Office for App. No. 0417678.0; Jan. 24, 2005.
Wikipedia Online Encyclopedia, Inductance, 2005, http://en.wikipedia.org/wiki/inductance, pp. 1-5, mutual Inductance, pp. 3,4.
"Professional BCS System Analyzer Battery-Charger-Starting", pp. 2-8, (2001).
Young Illustrated Encyclopedia Dictionary of Electronics, 1981, Parker Publishing Company, Inc., pp. 318-319.
"DSP Applications in Hybrid Electric Vehicle Powertrain", Miller et al., Proceedings of the American Control Conference, San Diego, CA, Jun. 1999; 2 ppg.
"Notification of Transmittal of the International Search Report and the Written Opinion of the International Searching Authority, or the Declaration" for PCT/US2008/008702 filed Jul. 2008; 15 pages.
"A Microprocessor-Based Control System for a Near-Term Electric Vehicle", Bimal K. Bose; IEEE Transactions on Industry Applications, vol. IA-17, No. 6, Nov./Dec. 1981; 0093-9994/81/1100-0626$00.75 © 1981 IEEE, 6 pages.
Notification of Transmittal of the International Search Report and the Written Opinion of the International Searching Authority, or the Declaration for PCT/US2011/038279 filed May 27, 2011, date of mailing Sep. 16, 2011, 12 pages.
U.S. Appl. No. 60/387,912, filed Jun. 13, 2002 which is related to U.S. Pat. No. 7,089,127.
"Conductance Testing Compared to Traditional Methods of Evaluating the Capacity of Valve-Regulated Lead-Acid Batteries and Predicting State-of-Health", by D. Feder et al., May 1992, pp. 1-8; (13 total pgs.).
"Field and Laboratory Studies to Assess the State of Health of Valve-Regulated Lead Acid Batteries: Part I—Conductance/Capacity Correlation Studies", by D. Feder at al., Oct. 1992, pp. 1-15; (19 total pgs.).
"Field Application of Conductance Measurements Use to Ascertain Cell/Battery and Inter-Cell Connection State-of-Health in Electric Power Utility Applications", by M. Hlavac et al., Apr. 1993, pp. 1-14; (19 total pgs.).

"Conductance Testing of Standby Batteries in Signaling and Communications Applications for the Purpose of Evaluating Battery State-of-Health", by S. McShane, Apr. 1993, pp. 1-9; (14 total pgs.).
"Condutance Monitoring of Recombination Lead Acid Batteries", by B. Jones, May 1993, pp. 1-6; (11 total pgs.).
"Evaluating the State-of-Health of Lead Acid Flooded and Valve-Regulated Batteries: A Comparison of Conductance Testing vs. Traditional Methods", by M. Hlavac et al., Jun. 1993, pp. 1-15; (20 total pgs.).
"Updated State of Conductance/Capacity Correlation Studies to Determine the State-of-Health of Automotive SLI and Standby Lead Acid Batteries", by D. Feder et al., Sep. 1993, pp. 1-17; (22 total pgs.).
"Field and Laboratory Studies to Access the State-of-Health of Valve-Regulated Lead-Acid Battery Technologies Using Conductance Testing Part II—Further Conductance/Capacity Correlation Studies", by M. Hlavac et al., Sep. 1993, pp. 1-9; (14 total pgs.).
"Field Experience of Testing VRLA Batteries by Measuring Conductance", by M.W. Kniveton, May 1994, pp. 1-4; (9 total pgs.).
"Reducing the Cost of Maintaining VRLA Batteries in Telecom Applications", by M.W. Kniveton, Sep. 1994, pp. 1-5; (10 total pgs.).
"Analysis and Interpretation of Conductance Measurements used to Access the State-of-Health of Valve Regulated Lead Acid Batteries Part III: Analytical Techniques", by M. Hlavac, Nov. 1994, 9 pgs; (13 total pgs.).
"Testing 24 Volt Aircraft Batteries Using Midtronics Conductance Technology", by M. Hlavac et al., Jan. 1995, 9 pgs; (13 total pgs.).
"VRLA Battery Monitoring Using Conductance Technology Part IV: On-Line State-of-Health Monitoring and Thermal Runaway Detection/Prevention", by M. Hlavac et al., Oct. 1995, 9 pgs; (13 total pgs.).
"VRLA Battery Conductance Monitoring Part V: Strategies for VRLA Battery Testing and Monitoring in Telecom Operating Environments", by M. Hlavac et al., Oct. 1996, 9 pgs; (13 total pgs.).
"Midpoint Conductance Technology Used in Telecommunication Stationary Standby Battery Applications Part VI: Considerations for Deployment of Midpoint Conductance in Telecommunications Power Applications", by M. Troy et al., Oct. 1997, 9 pgs; (13 total pgs.).
"Impedance/Conductance Measurements as an Aid to Determining Replacement Strategies", M. Kniveton, Sep. 1998, pp. 297-301; (9 total pgs.).
"A Fundamentally New Approach to Battery Performance Analysis Using DFRA™/DTIS™ Technology", by K. Champlin et al., Sep. 2000, 8 pgs; (12 total pgs.).
"Battery State of Health Monitoring, Combining Conductance Technology With Other Measurement Parameters for Real-Time Battery Performance Analysis", by D. Cox et al., Mar. 2000, 6 pgs; (10 total pgs.).
Search Report and Written Opinion from PCT Application No. PCT/US2011/026608, dated Aug. 29, 2011, 9 pgs.
Examination Report under section 18(3) for corresponding Great Britain Application No. GB1000773.0, dated Feb. 6, 2012, 2 pages.
Communication from GB1216105.5, dated Sep. 21, 2012.
Notification of Transmittal of the International Search Report and Written Opinion from PCT/US2011/039043, dated Jul. 26, 2012.
Notification of Transmittal of the International Search Report and Written Opinion from PCT/US2011/053886, dated Jul. 27, 2012.
"Field Evaluation of Honda's EV Plus Battery Packs", by A. Paryani, *IEEE AES Systems Magazine*, Nov. 2000, pp. 21-24.
Search Report from PCT/US2011/047354, dated Nov. 11, 2011.
Written Opinion from PCT/US2011/047354, dated Nov. 11, 2011.
First Office Action (Notification of Reasons for Rejections) dated Dec. 3, 2013 in related Japanese patent application No. 2013-513370, 9 pgs. Including English Translation.
Official Action dated Jan. 22, 2014 in Korean patent application No. 10-2012-7033020, 2 pgs including English Translation.
Official Action dated Feb. 20, 2014 in Korean patent application No. 10-2013-7004814, 6 pgs including English Translation.
First Office Action for Chinese Patent Application No. 201180011597.4, dated May 6, 2014, 20 pages.
Office Action from Korean Application No. 10/2012-7033020, dated Jul. 29, 2014.

(56) References Cited

OTHER PUBLICATIONS

Office Action for Chinese Patent Application No. 201180038844.X, dated Jul. 1, 2014.
Office Action for Chinese Patent Application No. 201180030045.8, dated Jul. 21, 2014.
Office Action for German Patent Application No. 1120111020643 dated Aug. 28, 2014.
Office Action from Japanese Patent Application No. 2013-513370, dated Aug. 5, 2014.
Office Action from Japanese Patent Application No. 2013-531839, dated Jul. 8, 2014.
Office Action for German Patent Application No. 103 32 625.1, dated Nov. 7, 2014, 14 pages.
Office Action from Chinese Patent Application No. 201180038844.X, dated Dec. 8, 2014.
Office Action from CN Application No. 201180011597.4, dated Jan. 6, 2015.
Office Action for Chinese Patent Application No. 201180030045.8, dated Mar. 24, 2015.
Office Action for Japanese Patent Application No. 2013-531839, dated Mar. 31, 2015.
Notification of Transmittal of the International Search Report and Written Opinion from PCT/US2014/069661, dated Mar. 26, 2015.
Office Action for Chinese Patent Application No. 201180038844.X, dated Jun. 8, 2015.
Office Action from Chinese Patent Application No. 201180011597.4 dated Jun. 3, 2015.
European Search Report from European Application No. EP 15151426.2, dated Jun. 1, 2015.
Notification of Transmittal of the International Search Report and the Written Opinion from PCT/US2016/014867, dated Jun. 3, 2016.
Office Action from Japanese Patent Application No. 2015-014002, dated Jul. 19, 2016.
Notification of Transmittal of the International Search Report and the Written Opinion of the International Searching Authority from PCT/US2016/029696, dated Aug. 24, 2016.
Office Action from German Patent Application No. 10393251.8, dated Nov. 4, 2016, including English translation.
Office Action from European Patent Application No. 15 151 426.2-1801, dated Aug. 28, 2017, 2 pages.
Office Action from German Patent Application No. 112011101892.4, dated Sep. 7, 2017.
Office Action from Japanese Patent Application No. 2017-026740, dated Jan. 9, 2018.
Office Action from Chinese Patent Application No. 201480066251.8, dated May 29, 2018.
Brochure: "Sensors Intelligent Battery Sensors, Measuring Battery Capacity and Ageing", by Hella, 6 pgs.
Office Action from Japanese Patent Application No. 2017-026740, dated May 8, 2018.
U.S. Appl. No. 12/697,485, filed Feb. 1, 2010, 36 pgs.
Office Action from Chinese Patent Application No. 201480066251.8, dated Dec. 13, 2018.
Notification of Transmittal of the International Search Report and the Written Opinion of the International Searching Authority, or the Declaration for PCT/US2019/014487, dated Apr. 11, 2019.
Notification of Transmittal of the International Search Report and the Written Opinion of the International Searching Authority, or the Declaration for PCT/US2019/014494, dated Apr. 24, 2019.
Office Action from German Patent Application No. 11 2011 101 892.4, dated Oct. 1, 2020, and translation using Google Translate.
Wikipedia Online Encyclopedia, https: // de.wikipedia.org/w/index.php?title= four-wire measurement &oldid=67143514-4 (Retrieved Sep. 15, 2020) along with Google Translation.
Notification of Transmittal of the International Search Report and the Written Opinion of the International Searching Authority, or the Declaration for PCT/US2020/059015, dated Jan. 22, 2021.
Application from U.S. Appl. No. 17/504,897, filed Oct. 19, 2021.
Notification of Transmittal of the International Search Report and the Written Opinion of the International Searching Authority, or the Declaration for PCT/US2021/040313 dated Oct. 25, 2021; 14 pages.
U.S. Appl. No. 17/750,719, filed May 23, 2022.
U.S. Appl. No. 17/893,412, filed Aug. 23, 2022.
U.S. Appl. No. 18/616,458, filed Mar. 26, 2024.
U.S. Appl. No. 18/609,344, filed Mar. 19, 2024.
U.S. Appl. No. 18/740,030, filed Jun. 11, 2024.

\* cited by examiner

POWER ADAPTER FOR AUTOMOTIVE VEHICLE MAINTENANCE DEVICE

CROSS-REFERENCE TO RELATED APPLICATION

The present application is based on and claims the benefit of U.S. provisional patent application Ser. No. 63/236,416, filed Aug. 24, 2021, the content of which is hereby incorporated by reference in its entirety.

BACKGROUND OF THE INVENTION

The present invention relates to maintenance devices used to test and service automotive vehicles including electric vehicles and hybrid vehicles. More specifically the present invention relates to a power adapter for providing power to such devices.

Automotive vehicle maintenance devices are used to perform diagnostics as well as maintain components of automotive vehicles. Specific types of automotive vehicle maintenance devices are used to test and charge batteries of automotive vehicles. As used herein, automotive vehicles include vehicles having an internal combustion engine including hybrid vehicles as well as vehicles which are completely powered using electricity from storage batteries.

Examples of automotive vehicle maintenance devices include those pioneered by Midtronics, Inc. of Willowbrook, Illinois, and Dr. Keith S. Champlin, including for example, those discussed in U.S. Pat. No. 3,873,911, issued Mar. 25, 1975, to Champlin; U.S. Pat. No. 3,909,708, issued Sep. 30, 1975, to Champlin; U.S. Pat. No. 4,816,768, issued Mar. 28, 1989, to Champlin; U.S. Pat. No. 4,825,170, issued Apr. 25, 1989, to Champlin; U.S. Pat. No. 4,881,038, issued Nov. 14, 1989, to Champlin; U.S. Pat. No. 4,912,416, issued Mar. 27, 1990, to Champlin; U.S. Pat. No. 5,140,269, issued Aug. 18, 1992, to Champlin; U.S. Pat. No. 5,343,380, issued Aug. 30, 1994; U.S. Pat. No. 5,572,136, issued Nov. 5, 1996; U.S. Pat. No. 5,574,355, issued Nov. 12, 1996; U.S. Pat. No. 5,583,416, issued Dec. 10, 1996; U.S. Pat. No. 5,585,728, issued Dec. 17, 1996; U.S. Pat. No. 5,589,757, issued Dec. 31, 1996; U.S. Pat. No. 5,592,093, issued Jan. 7, 1997; U.S. Pat. No. 5,598,098, issued Jan. 28, 1997; U.S. Pat. No. 5,656,920, issued Aug. 12, 1997; U.S. Pat. No. 5,757,192, issued May 26, 1998; U.S. Pat. No. 5,821,756, issued Oct. 13, 1998; U.S. Pat. No. 5,831,435, issued Nov. 3, 1998; U.S. Pat. No. 5,871,858, issued Feb. 16, 1999; U.S. Pat. No. 5,914,605, issued Jun. 22, 1999; U.S. Pat. No. 5,945,829, issued Aug. 31, 1999; U.S. Pat. No. 6,002,238, issued Dec. 14, 1999; U.S. Pat. No. 6,037,751, issued Mar. 14, 2000; U.S. Pat. No. 6,037,777, issued Mar. 14, 2000; U.S. Pat. No. 6,051,976, issued Apr. 18, 2000; U.S. Pat. No. 6,081,098, issued Jun. 27, 2000; U.S. Pat. No. 6,091,245, issued Jul. 18, 2000; U.S. Pat. No. 6,104,167, issued Aug. 15, 2000; U.S. Pat. No. 6,137,269, issued Oct. 24, 2000; U.S. Pat. No. 6,163,156, issued Dec. 19, 2000; U.S. Pat. No. 6,172,483, issued Jan. 9, 2001; U.S. Pat. No. 6,172,505, issued Jan. 9, 2001; U.S. Pat. No. 6,222,369, issued Apr. 24, 2001; U.S. Pat. No. 6,225,808, issued May 1, 2001; U.S. Pat. No. 6,249,124, issued Jun. 19, 2001; U.S. Pat. No. 6,259,254, issued Jul. 10, 2001; U.S. Pat. No. 6,262,563, issued Jul. 17, 2001; U.S. Pat. No. 6,294,896, issued Sep. 25, 2001; U.S. Pat. No. 6,294,897, issued Sep. 25, 2001; U.S. Pat. No. 6,304,087, issued Oct. 16, 2001; U.S. Pat. No. 6,310,481, issued Oct. 30, 2001; U.S. Pat. No. 6,313,607, issued Nov. 6, 2001; U.S. Pat. No. 6,313,608, issued Nov. 6, 2001; U.S. Pat. No. 6,316,914, issued Nov. 13, 2001; U.S. Pat. No. 6,323,650, issued Nov. 27, 2001; U.S. Pat. No. 6,329,793, issued Dec. 11, 2001; U.S. Pat. No. 6,331,762, issued Dec. 18, 2001; U.S. Pat. No. 6,332,113, issued Dec. 18, 2001; U.S. Pat. No. 6,351,102, issued Feb. 26, 2002; U.S. Pat. No. 6,359,441, issued Mar. 19, 2002; U.S. Pat. No. 6,363,303, issued Mar. 26, 2002; U.S. Pat. No. 6,377,031, issued Apr. 23, 2002; U.S. Pat. No. 6,392,414, issued May 21, 2002; U.S. Pat. No. 6,417,669, issued Jul. 9, 2002; U.S. Pat. No. 6,424,158, issued Jul. 23, 2002; U.S. Pat. No. 6,441,585, issued Aug. 17, 2002; U.S. Pat. No. 6,437,957, issued Aug. 20, 2002; U.S. Pat. No. 6,445,158, issued Sep. 3, 2002; U.S. Pat. Nos. 6,456,045; 6,466,025, issued Oct. 15, 2002; U.S. Pat. No. 6,465,908, issued Oct. 15, 2002; U.S. Pat. No. 6,466,026, issued Oct. 15, 2002; U.S. Pat. No. 6,469,511, issued Nov. 22, 2002; U.S. Pat. No. 6,495,990, issued Dec. 17, 2002; U.S. Pat. No. 6,497,209, issued Dec. 24, 2002; U.S. Pat. No. 6,507,196, issued Jan. 14, 2003; U.S. Pat. No. 6,534,993; issued Mar. 18, 2003; U.S. Pat. No. 6,544,078, issued Apr. 8, 2003; U.S. Pat. No. 6,556,019, issued Apr. 29, 2003; U.S. Pat. No. 6,566,883, issued May 20, 2003; U.S. Pat. No. 6,586,941, issued Jul. 1, 2003; U.S. Pat. No. 6,597,150, issued Jul. 22, 2003; U.S. Pat. No. 6,621,272, issued Sep. 16, 2003; U.S. Pat. No. 6,623,314, issued Sep. 23, 2003; U.S. Pat. No. 6,633,165, issued Oct. 14, 2003; U.S. Pat. No. 6,635,974, issued Oct. 21, 2003; U.S. Pat. No. 6,696,819, issued Feb. 24, 20144; U.S. Pat. No. 6,707,303, issued Mar. 16, 2004; U.S. Pat. No. 6,737,831, issued May 18, 2004; U.S. Pat. No. 6,744,149, issued Jun. 1, 2004; U.S. Pat. No. 6,759,849, issued Jul. 6, 2004; U.S. Pat. No. 6,781,382, issued Aug. 24, 2004; U.S. Pat. No. 6,788,025, filed Sep. 7, 2004; U.S. Pat. No. 6,795,782, issued Sep. 21, 2004; U.S. Pat. No. 6,805,090, filed Oct. 19, 2004; U.S. Pat. No. 6,806,716, filed Oct. 19, 2004; U.S. Pat. No. 6,850,037, filed Feb. 1, 2005; U.S. Pat. No. 6,850,037, issued Feb. 1, 2005; U.S. Pat. No. 6,871,151, issued Mar. 22, 2005; U.S. Pat. No. 6,885,195, issued Apr. 26, 2005; U.S. Pat. No. 6,888,468, issued May 3, 2005; U.S. Pat. No. 6,891,378, issued May 10, 2005; U.S. Pat. No. 6,906,522, issued Jun. 14, 2005; U.S. Pat. No. 6,906,523, issued Jun. 14, 2005; U.S. Pat. No. 6,909,287, issued Jun. 21, 2005; U.S. Pat. No. 6,914,413, issued Jul. 5, 2005; U.S. Pat. No. 6,913,483, issued Jul. 5, 2005; U.S. Pat. No. 6,930,485, issued Aug. 16, 2005; U.S. Pat. No. 6,933,727, issued August 23, 200; U.S. Pat. No. 6,941,234, filed Sep. 6, 2005; U.S. Pat. No. 6,967, 484, issued Nov. 22, 2005; U.S. Pat. No. 6,998,847, issued Feb. 14, 2006; U.S. Pat. No. 7,003,410, issued Feb. 21, 2006; U.S. Pat. No. 7,003,411, issued Feb. 21, 2006; U.S. Pat. No. 7,012,433, issued Mar. 14, 2006; U.S. Pat. No. 7,015,674, issued Mar. 21, 2006; U.S. Pat. No. 7,034,541, issued Apr. 25, 2006; U.S. Pat. No. 7,039,533, issued May 2, 2006; U.S. Pat. No. 7,058,525, issued Jun. 6, 2006; U.S. Pat. No. 7,081,755, issued Jul. 25, 2006; U.S. Pat. No. 7,106,070, issued Sep. 12, 2006; U.S. Pat. No. 7,116,109, issued Oct. 3, 2006; U.S. Pat. No. 7,119,686, issued Oct. 10, 2006; and U.S. Pat. No. 7,126,341, issued Oct. 24, 2006; U.S. Pat. No. 7,154,276, issued Dec. 26, 2006; U.S. Pat. No. 7,198,510, issued Apr. 3, 2007; U.S. Pat. No. 7,363,175, issued Apr. 22, 2008; U.S. Pat. No. 7,208,914, issued Apr. 24, 2007; U.S. Pat. No. 7,246,015, issued Jul. 17, 2007; U.S. Pat. No. 7,295,936, issued Nov. 13, 2007; U.S. Pat. No. 7,319,304, issued Jan. 15, 2008; U.S. Pat. No. 7,363,175, issued Apr. 22, 2008; U.S. Pat. No. 7,398,176, issued Jul. 8, 2008; U.S. Pat. No. 7,408,358, issued Aug. 5, 2008; U.S. Pat. No. 7,425,833, issued Sep. 16, 2008; U.S. Pat. No. 7,446,536, issued Nov. 4, 2008; U.S. Pat. No. 7,479,763, issued Jan. 20, 2009; U.S. Pat. No. 7,498,767, issued Mar. 3, 2009; U.S. Pat. No. 7,501,795, issued Mar. 10, 2009; U.S.

Pat. No. 7,505,856, issued Mar. 17, 2009; U.S. Pat. No. 7,545,146, issued Jun. 9, 2009; U.S. Pat. No. 7,557,586, issued Jul. 7, 2009; U.S. Pat. No. 7,595,643, issued Sep. 29, 2009; U.S. Pat. No. 7,598,699, issued Oct. 6, 2009; U.S. Pat. No. 7,598,744, issued Oct. 6, 2009; U.S. Pat. No. 7,598,743, issued Oct. 6, 2009; U.S. Pat. No. 7,619,417, issued Nov. 17, 2009; U.S. Pat. No. 7,642,786, issued Jan. 5, 2010; U.S. Pat. No. 7,642,787, issued Jan. 5, 2010; U.S. Pat. No. 7,656,162, issued Feb. 2, 2010; U.S. Pat. No. 7,688,074, issued Mar. 30, 2010; U.S. Pat. No. 7,705,602, issued Apr. 27, 2010; U.S. Pat. No. 7,706,992, issued Apr. 27, 2010; U.S. Pat. No. 7,710,119, issued May 4, 2010; U.S. Pat. No. 7,723,993, issued May 25, 2010; U.S. Pat. No. 7,728,597, issued Jun. 1, 2010; U.S. Pat. No. 7,772,850, issued Aug. 10, 2010; U.S. Pat. No. 7,774,151, issued Aug. 10, 2010; U.S. Pat. No. 7,777,612, issued Aug. 17, 2010; U.S. Pat. No. 7,791,348, issued Sep. 7, 2010; U.S. Pat. No. 7,808,375, issued Oct. 5, 2010; U.S. Pat. No. 7,924,015, issued Apr. 12, 2011; U.S. Pat. No. 7,940,053, issued May 10, 2011; U.S. Pat. No. 7,940,052, issued May 10, 2011; U.S. Pat. No. 7,959,476, issued Jun. 14, 2011; U.S. Pat. No. 7,977,914, issued Jul. 12, 2011; U.S. Pat. No. 7,999,505, issued Aug. 16, 2011; U.S. Pat. No. D643,759, issued Aug. 23, 2011; U.S. Pat. No. 8,164,343, issued Apr. 24, 2012; U.S. Pat. No. 8,198,900, issued Jun. 12, 2012; U.S. Pat. No. 8,203,345, issued Jun. 19, 2012; U.S. Pat. No. 8,237,448, issued Aug. 7, 2012; U.S. Pat. No. 8,306,690, issued Nov. 6, 2012; U.S. Pat. No. 8,344,685, issued Jan. 1, 2013; U.S. Pat. No. 8,436,619, issued May 7, 2013; U.S. Pat. No. 8,442,877, issued May 14, 2013; U.S. Pat. No. 8,493,022, issued Jul. 23, 2013; U.S. Pat. No. D687,727, issued Aug. 13, 2013; U.S. Pat. No. 8,513,949, issued Aug. 20, 2013; U.S. Pat. No. 8,674,654, issued Mar. 18, 2014; U.S. Pat. No. 8,674,711, issued Mar. 18, 2014; U.S. Pat. No. 8,704,483, issued Apr. 22, 2014; U.S. Pat. No. 8,738,309, issued May 27, 2014; U.S. Pat. No. 8,754,653, issued Jun. 17, 2014; U.S. Pat. No. 8,872,516, issued Oct. 28, 2014; U.S. Pat. No. 8,872,517, issued Oct. 28, 2014; U.S. Pat. No. 8,958,998, issued Feb. 17, 2015; U.S. Pat. No. 8,963,550, issued Feb. 24, 2015; U.S. Pat. No. 9,018,958, issued Apr. 28, 2015; U.S. Pat. No. 9,052,366, issued Jun. 9, 2015; U.S. Pat. No. 9,201,120, issued Dec. 1, 2015; U.S. Pat. No. 9,229,062, issued Jan. 5, 20126; U.S. Pat. No. 9,244,100, issued Jan. 26, 2016; U.S. Pat. No. 9,274,157, issued Mar. 1, 2016; U.S. Pat. No. 9,312,575, issued Apr. 12, 2016; U.S. Pat. No. 9,335,362, issued May 10, 2016; U.S. Pat. No. 9,425,487, issued Aug. 23, 2016; U.S. Pat. No. 9,419,311, issued Aug. 16, 2016; U.S. Pat. No. 9,496,720, issued Nov. 15, 2016; U.S. Pat. No. 9,588,185, issued Mar. 7, 2017; U.S. Pat. No. 9,923,289, issued Mar. 20, 2018; U.S. Pat. No. 9,966,676, issued May 8, 2018; U.S. Pat. No. 10,046,649, issued Aug. 14, 2018; U.S. Pat. No. 10,222,397, issued Mar. 5, 2019; U.S. Pat. No. 10,317,468, issued Jun. 11, 2019; U.S. Pat. No. 10,429,449, issued Oct. 1, 2019; U.S. Pat. No. 10,473,555, issued Nov. 12, 2019; U.S. Pat. No. 10,608,353, issued Mar. 31, 2020; U.S. Pat. No. 10,843,574, issued Nov. 24, 2020; U.S. Pat. No. 11,054,480, issued Jul. 6, 2021; U.S. Pat. No. 11,325,479, issued May 10, 2022; U.S. Ser. No. 09/780,146, filed Feb. 9, 2001, entitled STORAGE BATTERY WITH INTEGRAL BATTERY TESTER; U.S. Ser. No. 09/756,638, filed Jan. 8, 2001, entitled METHOD AND APPARATUS FOR DETERMINING BATTERY PROPERTIES FROM COMPLEX IMPEDANCE/ADMITTANCE; U.S. Ser. No. 09/862,783, filed May 21, 2001, entitled METHOD AND APPARATUS FOR TESTING CELLS AND BATTERIES EMBEDDED IN SERIES/PARALLEL SYSTEMS; U.S. Ser. No. 09/880, 473, filed Jun. 13, 2001; entitled BATTERY TEST MODULE; U.S. Ser. No. 10/109,734, filed Mar. 28, 2002, entitled APPARATUS AND METHOD FOR COUNTERACTING SELF DISCHARGE IN A STORAGE BATTERY; U.S. Ser. No. 10/263,473, filed Oct. 2, 2002, entitled ELECTRONIC BATTERY TESTER WITH RELATIVE TEST OUTPUT; U.S. Ser. No. 09/653,963, filed Sep. 1, 2000, entitled SYSTEM AND METHOD FOR CONTROLLING POWER GENERATION AND STORAGE; U.S. Ser. No. 10/174, 110, filed Jun. 18, 2002, entitled DAYTIME RUNNING LIGHT CONTROL USING AN INTELLIGENT POWER MANAGEMENT SYSTEM; U.S. Ser. No. 10/258,441, filed Apr. 9, 2003, entitled CURRENT MEASURING CIRCUIT SUITED FOR BATTERIES; U.S. Ser. No. 10/681,666, filed Oct. 8, 2003, entitled ELECTRONIC BATTERY TESTER WITH PROBE LIGHT; U.S. Ser. No. 11/207,419, filed Aug. 19, 2005, entitled SYSTEM FOR AUTOMATICALLY GATHERING BATTERY INFORMATION FOR USE DURING BATTERY TESTER/CHARGING, U.S. Ser. No. 11/356,443, filed Feb. 16, 2006, entitled ELECTRONIC BATTERY TESTER WITH NETWORK COMMUNICATION; U.S. Ser. No. 12/697,485, filed Feb. 1, 2010, entitled ELECTRONIC BATTERY TESTER; U.S. Ser. No. 12/769, 911, filed Apr. 29, 2010, entitled STATIONARY BATTERY TESTER; U.S. Ser. No. 13/098,661, filed May 2, 2011, entitled METHOD AND APPARATUS FOR MEASURING A PARAMETER OF A VEHICLE ELECTRICAL SYSTEM; U.S. Ser. No. 13/152,711, filed Jun. 3, 2011, entitled BATTERY PACK MAINTENANCE FOR ELECTRIC VEHICLE; U.S. Ser. No. 14/039,746, filed Sep. 27, 2013, entitled BATTERY PACK MAINTENANCE FOR ELECTRIC VEHICLE; U.S. Ser. No. 14/565,689, filed Dec. 10, 2014, entitled BATTERY TESTER AND BATTERY REGISTRATION TOOL; U.S. Ser. No. 15/017,887, filed Feb. 8, 2016, entitled METHOD AND APPARATUS FOR MEASURING A PARAMETER OF A VEHICLE ELECTRICAL SYSTEM; U.S. Ser. No. 15/049,483, filed Feb. 22, 2016, entitled BATTERY TESTER FOR ELECTRIC VEHICLE; U.S. Ser. No. 15/077,975, filed Mar. 23, 2016, entitled BATTERY MAINTENANCE SYSTEM; U.S. Ser. No. 15/149,579, filed May 9, 2016, entitled BATTERY TESTER FOR ELECTRIC VEHICLE; U.S. Ser. No. 16/021,538, filed Jun. 28, 2018, entitled BATTERY PACK MAINTENANCE FOR ELECTRIC VEHICLE; U.S. Ser. No. 16/056,991, filed Aug. 7, 2018, entitled HYBRID AND ELECTRIC VEHICLE BATTERY PACK MAINTENANCE DEVICE, U.S. Ser. No. 16/253,526, filed Jan. 22, 2019, entitled HIGH CAPACITY BATTERY BALANCER; U.S. Ser. No. 16/297, 975, filed Mar. 11, 2019, entitled HIGH USE BATTERY PACK MAINTENANCE; U.S. Ser. No. 16/695,705, filed Nov. 26, 2019, entitled BATTERY RATING VERSUS OEM SPECIFICATION; U.S. Ser. No. 16/943,120, filed Jul. 30, 2020 entitled TIRE TREAD GUAGE USING VISUAL INDICATOR; U.S. Ser. No. 17/086,629, filed Nov. 2, 2020, entitled HYBRID AND ELECTRIC VEHICLE BATTERY PACK MAINTENANCE DEVICE; U.S. Ser. No. 17/088, 824, filed Nov. 4, 2020, entitled SYSTEM FOR CHARGING A SERIES OF CONNECTED BATTERIES; U.S. Ser. No. 17/090,129, filed Nov. 5, 2020 entitled BATTERY PACK MAINTENANCE SYSTEM; U.S. Ser. No. 17/136, 600, filed Dec. 29, 2020, entitled INTELLIGENT MODULE INTERFACE FOR BATTERY MAINTENANCE DEVICE; U.S. Ser. No. 17/151,971, filed Jan. 19, 2021, entitled ELECTRONIC BATTERY TESTER WITH BATTERY CLAMP STORAGE HOLSTERS; U.S. Ser. No. 17/364,953, filed Jul. 1, 2021, entitled ELECTRICAL LOAD FOR ELECTRONIC BATTERY TESTER AND ELECTRONIC BATTERY TESTER INCLUDING SUCH ELECTRICAL LOAD; U.S. Ser. No. 17/504,897, filed Oct. 19, 2021, entitled HIGH CAPACITY BATTERY BALANCER; U.S. Ser. No. 17/739,393, filed May 9, 2022, entitled HYBRID AND ELECTRIC VEHICLE BATTERY PACK MAINTENANCE DEVICE and U.S. Ser. No. 17/750,719, filed May 23, 2022, entitled BATTERY MONITORING SYSTEM; all of which are incorporated herein by reference in their entireties.

In many instances, automotive service bays do not provide standard power output connections of the type used to power automotive vehicle maintenance devices. Thus, a solution that provides easy access to such connections is desired.

SUMMARY OF THE INVENTION

A novel method and apparatus to address these and other concerns resulting in a safe and easy to manage solution is provided.

A power adapter for an automotive vehicle maintenance device includes a power input connection and a power output connection configured to connect to the automotive vehicle maintenance device. Connection circuitry is configured to connect the power input connection to the power output connection.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Figure 1:
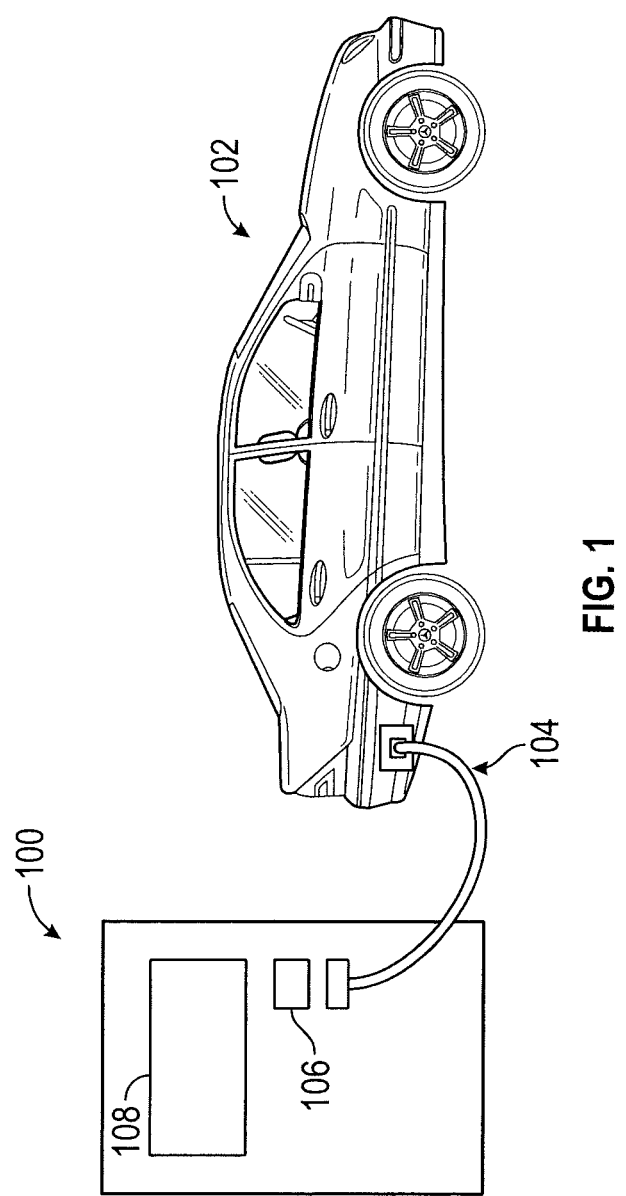
FIG. 1 is a diagrammatic illustration showing a charging station employed to charge an automotive vehicle.

Embodiments of the present disclosure are described more fully hereinafter with reference to the accompanying drawings. Elements that are identified using the same or similar reference characters refer to the same or similar elements. Some elements may not be shown in each of the figures in order to simplify the illustrations.

The various embodiments of the present disclosure may be embodied in many different forms and should not be construed as limited to the specific embodiments set forth herein. Rather, these embodiments are provided so that this disclosure will be thorough and complete, and will fully convey the scope of the present disclosure to those skilled in the art.

As indicated earlier, in many instances, automotive service bays do not provide standard power output connections of the type used to power automotive vehicle maintenance devices. However, in many instances in which no such power connections are available, a power output from an automotive vehicle charging station may be available. The present invention provides a power adapter which allows an automotive vehicle maintenance device to be powered from the power output from such an automotive vehicle charging station. Prior to providing details regarding different embodiments of the power adapter, a description of a illustrative operating environment is provided below.

FIG. 1 shows an illustrative operating environment in which certain specific embodiments disclosed herein may be useful. The operating environment shown in FIG. 1 is for illustration purposes only. Embodiments of the present disclosure are not limited to any particular operating environment such as the operating environment shown in FIG. 1. Embodiments of the present disclosure are illustratively practiced within any number of different types of operating environments.

FIG. 1 is a diagrammatic illustration showing a charging station 100 employed to charge an automotive vehicle (e.g., a car) 102 in, for example, an automotive service facility. The automotive vehicle 102 is electrically connected to the charging station 100 by a charger 104 to create a charging connection with the charging station 100. More specifically, the charger 104 is removed from a holster 106 of the charging station 100 and is plugged into, or mated with, a charging control system (not shown) of the automotive vehicle 102, which may convert the power supplied by the charger 104 to a form suitable for charging batteries (not shown) within the automotive vehicle 102.

The Society of Automotive Engineers (SAE) defines the general physical, electrical, communication, and performance requirements for electric vehicle charging systems used in North America, as part of standard SAE J1772. SAE J1772 defines four levels of charging, two levels each for alternating current (AC) and direct current (DC) supplies; the differences between levels are based upon the power distribution type, standards and maximum power. AC Level 1 supplies 6-16 amperes (A) (0.7-1.92 kilowatts (kW)) at 120 volts (V). AC Level 2 supplies 6-80 A (1.4-19.2 kW) at 208-240 V. DC Level 1 supplies a maximum of 80 kW at 50-1000 V. DC Level 2 supplies a maximum of 4000 kW at 50-1000 V.

For AC charging, the charging control system of the automotive vehicle 102 receives AC power via the charger 104 and converts the AC power/voltage to a DC voltage of a suitable level for charging the internal battery of automotive vehicle 102. DC charging requires no such conversion.

After charging of the automotive vehicle 102 battery is initiated as described above, a display 108 of the charging station 100 may show, for example, how much electricity is being added to the automotive vehicle 102 and may also provide any other suitable information. When charging by the charger 104 is completed, it may be placed back in the holster 106 of the charging station 100. In should be noted that the charging station 100 and/or the charger 104 may include other elements such as on/off switches to commence/discontinue charging. Such elements are not shown and described in the interest of brevity.

As indicated above, various maintenance devices may be used to perform diagnostics as well as maintain components of automotive vehicles such 102 in an automotive service facility that may include charging stations such as 100. Also, as noted above, service bays in such services facilities may not provide standard power output connections of the type used to power automotive vehicle maintenance devices.

The present invention provides a power adapter for an automotive vehicle maintenance device. The power adapter allows the automotive vehicle maintenance device to be powered using power from an electric vehicle charging station such as 100. In one embodiment, the system functions in accordance with the SAE J1772 connection standard described above. Such an embodiment of the power adapter is described below in connection with FIGS. 2-7.

Figure 2:
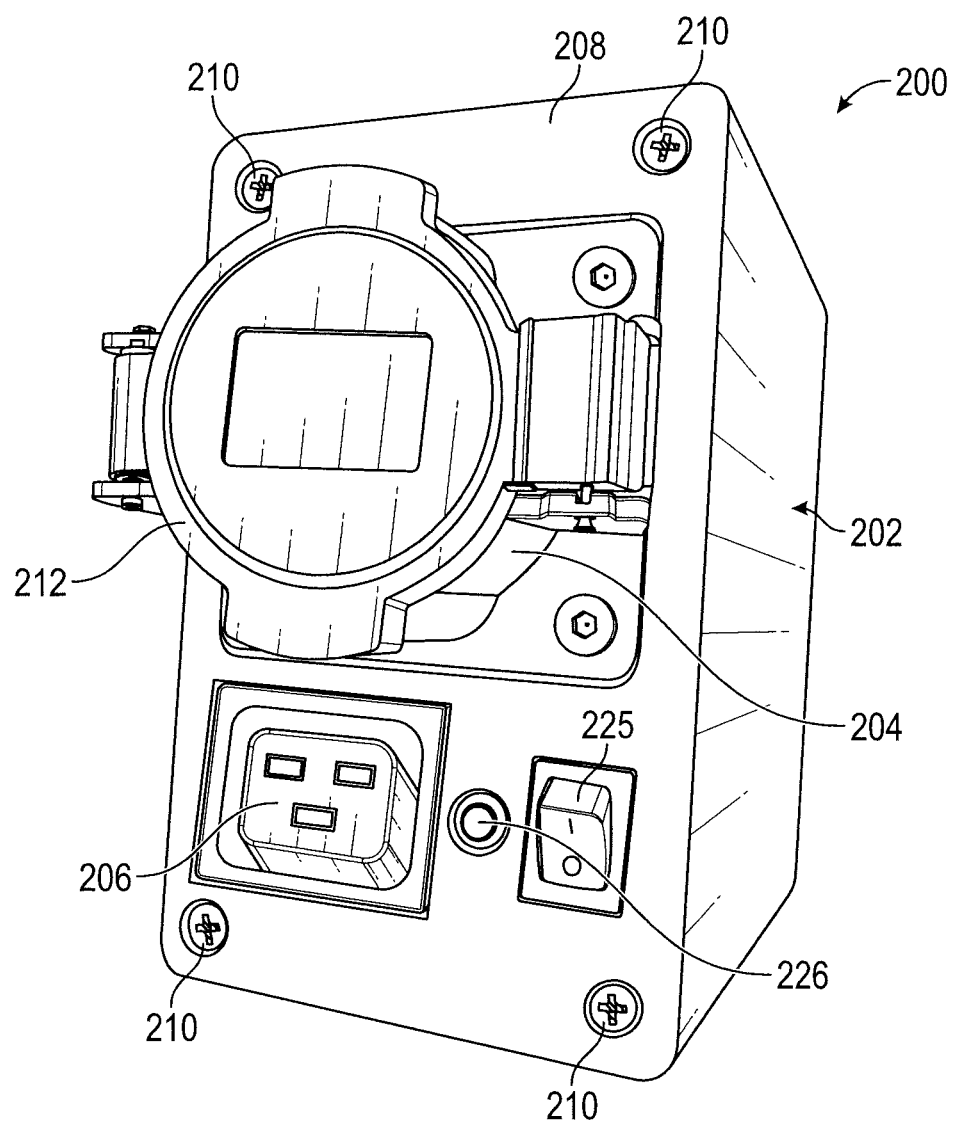
FIG. 2 is a perspective view of a power adapter for an automotive vehicle maintenance device in accordance with the present invention.
Figure 3:
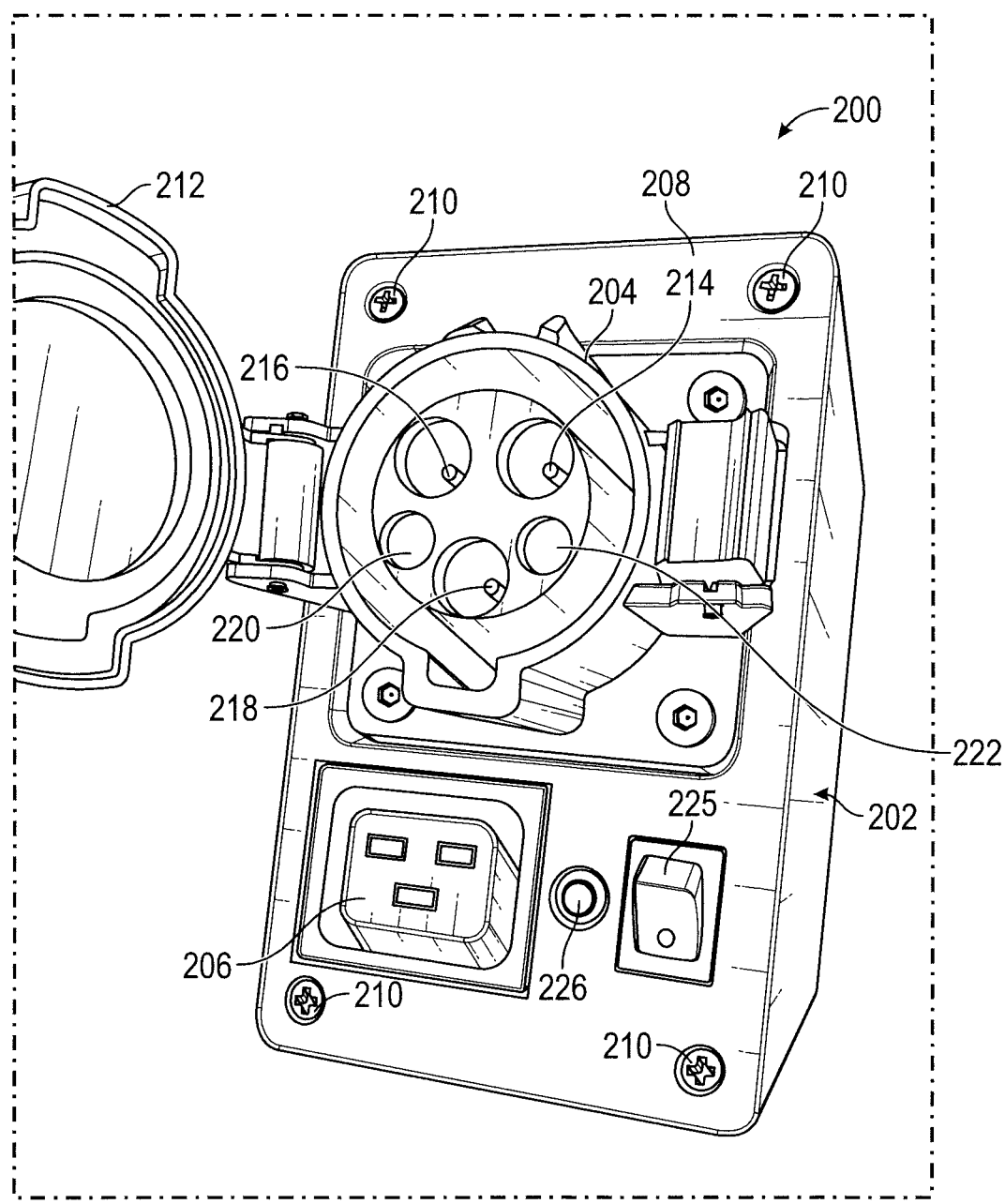
FIG. 3 is another perspective view of the power adapter of FIG. 2.

FIGS. 2 and 3 are perspective views of a power adapter 200 for an automotive vehicle maintenance device in accordance with one embodiment. As illustrated in FIGS. 2 and 3, power adapter 200 includes a housing 202 with a power input connection 204 and a power output connection 206, which are both accessible at a top 208 of the housing 202. It should be noted that, in alternate embodiments, power input connection 204 and/or power output connection 206 may be located elsewhere (e.g., sides or bottom of the housing 202). In the embodiment shown in FIGS. 2 and 3, the top 208 is detachably coupled to a main body of the housing 202 with the help of fasteners (e.g., screws 210). Internal connection circuitry (not shown in FIGS. 2 and 3) that connects the power input connection 204 to the power output connection 206 is included within housing 202. Power input connection 204 is protected by a cover 212 that is in a closed position in FIG. 2 and in an open position in FIG. 3. Power input connection 204 is configured to receive a power output connection from a charger (e.g., charger 104 of FIG. 1) connected to an automotive vehicle charging station (e.g., charging station 100 of FIG. 1). In the configuration shown herein, the power connection is in accordance with the SAE J1772 industry standard.

Figure 4:
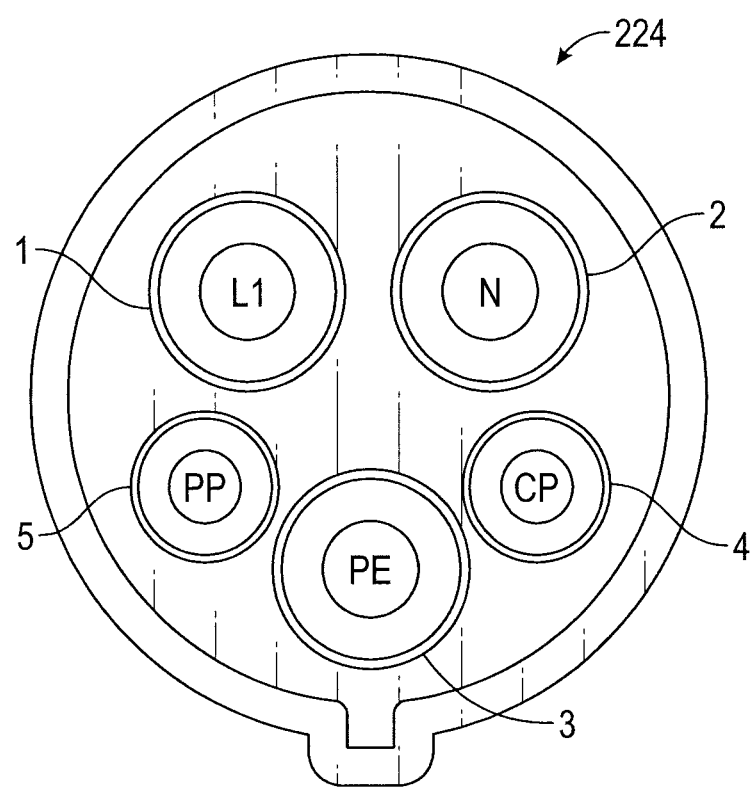
FIG. 4 is a front view of an automotive vehicle charger plug.

As can be seen in FIG. 3, power input connection 204 of power adapter 200 includes 5 holes with electrical contacts labeled 214-222 with each different hole configured to receive a different pin from a charger power output connection (e.g., plug) 224 shown in FIG. 4. Pins of the charger plug 224 shown in FIG. 4 are listed in Table 1 below.

TABLE 1

| Position | Identifier | Full form/function |
|---|---|---|
| 1 | L1 | AC Line 1 |
| 2 | N | "AC Neutral" for 120 V Level 1 charging or "AC Line 2" for 208-240 V Level 2 charging |
| 3 | PE | Protective earth or electrical ground |
| 4 | CP | Control pilot |
| 5 | PP | Proximity pilot |

It should be noted that the position column in Table 1 above is indicative of a position of the pin/conductor/contact in FIGS. 6 and 7, which are described further below.

Figure 5:
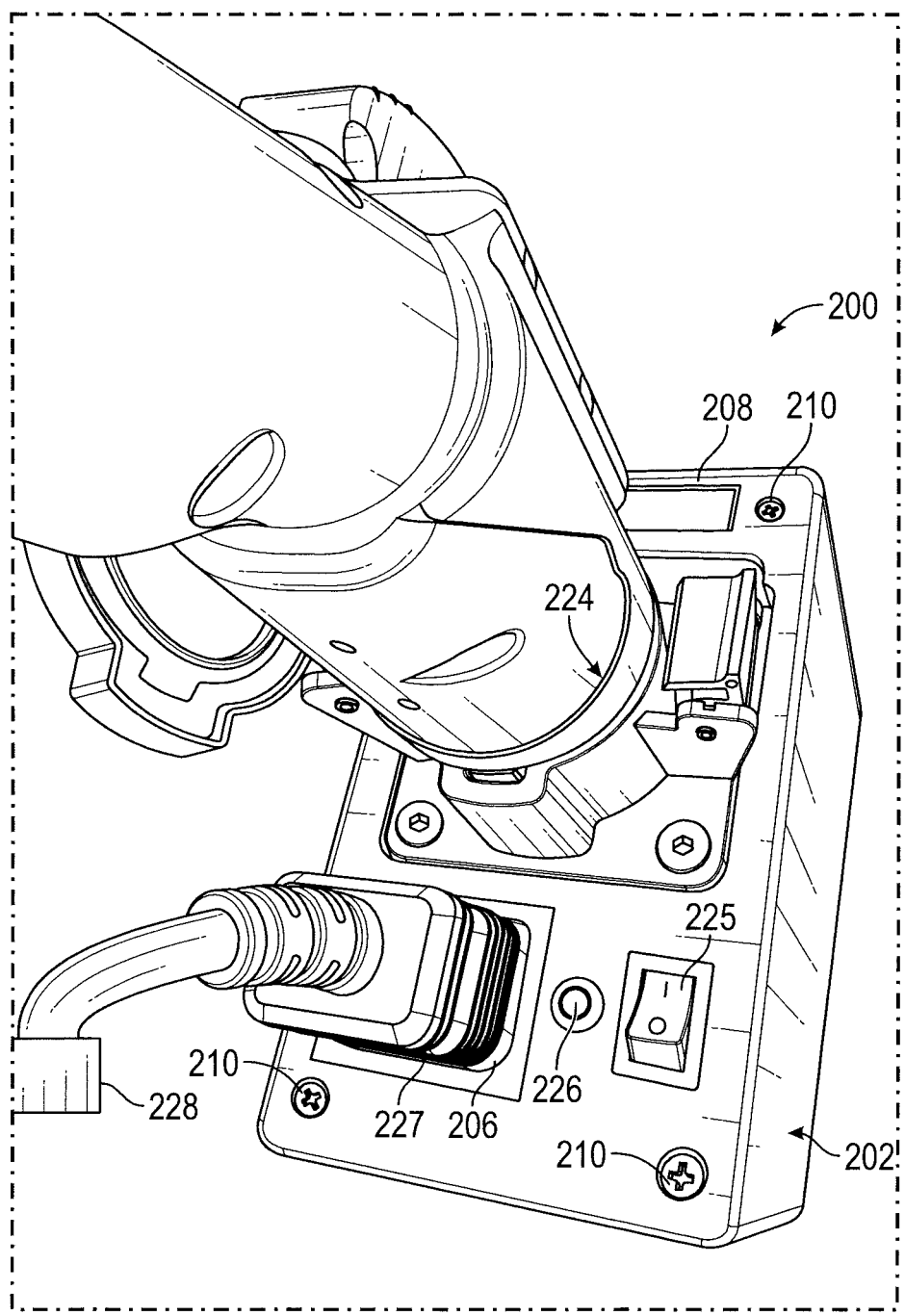
FIG. 5 is a perspective view of the power adapter of FIG. 2 including a power connection to a power input connection and a connection to a power output connection.

FIG. 5 is a perspective view of power adapter 200 with charger plug 224 connected to power input connection 204 of the power adapter 200 and the power output connection 206 connected to a power plug 227 of an automotive vehicle maintenance device schematically shown as 228. Referring now to FIGS. 3, 4 and 5, when the plug 224 from the charger 104 is connected to the power input connection 204, L1 is electrically connected to hole contact 214, N is connected to hole contact 216, PE is connected to hole contact 218, CP is connected to hole contact 220 and PP is connected to hole contact 222. This connection causes the power adapter 200 to receive power from the changer 104 via AC lines L1 and N. Power adapter 200 provides the received power to the power output connection 206 via internal connection circuitry (shown in FIG. 6 and described below) within housing 202. Power output connection 206 may be in accordance with the International Electrotechnical Commission (IEC) standard (e.g., IEC 60906-2). Alternatively, power output connection 206 may be in accordance with the National Electrical Manufacturers Association (NEMA) standard. In general, any suitable power output connections 206 may be employed in different embodiments. In some embodiments, the power output connection 206 provides an output voltage that is at a same voltage level as provided by the charger 104 at the power input connection 204. In other embodiments, the internal connection circuitry alters the power input voltage such that the power output connection 206 provides an output voltage that is at a different voltage level than that provided at the power input connection 204. In some embodiments, multiple power output connections 206 may be provided with each different power output connection 206 providing same or different output voltage levels. The power adapter 200 also includes an on/off switch 225 as well as an indicator light 226 which turns on when the switch 225 is in the on position and the power adapter 200 is receiving power from the charging station 100. When the switch 225 is turned on and the power plug 227 of the automotive vehicle maintenance device 228 is connected to the power adapter 200 as shown in FIG. 5, the automotive vehicle maintenance device 228 receives power via the power adapter 200.

Figure 6:
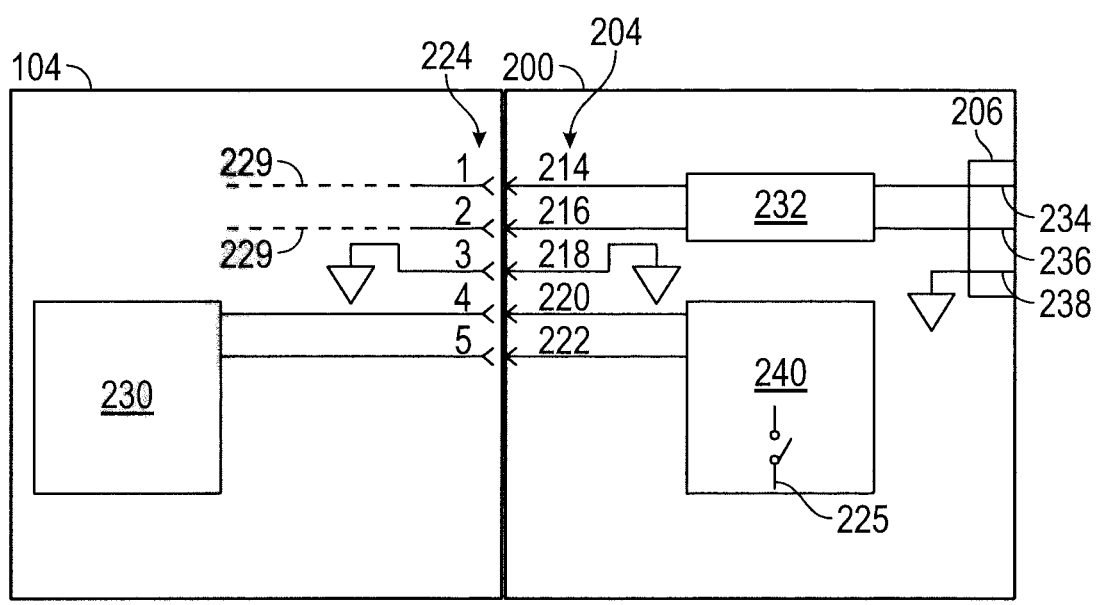
FIG. 6 is a simplified block diagram showing connection circuitry that enables power input from an automotive vehicle changer to be provided to a power output connection of a power adapter.

FIG. 6 is a simplified block diagram showing connections between charger 104 (connected to charging station 100 of FIG. 1) and power adapter 200 that enable the power input from the changer 104 to be provided to the power output connection 206 via connection circuitry of the power adapter 200. Charger 104 includes signaling and control circuitry 230 and input pins 1-5, which are included in plug 224 of the charger 104. Power input pins 1 and 2 are electrically coupled to power lines (e.g., wires) 229 of charging station 100 and function as AC Line 1 and AC Neutral, respectively, as noted above in Table 1. As indicated above, input pin 3 is an electrical ground or PE pin. Signaling and control circuitry 230 is connected to pins 4 and 5 that are CP and PP pins, respectively. Signaling and control circuitry 230 may provide signals indicating the presence of the AC input power, the current level provided, etc., and may monitor the connection and operation of the charger 104 when it is connected to a device. As can be seen in FIG. 6, charger pin 1 (L1) is electrically connected to hole contact 214, charger pin 2 (N) is connected to hole contact 216, charger pin 3 (PE) is connected to hole contact 218, charger pin 4 (CP) is connected to hole contact 220, and charger pin 5 (PP) is connected to hole contact 222. Hole contacts 214 and 216 are connected to internal power circuitry 232 of the power adapter 200, which is also connected to electrical contacts 234 and 236 of power output connection 206. A third electrical contact 238 of the power output connection 206 is connected to electrical ground. In some embodiments, internal power circuitry 232 is configured to provide an output voltage to power output connection 206 that is at a same voltage level as provided by the charger 104 at the power input connection 204. In other embodiments, internal power circuitry 232 includes electrical components in a connection configuration that alters the power input voltage such that the voltage level provided to the power output connection 206 is different from that provided at the power input connection 204. In some embodiments, internal power circuitry 232 is configured to provide multiple power outputs at same or different output voltage levels to multiple power output connections 206 such as those shown in FIGS. 8 and 9, which are described further below. Power adapter 200 also includes signaling and control circuitry 240 that is coupled to hole contacts 220 and 222. In the embodiment of FIG. 6, signaling and control circuitry 240 and internal power circuitry 232 constitute connection circuitry of the power adapter 200. Signaling and control circuitry 240 responds to signals received from charger 104 and may also include on/off switch 225. As will be described below in connection with FIG. 7, when charger 104 is connected to the power adapter 200, turning switch 225 on indicates to the charger 104 that a CP-PE or CP-electrical ground connection is closed, and the charger 104 responsively provides power to the adapter 200. Turning switch 225 off results in the CP-PE or CP-electrical ground connection being open, which results in the changer 104 terminating the power input. It should be noted that, in some embodiments, switch 225 may instead be connected to internal power circuitry 232 to enable and disable power transfer from the input power connection 204 to the output power connection 206. For example, switch 225 may be anywhere in the electrical conducting path from the input power connection 204 to the output power connection 206.

Figure 7:
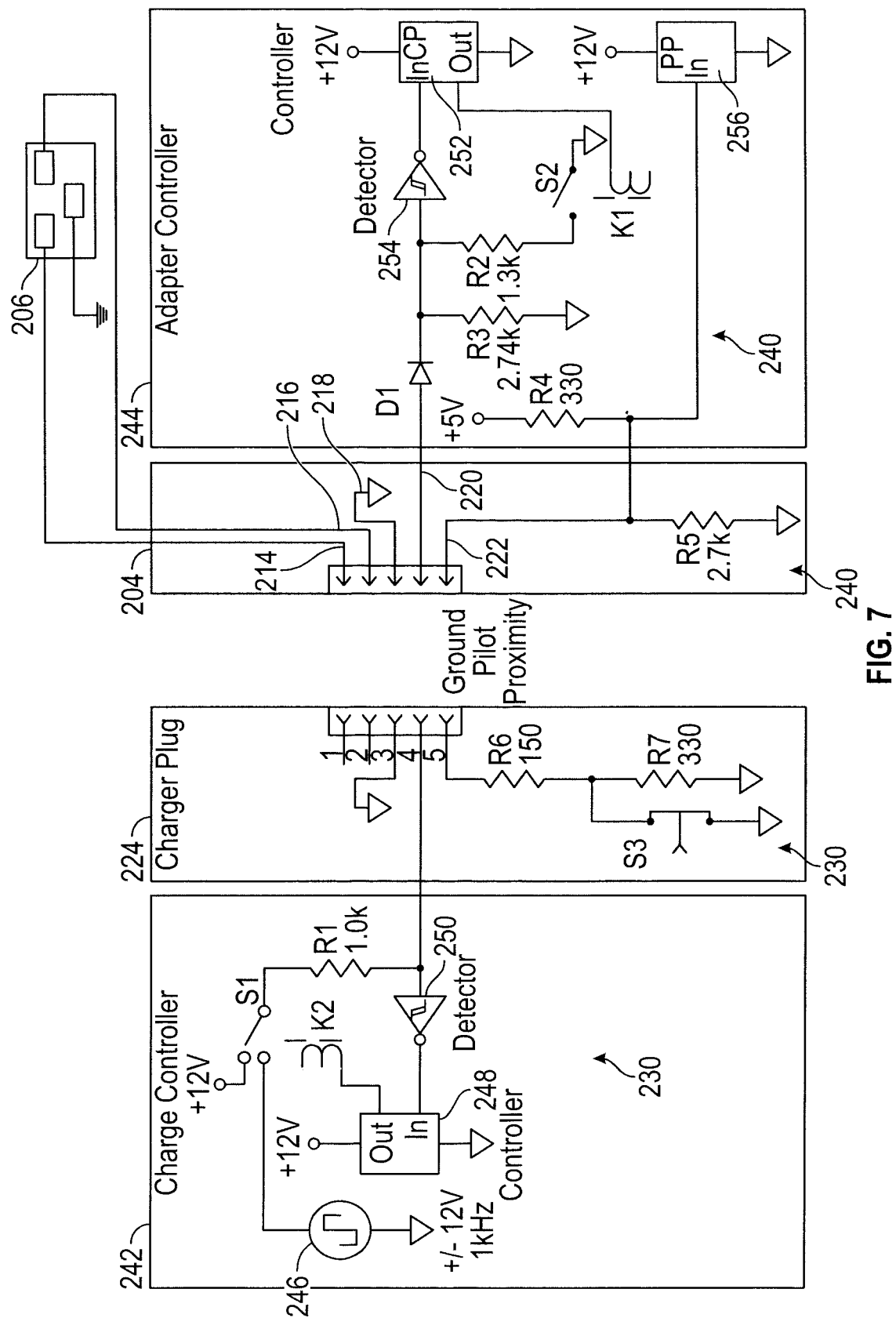
FIG. 7 is an electrical schematic diagram that shows components of signaling and control circuitry in an automotive vehicle charger and a power adapter in accordance with the Society of Automotive Engineers (SAE) J1772 standard.

FIG. 7 is an electrical schematic diagram that shows components of signaling and control circuitry 230 in the charger 104 and signaling and control circuitry 240 in the power adapter 200 in accordance with the SAE J1772 standard. FIG. 7 shows a charge controller 242, a charger plug 224, an adapter input power connection 204 and an adapter controller 244. In the interest of simplification, components connected to power pins/electrical contacts 1, 2, 214 and 216 are excluded form FIG. 7. In FIG. 7, all charger circuitry connected to charger pins 4 and 5 constitutes signaling and control circuitry 230, and all adapter circuitry connected to adapter electrical contacts 220 and 222 constitutes signaling and control circuitry 240.

As can be seen in FIG. 7, charge controller 242 incudes a voltage source 246 that provides a voltage of +/−12 V at a frequency of 1 kilohertz (kHz), a switch S1 connected in series with the voltage source 246, a resistor R1 having a value of 1 kiloohm (k Ω) connected in series with switch S1, a charge control element 248, a detector 250 having an input connected to resistor R1 and to CP pin 4, and an output connected to an input of change control element 248. An output of change control element 248 in connected to an inductor K2. Charger plug 224 includes pins 1-5 described earlier in connection with FIG. 6, and additionally includes resistors R6 and R7, and a switch S3. R6 has a resistance value of 150Ω, and R7 has a resistance value of 330Ω. As can be seen in FIG. 7, one end of R6 is connected to PP pin 5, and the other end of R6 is connected in series with R7 that is also connected to electrical ground. Switch S3 is connected in parallel with R7.

Adapter controller 244 includes a CP controller 252 and CP circuitry that includes a diode D1, a detector 254, resistors R2 and R3, a switch S2, and an inductor K1. An anode of diode D1 is connected to CP pin 220, and a cathode of D1 is connected to an input of detector 254, an output of detector 254 is connected to an input of CP controller 252. Resistors R2 and R3 are connected in parallel between the cathode of diode D1 and electrical ground. The path between R2 and ground includes switch S2, which is switch 225 in FIGS. 2-6. R2 has a resistance value of 1.3 kΩ and R3 has a resistance value of 2.74 kΩ. Adapter controller 244 also includes a PP controller 256 and a resistor R4 connected to an input of the PP controller 256. R4 has a resistance value of 330Ω. Adapter input power connection 204 includes hole contacts 214-222 described earlier and also include a resistor R5 that is connected between PP hole contact 222 and electrical ground. The end of R5 that is connected to PP hole contact 222 is also electrically connected to the input of PP controller 256.

In FIG. 7, the CP line circuitry shows that the current loop CP-PE or CP-electrical ground is connected permanently on the adapter 200 side via 2.74 kΩ resistor R3, making for a voltage drop from +12 V to +9 V when S1 is closed and the charger plug 224 is mated with the input power connection 204, which activates the wave generator 246. The power connection between the charger 104 and the power adapter 200 is activated by closing switch S2. Closing switch S2 adds parallel 1.3 kΩ resistor R2 to the current loop, and R2 and R3 in parallel results in a voltage drop to +6 V. Hence, the charging station can react (e.g., activate the power connection) by only checking the voltage range present on the CP-PE or CP-electrical ground loop. When the power connection is active, the charging station can use the wave signal to describe to the power adapter 200 the maximum current that is available via the charging station with the help of pulse-width modulation. In the interest of simplification, details regarding pulse-width modulation that may be employed in the circuit of FIG. 7 are not provided.

Switch S3 of the PP line circuitry is mechanically linked to the charger plug 224 latch release actuator (not shown). During charging, the charger 104 side connects the PP-PE or PP-electrical ground loop via S3 and the 150Ω resistor R6; when opening the release actuator (which opens S3), the 330 Ω resistor R7 is added in the PP-PE loop on the charger 194 side, which gives a voltage shift on the PP line to allow the power adapter 200 to initiate a controlled shut off of power to the power output connection 206 (not shown in FIG. 7) prior to actual disconnection of the charge power pins 1-5. In some embodiments, PP circuitry on the power adapter 200 side may be eliminated since the absence of such circuitry on the adapter 200 side may not interfere with the supply of power from the changer 104.

It should be noted that the voltage and resistance values provided in the circuit of FIG. 7 are only examples, and other voltage and/or resistance values may be used in alternate embodiments.

Figure 8:
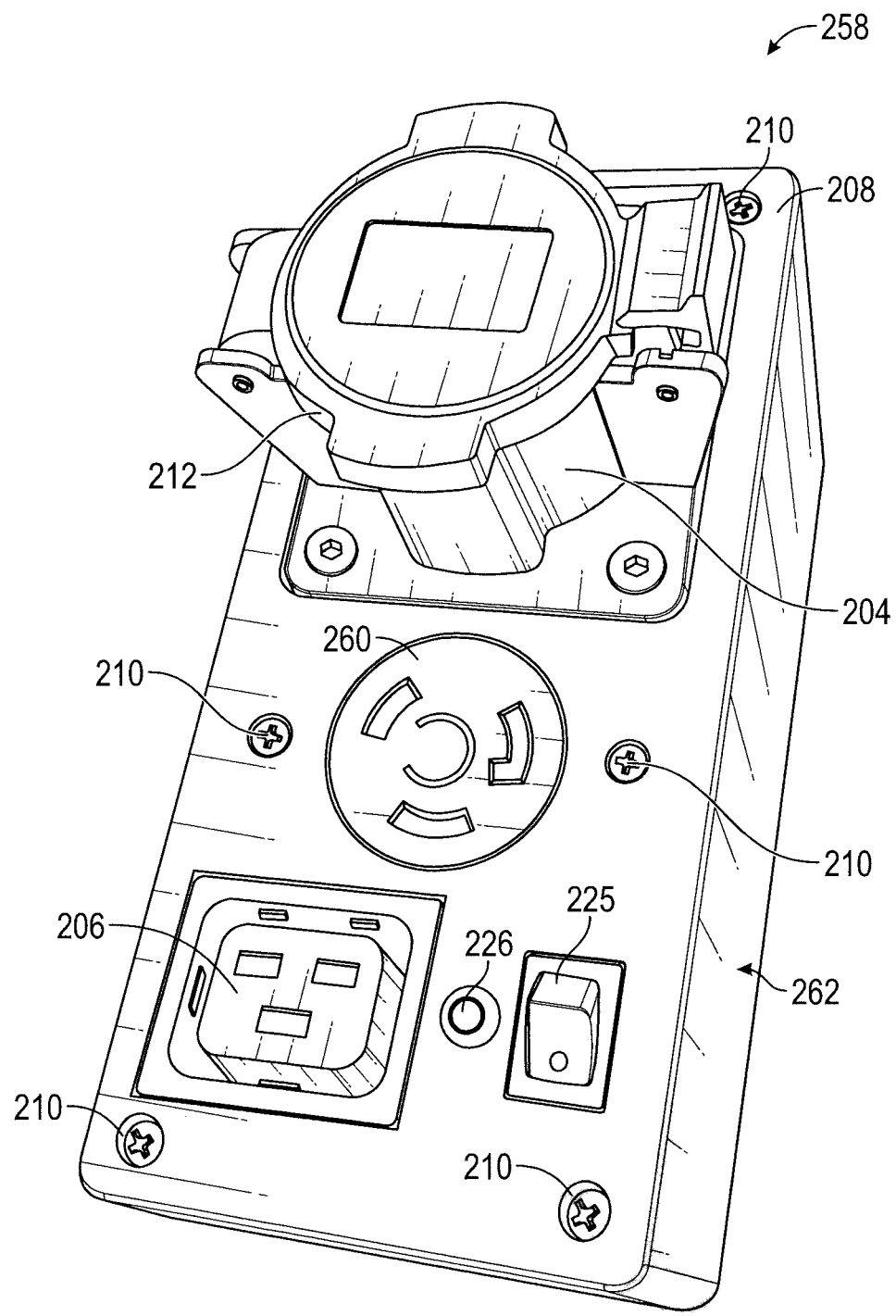
FIG. 8 is a perspective view of a power adapter in accordance with another configuration of the present invention.
Figure 9:
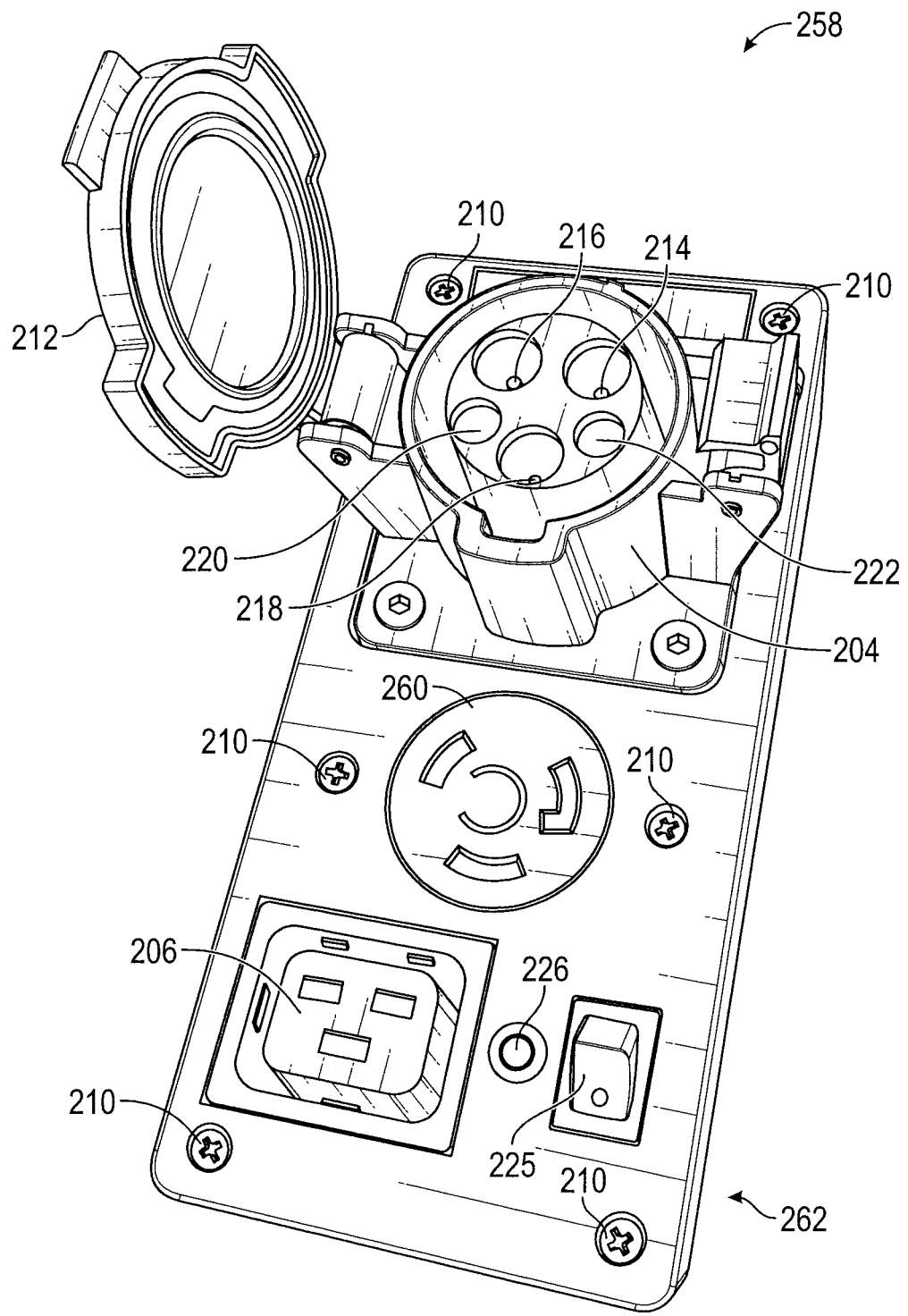
FIG. 9 is a perspective view of the power adapter of FIG. 8.

FIGS. 8 and 9 are perspective views of another example configuration of the present invention including a standard power output connection providing a 240 V AC power output which can be used to power other devices. The power adapter of FIGS. 8 and 9 is denoted by reference numeral 258, and the 240 V power output is denoted by reference numeral 260. Housing 262 of power adapter 258 may be larger than housing 202 of power adapter 200 shown in FIGS. 2-5. Additional fasteners may be employed to secure top 208 to the larger housing 262. In general, elements other that the 240 V power output 260 are substantially similar to the elements of power adapter 200 described above in connection with FIGS. 2-7, and therefore a description of those elements is not repeated.

In another example configuration, which in not shown, a pass-through connection can be provided such that an electric vehicle may be charged by the charging station while simultaneously providing power to the automotive vehicle maintenance device. The automotive vehicle maintenance device may be any type of maintenance device including those referenced in the Background section.

Figure 10:
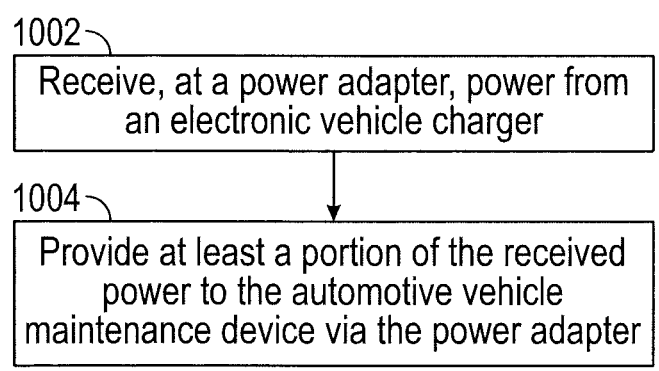
FIG. 10 is a flow diagram of a method embodiment.

FIG. 10 is a simplified flow diagram of a method 1000 of providing power to an automotive vehicle maintenance device in accordance with one embodiment. At 10002, power from an electronic vehicle charger is received at a power adapter. At 1004, at least a portion of the received power is provided to the automotive vehicle maintenance device via the power adapter.

The embodiments described above have several advantages. For example, power can be easily supplied to the automotive vehicle maintenance device via the power adapter without requiring electrical infrastructure changes at locations such as automotive service bays. Also, one or more out voltage levels may me provided from the power adapter thereby including the possibility of providing both 110 V and 240 V outputs.

The battery maintenance may be optionally performed in accordance with techniques pioneered by Midtronics, Inc. of Willowbrook, Illinois, and Dr. Keith S. Champlin, including for example, those discussed in U.S. Pat. No. 3,873,911, issued Mar. 25, 1975, to Champlin; U.S. Pat. No. 3,909,708, issued Sep. 30, 1975, to Champlin; U.S. Pat. No. 4,816,768, issued Mar. 28, 1989, to Champlin; U.S. Pat. No. 4,825,170, issued Apr. 25, 1989, to Champlin; U.S. Pat. No. 4,881,038, issued Nov. 14, 1989, to Champlin; U.S. Pat. No. 4,912,416, issued Mar. 27, 1990, to Champlin; U.S. Pat. No. 5,140,269, issued Aug. 18, 1992, to Champlin; U.S. Pat. No. 5,343,380, issued Aug. 30, 1994; U.S. Pat. No. 5,572,136, issued Nov. 5, 1996; U.S. Pat. No. 5,574,355, issued Nov. 12, 1996; U.S. Pat. No. 5,583,416, issued Dec. 10, 1996; U.S. Pat. No. 5,585,728, issued Dec. 17, 1996; U.S. Pat. No. 5,589,757, issued Dec. 31, 1996; U.S. Pat. No. 5,592,093, issued Jan. 7, 1997; U.S. Pat. No. 5,598,098, issued Jan. 28, 1997; U.S. Pat. No. 5,656,920, issued Aug. 12, 1997; U.S. Pat. No. 5,757,192, issued May 26, 1998; U.S. Pat. No. 5,821,756, issued Oct. 13, 1998; U.S. Pat. No. 5,831,435, issued Nov. 3, 1998; U.S. Pat. No. 5,871,858, issued Feb. 16, 1999; U.S. Pat. No. 5,914,605, issued Jun. 22, 1999; U.S. Pat. No. 5,945,829, issued Aug. 31, 1999; U.S. Pat. No. 6,002,238, issued Dec. 14, 1999; U.S. Pat. No. 6,037,751, issued Mar. 14, 2000; U.S. Pat. No. 6,037,777, issued Mar. 14, 2000; U.S. Pat. No. 6,051,976, issued Apr. 18, 2000; U.S. Pat. No. 6,081,098, issued Jun. 27, 2000; U.S. Pat. No. 6,091,245, issued Jul. 18, 2000; U.S. Pat. No. 6,104,167, issued Aug. 15, 2000; U.S. Pat. No. 6,137,269, issued Oct. 24, 2000; U.S. Pat. No. 6,163,156, issued Dec. 19, 2000; U.S. Pat. No. 6,172,483, issued Jan. 9, 2001; U.S. Pat. No. 6,172,505, issued Jan. 9, 2001; U.S. Pat. No. 6,222,369, issued Apr. 24, 2001; U.S. Pat. No. 6,225,808, issued May 1, 2001; U.S. Pat. No. 6,249,124, issued Jun. 19, 2001; U.S. Pat. No. 6,259,254, issued Jul. 10, 2001; U.S. Pat. No. 6,262,563, issued Jul. 17, 2001; U.S. Pat. No. 6,294,896, issued Sep. 25, 2001; U.S. Pat. No. 6,294,897, issued Sep. 25, 2001; U.S. Pat. No. 6,304,087, issued Oct. 16, 2001; U.S. Pat. No. 6,310,481, issued Oct. 30, 2001; U.S. Pat. No. 6,313,607, issued Nov. 6, 2001; U.S. Pat. No. 6,313,608, issued Nov. 6, 2001; U.S. Pat. No. 6,316,914, issued Nov. 13, 2001; U.S. Pat. No. 6,323,650, issued Nov. 27, 2001; U.S. Pat. No. 6,329,793, issued Dec. 11, 2001; U.S. Pat. No. 6,331,762, issued Dec. 18, 2001; U.S. Pat. No. 6,332,113, issued Dec. 18, 2001; U.S. Pat. No. 6,351,102, issued Feb. 26, 2002; U.S. Pat. No. 6,359,441, issued Mar. 19, 2002; U.S. Pat. No. 6,363,303, issued Mar. 26, 2002; U.S. Pat. No. 6,377,031, issued Apr. 23, 2002; U.S. Pat. No. 6,392,414, issued May 21, 2002; U.S. Pat. No. 6,417,669, issued Jul. 9, 2002; U.S. Pat. No. 6,424,158, issued Jul. 23, 2002; U.S. Pat. No. 6,441,585, issued Aug. 17, 2002; U.S. Pat. No. 6,437,957, issued Aug. 20, 2002; U.S. Pat. No. 6,445,158, issued Sep. 3, 2002; U.S. Pat. Nos. 6,456,045; 6,466,025, issued Oct. 15, 2002; U.S. Pat. No. 6,465,908, issued Oct. 15, 2002; U.S. Pat. No. 6,466,026, issued Oct. 15, 2002; U.S. Pat. No. 6,469,511, issued Nov. 22, 2002; U.S. Pat. No. 6,495,990, issued Dec. 17, 2002; U.S. Pat. No. 6,497,209, issued Dec. 24, 2002; U.S. Pat. No. 6,507,196, issued Jan. 14, 2003; U.S. Pat. No. 6,534,993; issued Mar. 18, 2003; U.S. Pat. No. 6,544,078, issued Apr. 8, 2003; U.S. Pat. No. 6,556,019, issued Apr. 29, 2003; U.S. Pat. No. 6,566,883, issued May 20, 2003; U.S. Pat. No. 6,586,941, issued Jul. 1, 2003; U.S. Pat. No. 6,597,150, issued Jul. 22, 2003; U.S. Pat. No. 6,621,272, issued Sep. 16, 2003; U.S. Pat. No. 6,623,314, issued Sep. 23, 2003; U.S. Pat. No. 6,633,165, issued Oct. 14, 2003; U.S. Pat. No. 6,635,974, issued Oct. 21, 2003; U.S. Pat. No. 6,696,819, issued Feb. 24, 20144; U.S. Pat. No. 6,707,303, issued Mar. 16, 2004; U.S. Pat. No. 6,737,831, issued May 18, 2004; U.S. Pat. No. 6,744,149, issued Jun. 1, 2004; U.S. Pat. No. 6,759,849, issued Jul. 6, 2004; U.S. Pat. No. 6,781,382, issued Aug. 24, 2004; U.S. Pat. No. 6,788,025, filed Sep. 7, 2004; U.S. Pat. No. 6,795,782, issued Sep. 21, 2004; U.S. Pat. No. 6,805,090, filed Oct. 19, 2004; U.S. Pat. No. 6,806,716, filed Oct. 19, 2004; U.S. Pat. No. 6,850,037, filed Feb. 1, 2005; U.S. Pat. No. 6,850,037, issued Feb. 1, 2005; U.S. Pat. No. 6,871,151, issued Mar. 22, 2005; U.S. Pat. No. 6,885,195, issued Apr. 26, 2005; U.S. Pat. No. 6,888,468, issued May 3, 2005; U.S. Pat. No. 6,891,378, issued May 10, 2005; U.S. Pat. No. 6,906,522, issued Jun. 14, 2005; U.S. Pat. No. 6,906,523, issued Jun. 14, 2005; U.S. Pat. No. 6,909,287, issued Jun. 21, 2005; U.S. Pat. No. 6,914,413, issued Jul. 5, 2005; U.S. Pat. No. 6,913,483, issued Jul. 5, 2005; U.S. Pat. No. 6,930,485, issued Aug. 16, 2005; U.S. Pat. No. 6,933,727, issued August 23, 200; U.S. Pat. No. 6,941,234, filed Sep. 6, 2005; U.S. Pat. No. 6,967,484, issued Nov. 22, 2005; U.S. Pat. No. 6,998,847, issued Feb. 14, 2006; U.S. Pat. No. 7,003,410, issued Feb. 21, 2006; U.S. Pat. No. 7,003,411, issued Feb. 21, 2006; U.S. Pat. No. 7,012,433, issued Mar. 14, 2006; U.S. Pat. No. 7,015,674, issued Mar. 21, 2006; U.S. Pat. No. 7,034,541, issued Apr. 25, 2006; U.S. Pat. No. 7,039,533, issued May 2, 2006; U.S. Pat. No. 7,058,525, issued Jun. 6, 2006; U.S. Pat. No. 7,081,755, issued Jul. 25, 2006; U.S. Pat. No. 7,106,070, issued Sep. 12, 2006; U.S. Pat. No. 7,116,109, issued Oct. 3, 2006; U.S. Pat. No. 7,119,686, issued Oct. 10, 2006; and U.S. Pat. No. 7,126,341, issued Oct. 24, 2006; U.S. Pat. No. 7,154,276, issued Dec. 26, 2006; U.S. Pat. No. 7,198,510, issued Apr. 3, 2007; U.S. Pat. No. 7,363,175, issued Apr. 22, 2008; U.S. Pat. No. 7,208,914, issued Apr. 24, 2007; U.S. Pat. No. 7,246,015, issued Jul. 17, 2007; U.S. Pat. No. 7,295,936, issued Nov. 13, 2007; U.S. Pat. No. 7,319,304, issued Jan. 15, 2008; U.S. Pat. No. 7,363,175, issued Apr. 22, 2008; U.S. Pat. No. 7,398,176, issued Jul. 8, 2008; U.S. Pat. No. 7,408,358, issued Aug. 5, 2008; U.S. Pat. No. 7,425,833, issued Sep. 16, 2008; U.S. Pat. No. 7,446,536, issued Nov. 4, 2008; U.S. Pat. No. 7,479,763, issued Jan. 20, 2009; U.S. Pat. No. 7,498,767, issued Mar. 3, 2009; U.S. Pat. No. 7,501,795, issued Mar. 10, 2009; U.S. Pat. No. 7,505,856, issued Mar. 17, 2009; U.S. Pat. No.

7,545,146, issued Jun. 9, 2009; U.S. Pat. No. 7,557,586, issued Jul. 7, 2009; U.S. Pat. No. 7,595,643, issued Sep. 29, 2009; U.S. Pat. No. 7,598,699, issued Oct. 6, 2009; U.S. Pat. No. 7,598,744, issued Oct. 6, 2009; U.S. Pat. No. 7,598,743, issued Oct. 6, 2009; U.S. Pat. No. 7,619,417, issued Nov. 17, 2009; U.S. Pat. No. 7,642,786, issued Jan. 5, 2010; U.S. Pat. No. 7,642,787, issued Jan. 5, 2010; U.S. Pat. No. 7,656,162, issued Feb. 2, 2010; U.S. Pat. No. 7,688,074, issued Mar. 30, 2010; U.S. Pat. No. 7,705,602, issued Apr. 27, 2010; U.S. Pat. No. 7,706,992, issued Apr. 27, 2010; U.S. Pat. No. 7,710,119, issued May 4, 2010; U.S. Pat. No. 7,723,993, issued May 25, 2010; U.S. Pat. No. 7,728,597, issued Jun. 1, 2010; U.S. Pat. No. 7,772,850, issued Aug. 10, 2010; U.S. Pat. No. 7,774,151, issued Aug. 10, 2010; U.S. Pat. No. 7,777,612, issued Aug. 17, 2010; U.S. Pat. No. 7,791,348, issued Sep. 7, 2010; U.S. Pat. No. 7,808,375, issued Oct. 5, 2010; U.S. Pat. No. 7,924,015, issued Apr. 12, 2011; U.S. Pat. No. 7,940,053, issued May 10, 2011; U.S. Pat. No. 7,940,052, issued May 10, 2011; U.S. Pat. No. 7,959,476, issued Jun. 14, 2011; U.S. Pat. No. 7,977,914, issued Jul. 12, 2011; U.S. Pat. No. 7,999,505, issued Aug. 16, 2011; U.S. Pat. No. D643,759, issued Aug. 23, 2011; U.S. Pat. No. 8,164,343, issued Apr. 24, 2012; U.S. Pat. No. 8,198,900, issued Jun. 12, 2012; U.S. Pat. No. 8,203,345, issued Jun. 19, 2012; U.S. Pat. No. 8,237,448, issued Aug. 7, 2012; U.S. Pat. No. 8,306,690, issued Nov. 6, 2012; U.S. Pat. No. 8,344,685, issued Jan. 1, 2013; U.S. Pat. No. 8,436,619, issued May 7, 2013; U.S. Pat. No. 8,442,877, issued May 14, 2013; U.S. Pat. No. 8,493,022, issued Jul. 23, 2013; U.S. Pat. No. D687,727, issued Aug. 13, 2013; U.S. Pat. No. 8,513,949, issued Aug. 20, 2013; U.S. Pat. No. 8,674,654, issued Mar. 18, 2014; U.S. Pat. No. 8,674,711, issued Mar. 18, 2014; U.S. Pat. No. 8,704,483, issued Apr. 22, 2014; U.S. Pat. No. 8,738,309, issued May 27, 2014; U.S. Pat. No. 8,754,653, issued Jun. 17, 2014; U.S. Pat. No. 8,872,516, issued Oct. 28, 2014; U.S. Pat. No. 8,872,517, issued Oct. 28, 2014; U.S. Pat. No. 8,958,998, issued Feb. 17, 2015; U.S. Pat. No. 8,963,550, issued Feb. 24, 2015; U.S. Pat. No. 9,018,958, issued Apr. 28, 2015; U.S. Pat. No. 9,052,366, issued Jun. 9, 2015; U.S. Pat. No. 9,201,120, issued Dec. 1, 2015; U.S. Pat. No. 9,229,062, issued Jan. 5, 20126; U.S. Pat. No. 9,244,100, issued Jan. 26, 2016; U.S. Pat. No. 9,274,157, issued Mar. 1, 2016; U.S. Pat. No. 9,312,575, issued Apr. 12, 2016; U.S. Pat. No. 9,335,362, issued May 10, 2016; U.S. Pat. No. 9,425,487, issued Aug. 23, 2016; U.S. Pat. No. 9,419,311, issued Aug. 16, 2016; U.S. Pat. No. 9,496,720, issued Nov. 15, 2016; U.S. Pat. No. 9,588,185, issued Mar. 7, 2017; U.S. Pat. No. 9,923,289, issued Mar. 20, 2018; U.S. Pat. No. 9,966,676, issued May 8, 2018; U.S. Pat. No. 10,046,649, issued Aug. 14, 2018; U.S. Pat. No. 10,222,397, issued Mar. 5, 2019; U.S. Pat. No. 10,317,468, issued Jun. 11, 2019; U.S. Pat. No. 10,429,449, issued Oct. 1, 2019; U.S. Pat. No. 10,473,555, issued Nov. 12, 2019; U.S. Pat. No. 10,608,353, issued Mar. 31, 2020; U.S. Pat. No. 10,843,574, issued Nov. 24, 2020; U.S. Pat. No. 11,054,480, issued Jul. 6, 2021; U.S. Pat. No. 11,325,479, issued May 10, 2022; U.S. Ser. No. 09/780,146, filed Feb. 9, 2001, entitled STORAGE BATTERY WITH INTEGRAL BATTERY TESTER; U.S. Ser. No. 09/756,638, filed Jan. 8, 2001, entitled METHOD AND APPARATUS FOR DETERMINING BATTERY PROPERTIES FROM COMPLEX IMPEDANCE/ADMITTANCE; U.S. Ser. No. 09/862,783, filed May 21, 2001, entitled METHOD AND APPARATUS FOR TESTING CELLS AND BATTERIES EMBEDDED IN SERIES/PARALLEL SYSTEMS; U.S. Ser. No. 09/880, 473, filed Jun. 13, 2001; entitled BATTERY TEST MODULE; U.S. Ser. No. 10/109,734, filed Mar. 28, 2002, entitled APPARATUS AND METHOD FOR COUNTERACTING SELF DISCHARGE IN A STORAGE BATTERY; U.S. Ser. No. 10/263,473, filed Oct. 2, 2002, entitled ELECTRONIC BATTERY TESTER WITH RELATIVE TEST OUTPUT; U.S. Ser. No. 09/653,963, filed Sep. 1, 2000, entitled SYSTEM AND METHOD FOR CONTROLLING POWER GENERATION AND STORAGE; U.S. Ser. No. 10/174, 110, filed Jun. 18, 2002, entitled DAYTIME RUNNING LIGHT CONTROL USING AN INTELLIGENT POWER MANAGEMENT SYSTEM; U.S. Ser. No. 10/258,441, filed Apr. 9, 2003, entitled CURRENT MEASURING CIRCUIT SUITED FOR BATTERIES; U.S. Ser. No. 10/681,666, filed Oct. 8, 2003, entitled ELECTRONIC BATTERY TESTER WITH PROBE LIGHT; U.S. Ser. No. 11/207,419, filed Aug. 19, 2005, entitled SYSTEM FOR AUTOMATICALLY GATHERING BATTERY INFORMATION FOR USE DURING BATTERY TESTER/CHARGING, U.S. Ser. No. 11/356,443, filed Feb. 16, 2006, entitled ELECTRONIC BATTERY TESTER WITH NETWORK COMMUNICATION; U.S. Ser. No. 12/697,485, filed Feb. 1, 2010, entitled ELECTRONIC BATTERY TESTER; U.S. Ser. No. 12/769, 911, filed Apr. 29, 2010, entitled STATIONARY BATTERY TESTER; U.S. Ser. No. 13/098,661, filed May 2, 2011, entitled METHOD AND APPARATUS FOR MEASURING A PARAMETER OF A VEHICLE ELECTRICAL SYSTEM; U.S. Ser. No. 13/152,711, filed Jun. 3, 2011, entitled BATTERY PACK MAINTENANCE FOR ELECTRIC VEHICLE; U.S. Ser. No. 14/039,746, filed Sep. 27, 2013, entitled BATTERY PACK MAINTENANCE FOR ELECTRIC VEHICLE; U.S. Ser. No. 14/565,689, filed Dec. 10, 2014, entitled BATTERY TESTER AND BATTERY REGISTRATION TOOL; U.S. Ser. No. 15/017,887, filed Feb. 8, 2016, entitled METHOD AND APPARATUS FOR MEASURING A PARAMETER OF A VEHICLE ELECTRICAL SYSTEM; U.S. Ser. No. 15/049,483, filed Feb. 22, 2016, entitled BATTERY TESTER FOR ELECTRIC VEHICLE; U.S. Ser. No. 15/077,975, filed Mar. 23, 2016, entitled BATTERY MAINTENANCE SYSTEM; U.S. Ser. No. 15/149,579, filed May 9, 2016, entitled BATTERY TESTER FOR ELECTRIC VEHICLE; U.S. Ser. No. 16/021,538, filed Jun. 28, 2018, entitled BATTERY PACK MAINTENANCE FOR ELECTRIC VEHICLE; U.S. Ser. No. 16/056,991, filed Aug. 7, 2018, entitled HYBRID AND ELECTRIC VEHICLE BATTERY PACK MAINTENANCE DEVICE; U.S. Ser. No. 16/253,526, filed Jan. 22, 2019, entitled HIGH CAPACITY BATTERY BALANCER; U.S. Ser. No. 16/297, 975, filed Mar. 11, 2019, entitled HIGH USE BATTERY PACK MAINTENANCE; U.S. Ser. No. 16/695,705, filed Nov. 26, 2019, entitled BATTERY RATING VERSUS OEM SPECIFICATION; U.S. Ser. No. 16/943,120, filed Jul. 30, 2020 entitled TIRE TREAD GUAGE USING VISUAL INDICATOR; U.S. Ser. No. 17/086,629, filed Nov. 2, 2020, entitled HYBRID AND ELECTRIC VEHICLE BATTERY PACK MAINTENANCE DEVICE; U.S. Ser. No. 17/088, 824, filed Nov. 4, 2020, entitled SYSTEM FOR CHARGING A SERIES OF CONNECTED BATTERIES; U.S. Ser. No. 17/090,129, filed Nov. 5, 2020 entitled BATTERY PACK MAINTENANCE SYSTEM; U.S. Ser. No. 17/136, 600, filed Dec. 29, 2020, entitled INTELLIGENT MODULE INTERFACE FOR BATTERY MAINTENANCE DEVICE; U.S. Ser. No. 17/151,971, filed Jan. 19, 2021, entitled ELECTRONIC BATTERY TESTER WITH BATTERY CLAMP STORAGE HOLSTERS; U.S. Ser. No. 17/364,953, filed Jul. 1, 2021, entitled ELECTRICAL LOAD FOR ELECTRONIC BATTERY TESTER AND ELECTRONIC BATTERY TESTER INCLUDING SUCH ELECTRICAL LOAD; U.S. Ser. No. 17/504,897, filed Oct.

19, 2021, entitled HIGH CAPACITY BATTERY BALANCER; U.S. Ser. No. 17/739,393, filed May 9, 2022, entitled HYBRID AND ELECTRIC VEHICLE BATTERY PACK MAINTENANCE DEVICE and U.S. Ser. No. 17/750,719, filed May 23, 2022, entitled BATTERY MONITORING SYSTEM; all of which are incorporated herein by reference in their entireties.

Although the present invention has been described with reference to preferred embodiments, workers skilled in the art will recognize that changes may be made in form and detail without departing from the spirit and scope of the invention.

What is claimed is:

1. A power adapter for an automotive vehicle maintenance device of the type used to perform maintenance on an automotive vehicle and which is separate from the automotive vehicle, comprising:
   a power input connection comprising first and second power input connectors, and
   a control pilot connection configured to couple to an electric vehicle charging station;
   a power output connection comprising first and second power output connectors configured to connect to the automotive vehicle maintenance device; and
   connection circuitry configured to:
   electrically connect the first and second power input connectors of the power input connection to the first and second power output connectors of the power output connection;
   indicate, via the control pilot connection, that the power adapter is ready to receive power from an external source such that power is received by the first and second input connectors from the charging station; and
   provide power to the vehicle maintenance device through the first and second power output connectors using power received by the first and second power input connectors from the charging station.

2. The power adapter of claim 1 wherein the power input connection is in accordance with the SAE J1772 standard.

3. The power adapter of claim 2 wherein the connection circuitry comprises a first resistor which connects the control pilot connection of the power input connection to electrical ground.

4. The power adapter of claim 1 wherein the power output connection is in accordance with a standard.

5. The power adapter of claim 1 wherein the connection circuitry includes a switch to cause a charging station to provide power to the power input connection.

6. The power adapter of claim 1 wherein the power input connection includes a top connector row comprising the first and second power input connectors, a middle connector row comprising the control pilot connection and a proximity pilot connection, and an electrical ground connection below the middle connector row.

7. The power adapter of claim 1 including a visual output configured to provide an indication that power is being received on the power input connection.

8. The power adapter of claim 2 wherein the connection circuitry further comprises a second resistor and a switch configured to selectively connect the control pilot connection of the power input connection to electrical ground via the second resistor, and wherein the connection circuitry is configured to cause a charging station to provide power to the power input connection when the switch connects the control pilot connection of the power input connection to electrical ground via the second resistor.

9. A method of providing power to an automotive vehicle maintenance device of the type used to perform maintenance on an automotive vehicle and which is separate from the automotive vehicle, the method comprising:
   receiving, at a power adapter, power from an electronic vehicle charging station through a power input connection having first and second power input connectors, and a control pilot connection configured to couple to an electric vehicle charging station;
   providing at least a portion of the received power to the automotive vehicle maintenance device via the power adapter through a power output connection comprising first and second power output connectors configured to connect to the automotive vehicle maintenance device; and
   indicating, via the control pilot connection, that the power adapter is ready to receive power from an external source such that power is received by the first and second input connectors from the charging station and provided to the vehicle maintenance device through the first and second power output connectors using power received by the first and second power input connectors from the charging station.

10. The method of claim 9 wherein the received power comprises a first voltage level, and wherein the at least the portion of the received power is provided to the automotive vehicle maintenance device at the same first voltage level.

11. The method of claim 9 wherein the received power comprises a first voltage level, and wherein the at least the portion of the received power is provided to the automotive vehicle maintenance device at a second voltage level that is different from the first voltage level.

12. The method of claim 9 wherein the receiving at the power adapter is carried out in accordance with the SAE J1772 standard.

13. A power adapter, comprising:
   a power input connection configured to receive an electronic vehicle charger plug from an electric vehicle charging station;
   a power output connection comprising at least one power adapter outlet in accordance with a standard; and
   connection circuitry configured to connect the power input connection to the power output connection to thereby provide power to a vehicle maintenance device, wherein the connection circuitry includes a first resistor which connects a control pilot connection of the power input connection to electrical ground.

14. The power adapter of claim 13 wherein the power output connection is configured to connect to an automotive vehicle maintenance device.

15. The power adapter of claim 13 wherein the power input connection is in accordance with the SAE J1772 standard.

16. The power adapter of claim 13 when the connection circuitry includes a switch to cause a charging station to provide power to the power input connection.

17. The power adapter of claim 13 wherein the connection circuitry is configured to receive a first voltage level from the power input connection and provide a second voltage level that is different from the first voltage level to the power output connection.

18. The power adapter of claim 13 including a visual output configured to provide an indication that power is being received on the power input connection.

19. The power adapter of claim 15 wherein the connection circuitry further comprises a second resistor and a switch configured to selectively connect the control pilot connection of the power input connection to electrical ground via the second resistor, and wherein the connection circuitry is configured to cause a charging station to provide power to the power input connection when the switch connects the control pilot connection of the power input connection to electrical ground via the second resistor.

* * * * *